(12) United States Patent
Ophardt et al.

(10) Patent No.: US 10,893,780 B2
(45) Date of Patent: Jan. 19, 2021

(54) FLUID DISPENSER WITH STROKE INDEPENDENT DOSAGE ADJUSTMENT

(71) Applicant: OP-Hygiene IP GmbH, Niederbipp (CH)

(72) Inventors: Heiner Ophardt, Arisdorf (CH); Andrew Jones, St. Anns (CA)

(73) Assignee: OP-Hygiene IP GmbH, Niederbipp (CH)

( * ) Notice: Subject to any disclaimer, the term of this patent is extended or adjusted under 35 U.S.C. 154(b) by 0 days.

(21) Appl. No.: 16/589,301

(22) Filed: Oct. 1, 2019

(65) Prior Publication Data

US 2020/0113392 A1 Apr. 16, 2020

(30) Foreign Application Priority Data

Oct. 11, 2018 (CA) ..................................... 3020463

(51) Int. Cl.
*A47K 5/12* (2006.01)
*B05B 11/00* (2006.01)

(52) U.S. Cl.
CPC ......... *A47K 5/1207* (2013.01); *B05B 11/3009* (2013.01)

(58) Field of Classification Search
CPC ........................... A47K 5/1207; B05B 11/3009
USPC ...................................................... 222/251
See application file for complete search history.

(56) References Cited

U.S. PATENT DOCUMENTS

| 4,238,056 A | * | 12/1980 | Tucker | A47K 5/1207 222/181.2 |
|---|---|---|---|---|
| 4,489,857 A | | 12/1984 | Batlas | |
| 4,993,600 A | * | 2/1991 | Tucker | A47K 5/1207 222/181.2 |
| 5,033,657 A | * | 7/1991 | Whittington | A47K 5/1202 222/181.2 |
| 5,305,915 A | | 4/1994 | Kamysz et al. | |
| 5,465,877 A | | 11/1995 | Bell et al. | |
| 6,068,162 A | | 5/2000 | De Winter et al. | |
| 6,189,740 B1 | | 2/2001 | Wade et al. | |
| 8,074,844 B2 | | 12/2011 | Ophardt et al. | |
| 8,261,941 B2 | | 9/2012 | Woo et al. | |
| 8,261,950 B2 | | 9/2012 | Cittadino et al. | |
| 8,302,812 B2 | | 11/2012 | Reynolds | |
| 8,342,369 B2 | | 1/2013 | Hsu | |
| 8,678,240 B2 | | 3/2014 | O'Brien | |
| 8,827,120 B2 | | 9/2014 | Boshuizen et al. | |

(Continued)

*Primary Examiner* — Jeremy Carroll
(74) *Attorney, Agent, or Firm* — Thorpe North & Western LLP

(57) ABSTRACT

A fluid dispenser having a pump mechanism that dispenses a dose of fluid when a movable pump member of the pump mechanism is moved between a selected extended position and a retracted position. The fluid dispenser includes a dose adjustment mechanism for selecting the selected extended position from at least a high dose extended position and a low dose extended position. An actuator of the fluid dispenser, when activated, effects movement of the movable pump member between the selected extended position and the retracted position to dispense the dose of fluid. A volume of the dose of fluid that is dispensed upon activation of the actuator is higher when the high dose extended position is the selected extended position than when the low dose extended position is the selected extended position.

20 Claims, 57 Drawing Sheets

(56) References Cited

U.S. PATENT DOCUMENTS

| | | |
|---|---|---|
| 8,851,331 B2 | 10/2014 | Pelkey et al. |
| 8,991,655 B2 | 3/2015 | Pelkey |
| 9,408,502 B2 | 8/2016 | Pelkey |
| 2012/0080452 A1 | 4/2012 | Boshuizen et al. |
| 2017/0055782 A1* | 3/2017 | Ophardt ............... A47K 5/1207 |
| 2017/0136479 A1* | 5/2017 | Ophardt .................... G01F 3/00 |
| 2017/0251884 A1 | 9/2017 | Carignan et al. |

* cited by examiner

FLUID DISPENSER WITH STROKE INDEPENDENT DOSAGE ADJUSTMENT

SCOPE OF THE INVENTION

This invention relates to fluid dispensers that dispense an adjustable dosage of fluid, including in particular hand cleaning fluid dispensers.

BACKGROUND OF THE INVENTION

Hand cleaning fluid dispensers that dispense an adjustable dosage of fluid provide the ability to increase or reduce the volume of fluid that is dispensed with each activation of the dispenser. This allows the volume of fluid to be adjusted according to the particular needs of different users. For example, if an adjustable hand cleaning fluid dispenser is used to dispense hand soap for children, a smaller volume of fluid can be selected to suit their smaller hand size. The same dispenser could later be used to dispense hand soap for adults, and the volume of fluid could be increased to suit their larger hand size. Adjusting the volume of fluid that is dispensed to suit the particular needs of different users may help to reduce the amount of fluid that is wasted, and thus provide cost savings.

Known adjustable manually operated hand cleaning fluid dispensers include dispensers that adjust the volume of fluid that is dispensed by limiting the distance that a manual presser can be moved, or by introducing a lost link in the connection between the manual presser and the fluid pump. These dispensers suffer the disadvantages that the manual presser can feel loose or has a noticeably reduced range of motion, which may give users the impression that the dispenser is broken or improperly installed. These dispensers also suffer the disadvantage that in use the pump may be prevented from returning to a fully retracted position when the pump is activated at lower dosage settings, which can cause air to become entrapped within the pump, leading to priming or dosage consistency issues.

SUMMARY OF THE INVENTION

To at least partially overcome some of the disadvantages of previously known devices and methods, the present inventors have provided a fluid dispenser with a pump mechanism that dispenses a dose of fluid when a movable pump member of the pump mechanism is moved between a selected extended position and a retracted position, and a dose adjustment mechanism for selecting the selected extended position from at least a high dose extended position and a low dose extended position.

The inventors have appreciated that adjusting the extended position of the pump mechanism to control the volume of fluid that is dispensed, in preferred embodiments, allows the pump to return to substantially the same retracted position regardless of whether a high dose of fluid is dispensed or a low dose of fluid is dispensed. Preferably, the pump returns to a fully retracted position after each stroke, regardless of the dosage setting, thereby expelling substantially all of the fluid contained therein and preventing air from becoming entrapped within the pump.

Preferably, the fluid dispenser includes an actuator or presser that, when activated, effects movement of the movable pump member between the selected extended position and the retracted position to dispense the dose of fluid. The actuator preferably has a camming surface, and the dose adjustment mechanism preferably includes a cam body that presents a cam surface for engagement with the camming surface. Preferably, the movable pump member is located at the selected extended position when the camming surface engages with an extended engagement portion of the cam surface. The dose adjustment mechanism also preferably includes a cam selection mechanism for selecting a position of the extended engagement portion relative to the movable pump member. The inventors have appreciated that the cam selection mechanism of the invention allows the volume of fluid that is dispensed to be selected by selecting the position of the extended engagement portion of the cam surface relative to the movable pump member.

Preferably, the cam surface also has a retracted engagement portion, and the movable pump member is located at the retracted position when the camming surface engages with the retracted engagement portion of the cam surface.

In preferred embodiments, the pump mechanism also has a reciprocal pump member, and the cam body is mechanically connected to the movable pump member for moving the movable pump member relative to the reciprocal pump member along a pump axis. Upon activation of the actuator, the camming surface preferably moves across the cam surface between the extended engagement portion and the retracted engagement portion, which moves the cam body axially relative to the reciprocal pump member, which in turn moves the movable pump member along the pump axis between the selected extended position and the retracted position.

The inventors have appreciated that, in preferred embodiments, the invention allows the dosage setting to be selected by, for example, rotating the cam body about an adjustment axis to move the extended engagement portion of the cam surface towards or away from the movable pump member. Alternatively, the dosage setting may optionally be selected by sliding the cam body relative to the camming surface to align a high dose cam surface of the cam body or a low dose cam surface of the cam body with the camming surface, wherein the position of the extended engagement portion of the high dose cam surface relative to the movable pump member differs from the position of the extended engagement portion of the low dose cam surface relative to the movable pump member.

Preferably, movement of the actuator between a first position and a second position effects movement of the movable pump member between the selected extended position and the retracted position to dispense the dose of fluid. The inventors have appreciated that, in preferred embodiments, the invention allows the movement distance of the actuator between the first position and the second position to remain the same regardless of which dosage setting is selected. Also, in preferred embodiments the dose adjustment mechanism selects the dosage setting without introducing a lost link between the actuator and the pump mechanism. The actuator can thus be made to have a full range of motion without feeling loose, thereby improving the user experience.

The inventors have also appreciated that, in preferred embodiments, the mechanical connection between the actuator and the movable pump member provides a mechanical advantage that increases at lower dosage settings.

In preferred embodiments, a biasing mechanism biases the movable pump member towards the selected extended position. When the movable pump member is at the selected extended position, the biasing mechanism preferably provides a biasing force that is the same regardless of the dosage setting that is selected. The biasing mechanism may, for example, include a spring that engages with the actuator, or a spring that engages with a spring receiving portion of the dose adjustment mechanism, the spring receiving portion being configured to remain at substantially the same position relative to the actuator when the movable pump member is at the selected extended position, regardless of the dosage setting that is selected.

Accordingly, in one aspect the present invention resides in a fluid dispenser comprising: a pump mechanism that dispenses a dose of fluid when a movable pump member of the pump mechanism is moved between a selected extended position and a retracted position; a dose adjustment mechanism for selecting the selected extended position from at least a high dose extended position and a low dose extended position; and an actuator that, when activated, effects movement of the movable pump member between the selected extended position and the retracted position to dispense the dose of fluid; wherein a volume of the dose of fluid that is dispensed upon activation of the actuator is higher when the high dose extended position is the selected extended position than when the low dose extended position is the selected extended position.

In some embodiments, the actuator comprises a camming surface; wherein the dose adjustment mechanism comprises a cam body that presents a cam surface for engagement with the camming surface; and wherein the movable pump member is located at the selected extended position when the camming surface engages with the cam surface at an extended engagement portion of the cam surface.

The dose adjustment mechanism optionally further comprises a cam selection mechanism for selecting a position of the extended engagement portion relative to the movable pump member; and wherein the selected extended position is selected by selecting the position of the extended engagement portion relative to the movable pump member.

Optionally, the movable pump member is located at the retracted position when the camming surface engages with the cam surface at a retracted engagement portion of the cam surface.

In some embodiments, the pump mechanism further comprises a reciprocal pump member; wherein the cam body is mechanically connected to the movable pump member for moving the movable pump member relative to the reciprocal pump member along a pump axis; wherein, upon activation of the actuator, the camming surface moves across the cam surface between the extended engagement portion and the retracted engagement portion; wherein the movement of the camming surface across the cam surface moves the cam body axially relative to the reciprocal pump member; and wherein the axial movement of the cam body moves the movable pump member along the pump axis between the selected extended position and the retracted position.

Optionally, the movable pump member is axially extended from the reciprocal pump member when at the selected extended position, and axially retracted from the reciprocal pump member when at the retracted position; wherein the cam selection mechanism selects the position of the extended engagement portion of the cam surface relative to the movable pump member at least from a low dose extended engagement position and a high dose extended engagement position; and wherein the movable pump member is axially extended further from the reciprocal pump member when the camming surface is engaged with the cam surface at the high dose extended engagement position than when the camming surface is engaged with the cam surface at the low dose extended engagement position.

The retracted engagement portion of the cam surface optionally remains at substantially the same position relative to the movable pump member regardless of whether the high dose extended position is the selected extended position or the low dose extended position is the selected extended position.

In some embodiments, movement of the actuator between a first position and a second position effects movement of the movable pump member between the selected extended position and the retracted position to dispense the dose of fluid; wherein the camming surface engages with the extended engagement portion of the cam surface when the actuator is at the first position; and wherein the camming surface engages with the retracted engagement portion of the cam surface when the actuator is at the second position.

Optionally, the camming surface moves axially towards the reciprocal pump member and across the cam surface from the extended engagement portion to the retracted engagement portion when the actuator moves from the first position to the second position; and wherein the axial movement of the camming surface towards the reciprocal pump member and across the cam surface from the extended engagement portion to the retracted engagement portion moves the movable pump member from the selected extended position to the retracted position.

In some embodiments, the cam selection mechanism selects the position of the extended engagement portion relative to the movable pump member by rotating the cam body about an adjustment axis.

Preferably, the rotation of the cam body about the adjustment axis moves the extended engagement portion towards or away from the movable pump member.

Optionally, the dose adjustment mechanism further comprises a cam locking mechanism; wherein the cam selection mechanism is movable between a locked position and an unlocked position, and is biased towards the locked position; wherein, when in the locked position, the cam body engages with the cam locking mechanism to hold the cam surface at a selected rotational position relative to the adjustment axis; wherein the cam selection mechanism is movable from the locked position to the unlocked position by moving the cam body away from and out of engagement with the cam locking mechanism; and wherein the selected rotational position of the cam surface is selected by rotating the cam selection mechanism while in the unlocked position, to thereby rotate the cam body to the selected rotational position, and then moving the cam body back into engagement with the cam locking mechanism.

In some preferred embodiments, the cam body has a locking end that is spaced from the adjustment axis; and wherein the cam locking mechanism comprises an arcuate cam locking surface that has a set of notches that are sized to receive the locking end of the cam body.

In some embodiments, the adjustment axis is closer to the retracted engagement portion of the cam surface than the extended engagement portion of the cam surface; and wherein the retracted engagement portion is moved a smaller distance towards or away from the movable pump member when the cam body is rotated about the adjustment axis compared to the movement of the extended engagement portion.

The dose adjustment mechanism optionally further comprises a pump engagement member that engages with the movable pump member and locates the movable pump member relative to the reciprocal pump member; and wherein the cam selection mechanism selects the position of the extended engagement portion relative to the movable pump member by moving the pump engagement member relative to the extended engagement portion of the cam surface.

In some embodiments, the dose adjustment mechanism further comprises a pump engagement member that engages with the movable pump member and locates the movable pump member relative to the reciprocal pump member; wherein the cam body is connected to the pump engagement member so that the rotation of the cam body about the adjustment axis moves the pump engagement member along the pump axis relative to the extended engagement portion of the cam surface.

Optionally, the cam body is connected to the pump engagement member at a connection portion of the cam body; and wherein the adjustment axis is closer to the extended engagement portion of the cam surface than the connection portion of the cam body.

Preferably, the connection portion of the cam body is closer to the retracted engagement portion of the cam surface than the extended engagement portion of the cam surface; and wherein the retracted engagement portion is moved a smaller distance towards or away from the movable pump member when the cam body is rotated about the adjustment axis compared to the movement of the extended engagement portion.

In some embodiments, the cam selection mechanism selects the cam surface that is presented for engagement with the camming surface from at least a high dose cam surface of the cam body and a low dose cam surface of the cam body.

For example, the extended engagement portion of the cam surface that is presented for engagement with the camming surface may be selected from at least a high dose extended engagement portion of the high dose cam surface and a low dosage extended engagement portion of the low dose cam surface; wherein the position of the high dose extended engagement portion of the high dose cam surface relative to the movable pump member differs from the position of the low dose extended engagement portion of the low dose cam surface relative to the movable pump member.

In some preferred embodiments, the cam selection mechanism selects the cam surface that is presented for engagement with the camming surface by sliding the cam body relative to the camming surface to align the high dose cam surface, the low dose cam surface, or an additional cam surface of the cam body with the camming surface.

Movement of the actuator between a first position and a second position preferably effects movement of the movable pump member between the selected extended position and the retracted position to dispense the dose of fluid.

In some embodiments, a movement distance of the actuator between the first position and the second position is the same regardless of whether the high dose extended position is the selected extended position or the low dose extended position is the selected extended position.

In some embodiments, the dose adjustment mechanism selects the selected extended position without reducing the movement distance of the actuator between the first position and the second position, regardless of whether the high dose extended position is selected or the low dose extended position is selected.

Preferably, the dose adjustment mechanism provides a continuous mechanical linkage between the actuator and the movable pump member regardless of whether the high dose extended position is the selected extended position or the low dose extended position is the selected extended position.

Preferably, the dose adjustment mechanism selects the selected extended position without introducing a loose segment of movement of the actuator between the first position and the second position, regardless of whether the high dose extended position is selected or the low dose extended position is selected.

A mechanical advantage of the mechanical linkage is preferably increased when the low dose extended position is the selected extended position.

In some embodiments, the fluid dispenser further comprises a biasing mechanism that biases the movable pump member towards the selected extended position.

Preferably, when the movable pump member is at the selected extended position, the biasing mechanism provides a biasing force that is the same regardless of whether the high dose extended position is the selected extended position or the low dose extended position is the selected extended position.

The biasing mechanism optionally comprises a spring that engages with the actuator.

In some embodiments, the biasing mechanism comprises a spring that engages with a spring receiving portion of the dose adjustment mechanism; and wherein the spring receiving portion of the dose adjustment mechanism remains at substantially the same position relative to the actuator when the movable pump member is at the selected extended position, regardless of whether the high dose extended position is the selected extended position or the low dose extended position is the selected extended position.

The retracted position of the movable pump member preferably remains substantially unchanged regardless of whether the high dose extended position is the selected extended position or the low dose extended position is the selected extended position.

Optionally, the fluid is a hand cleaning fluid.

In another aspect, the present invention resides in a method of adjusting a volume of fluid that is dispensed from a fluid dispenser, the method comprising: providing a pump mechanism that dispenses a dose of the fluid when a movable pump member of the pump mechanism is moved between a selected extended position and a retracted position; adjusting a dose adjustment mechanism of the fluid dispenser to select the selected extended position from at least a high dose extended position and a low dose extended position; and activating an actuator of the fluid dispenser to effect movement of the movable pump member between the selected extended position and the retracted position to dispense the dose of fluid, wherein the volume of the dose of fluid that is dispensed upon activation of the actuator is higher when the high dose extended position is the selected extended position than when the low dose extended position is the selected extended position. The fluid dispenser is preferably the aforementioned fluid dispenser.

In a further aspect, the present invention resides in a fluid dispenser comprising: a housing; a piston chamber-forming body mounted to the housing; a piston-forming element slideably received within the piston chamber-forming body for reciprocal movement relative to the piston chamber-forming body along a vertical pump axis; a pump engagement member that engages with the piston-forming element and is slideable relative to the housing along the vertical pump axis; a cam body that is mechanically connected to the pump engagement member and has a cam surface, the cam body being rotatable about a horizontal adjustment axis for selecting a rotational position of the cam surface relative to the pump engagement member; and an actuator that is rotatable about a horizontal actuator axis, the actuator having a camming surface that is spaced from the actuator axis for engagement with the cam surface; wherein rotational movement of the actuator about the actuator axis from a first position to a second position effects movement of the piston-forming element relative to the piston chamber-forming body along the vertical pump axis from an extended position to a retracted position; and wherein a stroke distance between the extended position and the retracted position varies depending on the rotational position of the cam surface relative to the pump engagement member. Optionally, the adjustment axis is parallel to the actuator axis.

The pump engagement member optionally has a cam locking mechanism; wherein the cam body is movable relative to the cam locking mechanism between a locked position and an unlocked position; wherein, when in the locked position, the cam body engages with the cam locking mechanism to hold the cam surface at a selected rotational position relative to the pump engagement member; wherein the cam body is movable from the locked position to the unlocked position by moving the cam body along the adjustment axis away from and out of engagement with the cam locking mechanism; and wherein the selected rotational position of the cam surface is selected by rotating the cam body about the adjustment axis while in the unlocked position until the cam surface is at the selected rotational position, and then moving the cam body along the adjustment axis towards and into engagement with the cam locking mechanism to hold the cam surface at the selected rotational position.

In a still further aspect, the present invention resides in a fluid dispenser comprising: a housing; a piston chamber-forming body mounted to the housing; a piston-forming element slideably received within the piston chamber-forming body for reciprocal movement relative to the piston chamber-forming body along a vertical pump axis; a pump engagement member that engages with the piston-forming element and is slideable relative to the housing along the vertical pump axis; a cam body that is mechanically connected to the pump engagement member and has at least two cam surfaces, the cam body being slideable relative to the pump engagement member along a horizontal adjustment axis for selecting one of the at least two cam surfaces as a selected cam surface; and an actuator that is rotatable about a horizontal actuator axis, the actuator having a camming surface that is spaced from the actuator axis for engagement with the selected cam surface; wherein rotational movement of the actuator about the actuator axis from a first position to a second position effects movement of the piston-forming element relative to the piston chamber-forming body along the vertical pump axis from an extended position to a retracted position; and wherein a stroke distance between the extended position and the retracted position varies depending on which of the at least two cam surfaces is the selected cam surface. Optionally, the adjustment axis is parallel to the actuator axis.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
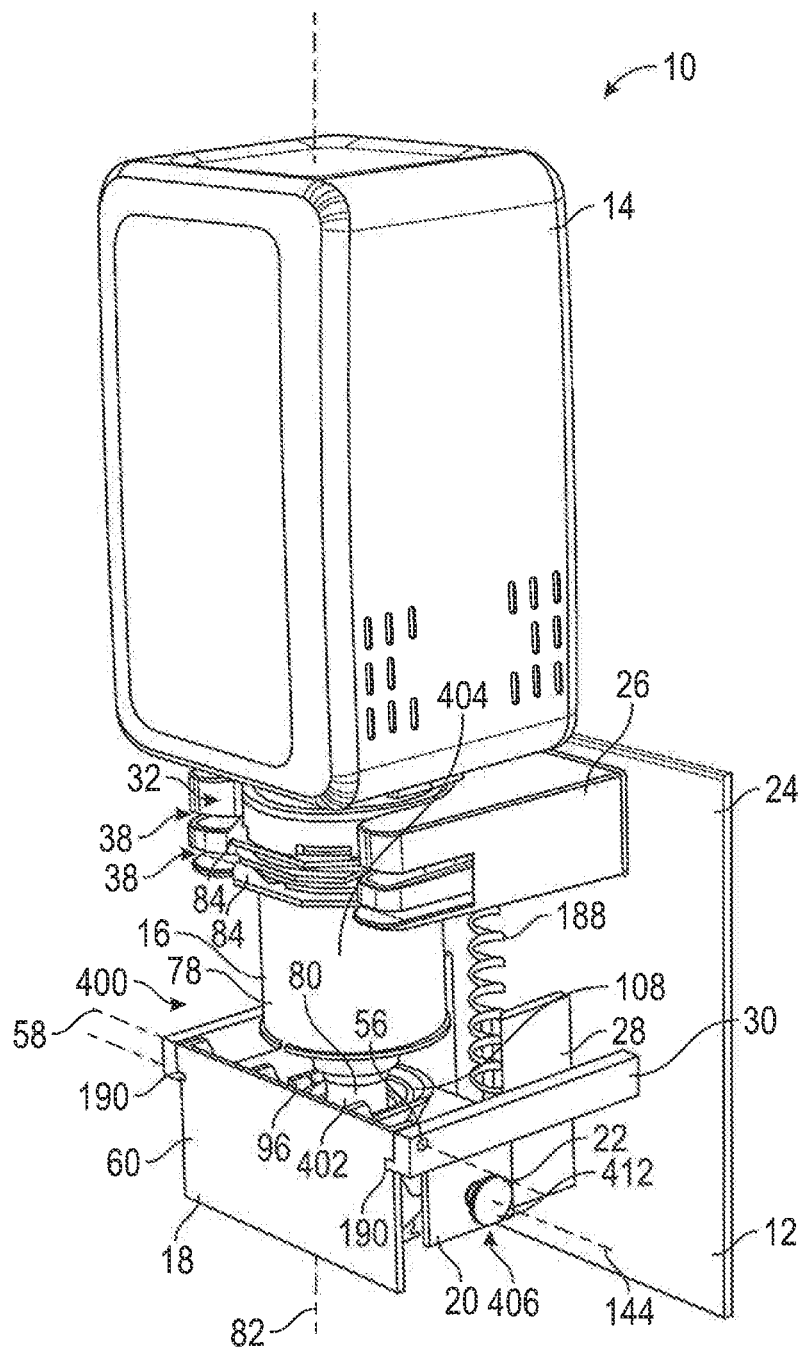
FIG. 1 is a front perspective view of a fluid dispenser in accordance with a first embodiment of the present invention, with an actuator of the dispenser shown at a first position.

FIG. 1 shows a fluid dispenser 10 in accordance with a first embodiment of the invention. The fluid dispenser 10 includes a housing 12, a fluid reservoir 14, a fluid pump 16, an actuator 18, a pump displacement body 20, and a dosage adjustment member 22.

The fluid pump 16 is a piston-type pump mechanism 400, for example, for dispensing a hand cleaning fluid, such as liquid soap, liquid hand sanitizer, liquid disinfectant, or a foamed soap, hand sanitizer, or disinfectant. The fluid pump 16 includes a movable pump member 402 in the form of a piston chamber-forming body 78 and a reciprocal pump member 404 in the form of a piston-forming element 80. The piston-forming element 80 is received within a chamber cavity of the piston chamber-forming body 78 for reciprocal movement relative thereto along a pump axis 82. The fluid pump 16 may have any suitable construction that dispenses the fluid upon reciprocal axial movement of the piston-forming element 80 relative to the piston chamber-forming body 78, such as the constructions described in U.S. Pat. No. 7,984,825 to Ophardt et al., issued Jul. 26, 2011; U.S. Pat. No. 8,684,236 to Ophardt, issued Apr. 1, 2014; U.S. Pat. No. 5,373,970 to Ophardt, issued Dec. 20, 1994; U.S. Pat. No. 5,836,482 to Ophardt et al., issued Nov. 17, 1998; U.S. Pat. No. 8,113,388 to Ophardt et al., issued Feb. 14, 2012; and U.S. Pat. No. 9,682,390 to Ophardt et al., issued Jun. 20, 2017, each of which is incorporated herein by reference.

The fluid reservoir 14 is a bottle for containing the fluid to be dispensed. The reservoir 14 is connected to the piston chamber-forming body 78 of the fluid pump 16 for delivering the fluid thereto, and may have any suitable construction, such as those described in the aforementioned patents. The invention is not limited to any particular construction of the fluid pump 16 and the fluid reservoir 14, and may, for example, incorporate any suitable fluid pump 16 and fluid reservoir 14 that is known in the art.

Figure 2:
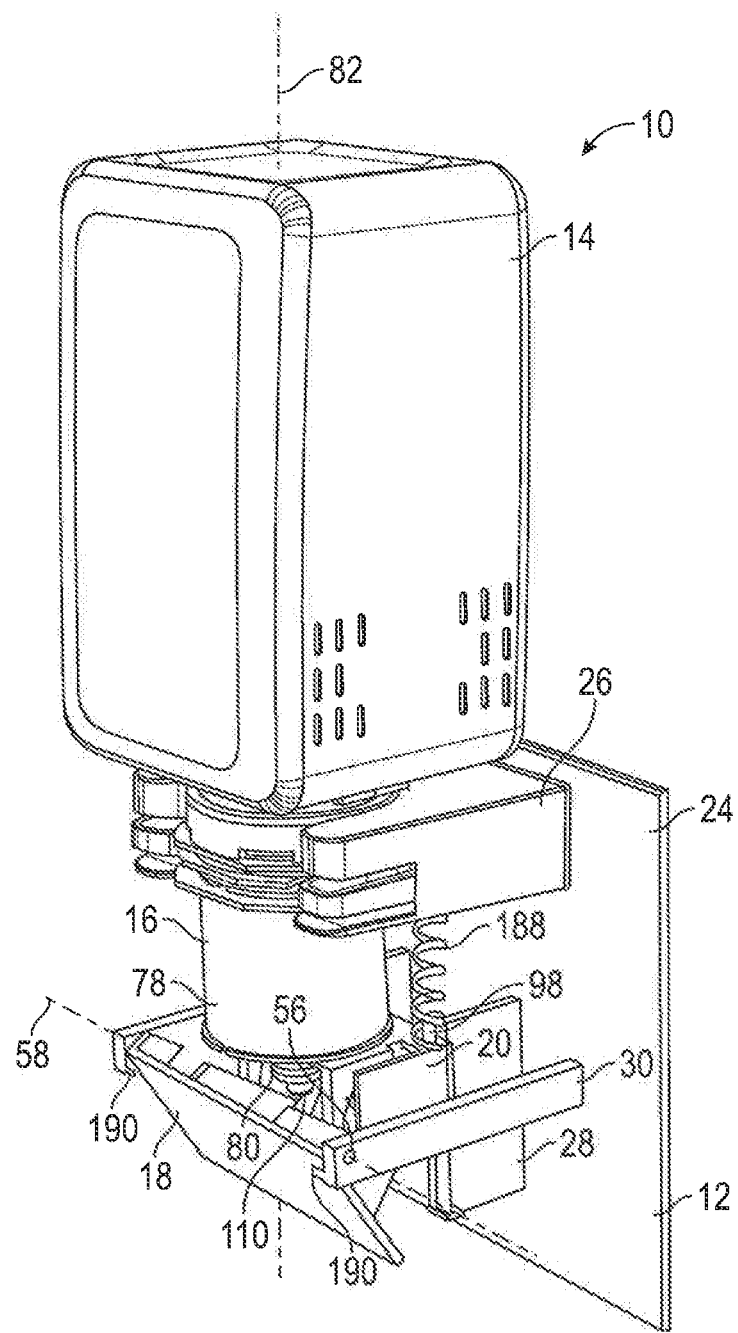
FIG. 2 is a front perspective view of the dispenser of FIG. 1, with the actuator shown rotated to a second position.
Figure 2A:
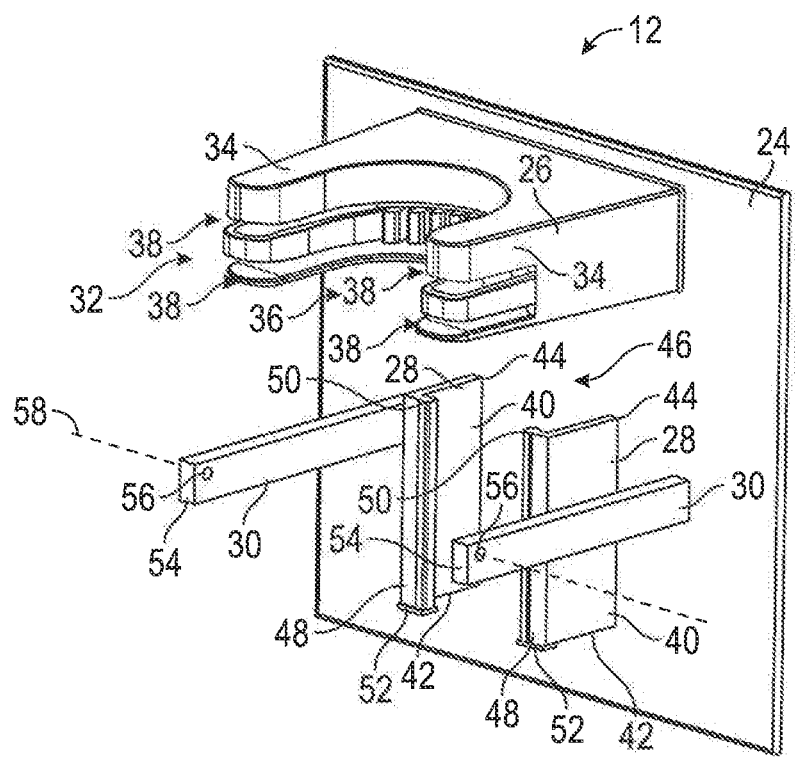
FIG. 2a is a front perspective view of a housing of the dispenser of FIG. 1.

As shown in FIG. 2a, the housing 12 includes a back panel 24, a pump mounting body 26, two track forming bodies 28, and two actuator mounting bodies 30. The back panel 24 is a flat, generally rectangular panel for mounting the housing 12 to a wall or other vertical support surface. The pump mounting body 26 extends forwardly from an upper portion of the back panel 24, and carries a mounting mechanism 32 for releaseably receiving and carrying the fluid pump 16. The mounting mechanism 32 includes two side arms 34 that are spaced laterally from each other, with a pump receiving cavity 36 defined therebetween. Each side arm 34 has two forwardly open pump receiving slots 38 that are spaced vertically from each other, and extend rearwardly towards the back panel 24. The pump receiving slots 38 are sized to receive corresponding mounting flanges 84 that extend radially from the piston chamber-forming body 78 of the fluid pump 16, as shown in FIG. 1.

The track forming bodies 28 extend forwardly from a lower portion of the back panel 24 below the pump mounting body 26, and are spaced laterally from each other with a mounting cavity 46 defined therebetween. Each track forming body 28 has a mounting wall 40 that extends forwardly from the back panel 24 to a front end 48, and vertically from a lower end 42 to an upper end 44. A t-shaped track member 50 extends laterally inwardly from the front end 48 of each mounting wall 40 towards the front end 48 of the other mounting wall 40, and a catch lip 52 extends forwardly from the lower end 42 of each mounting wall 40.

The actuator mounting bodies 30 extend forwardly from the lower portion of the back panel 24, and are spaced laterally outwardly from the track forming bodies 28. The actuator mounting bodies 30 each extend forwardly past the front end 48 of the track forming bodies 28 to a distal end 54. The distal end 54 of each actuator mounting body 30 has an actuator mounting channel 56 that extends through the actuator mounting body 30 along an actuator axis 58.

Figure 3:
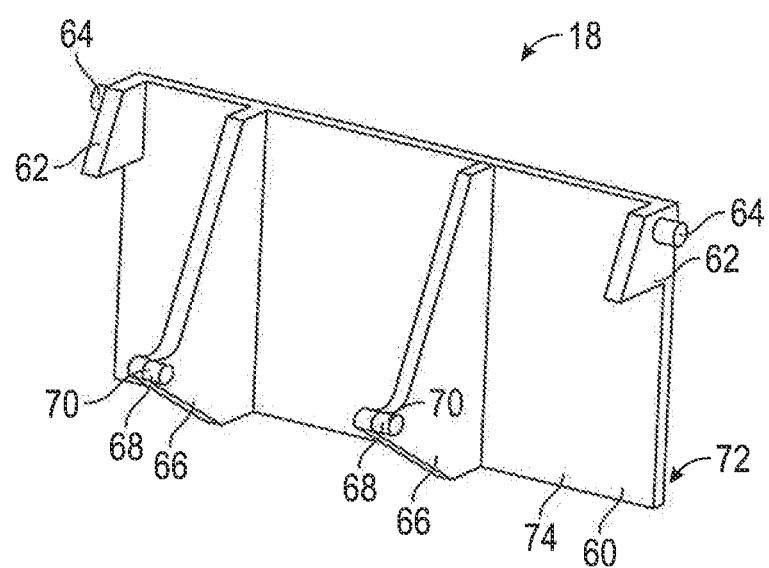
FIG. 3 is a rear perspective view of the actuator from the dispenser of FIG. 1.

The actuator 18 is shown in FIG. 3 as having a front panel 60, two mounting tabs 62, and two camming bodies 66. The front panel 60 is a rectangular panel having a flat front surface 72 and a rear surface 74. The mounting tabs 62 each extend rearwardly from a respective upper corner of the rear surface 74. A mounting pin 64 extends laterally outwardly from each of the mounting tabs 62. As seen on FIG. 1, the mounting pins 64 are each rotatably received by one of the actuator mounting channels 56 that extend through the actuator mounting bodies 30, thereby mounting the actuator 18 to the housing 12 and allowing the actuator 18 to pivot about the actuator axis 58 relative to the housing 12.

The camming bodies 66 are generally triangular projections that extend from the rear surface 74 of the front panel 60. The camming bodies 66 are spaced laterally from each other, and each carry at their rearwardly distal point a camming pin 68 that extends laterally towards a left hand side of the dispenser 10. The camming pins 68 each have a cylindrical outer surface that serves as a camming surface 70.

Figure 4:
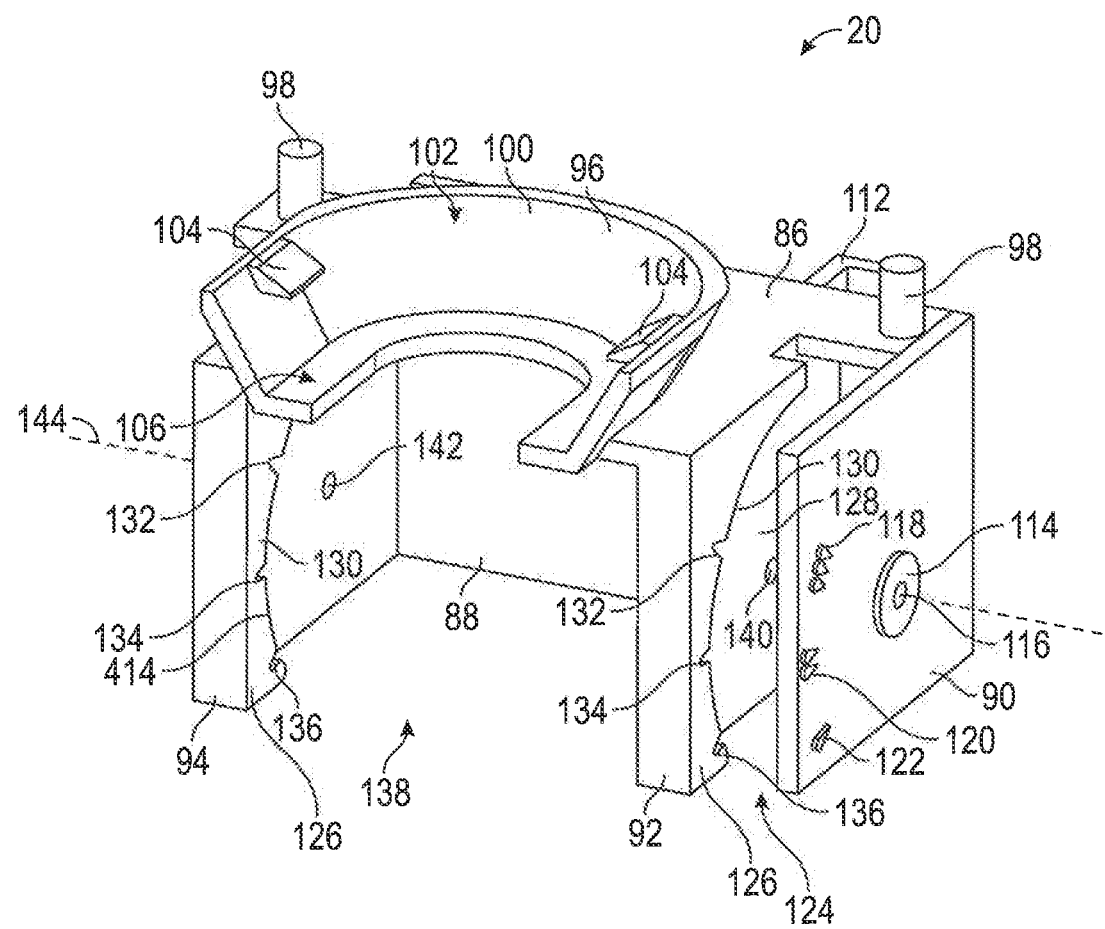
FIG. 4 is a front perspective view of a pump displacement body from the dispenser of FIG. 1.
Figure 5:
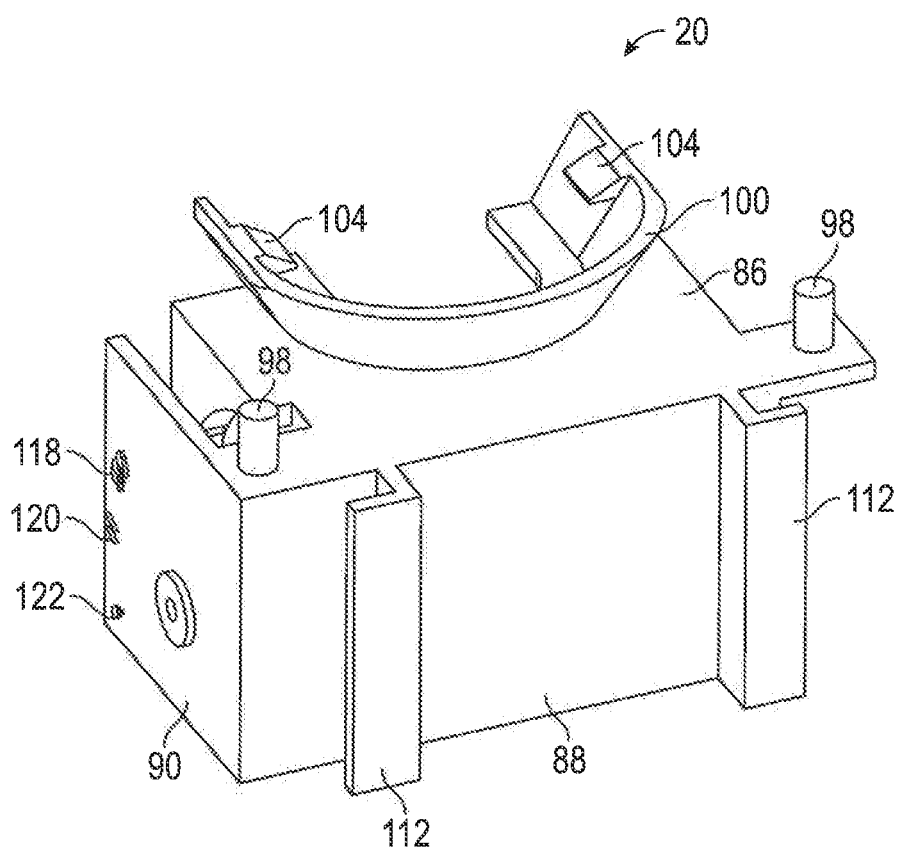
FIG. 5 is a rear perspective view of the pump displacement body of FIG. 4.

The pump displacement body 20 is shown in FIGS. 4 and 5 as having an upper wall 86, a rear wall 88, a dosage adjustment wall 90, a first cam receiving wall 92, and a second cam receiving wall 94. A pump engagement member 96 and two spring carrying pins 98 extend upwardly from the upper wall 86. The pump engagement member 96 has a generally cup-shaped outer wall 100 that defines an internal pump receiving cavity 102. Two pump engagement tabs 104 extend laterally inwardly from the left and right sides of the outer wall 100, spaced upwardly from the upper wall 86. At the center of the pump engagement member 96, there is a central opening 106 through the upper wall 86. The pump engagement member 96 is configured to engage with the piston-forming element 80 of the fluid pump 16, with a catch member 108 of the piston-forming element 80 received within the pump receiving cavity 102 between the upper wall 86 and the pump engagement tabs 104, and with a dispenser outlet 110 of the piston-forming element 80 extending downwardly through the central opening 106, as shown in FIGS. 1 and 2.

As shown in FIG. 5, two sliding connectors 112 extend rearwardly from the rear wall 88 of the pump displacement body 20. The sliding connectors 112 are spaced laterally from each other, and each sliding connector 112 has a generally L-shaped body that extends vertically from the upper wall 86 to the bottom of the rear wall 88. The sliding connectors 112 are configured to extend into the mounting cavity 46 between the track forming bodies 28 of the housing 12 for sliding engagement with the track members 50. The catch lip 52 is configured to engage with the bottom of the rear wall 88 to prevent the sliding connectors 112 from sliding below the lower end 42 of the track forming bodies 28. Biasing springs 188 extend between the spring carrying pins 98 and the pump mounting body 26, and bias the pump displacement body 20 downwardly towards the catch lip 52.

The dosage adjustment wall 90 extends forwardly from the right-hand side of the rear wall 88, and carries a cylindrical mounting platform 114. A first dosage adjustment channel 116 extends through the cylindrical mounting platform 114 and the dosage adjustment wall 90. Three dosage selection markers 118, 120, 122 are displayed on the dosage adjustment wall 90, forwardly from the cylindrical mounting platform 114. The uppermost marker 118 represents a high dosage setting, the middle marker 120 represents a medium dosage setting, and the lowermost marker 122 represents a low dosage setting.

The first cam receiving wall 92 is spaced laterally inwardly from the dosage adjustment wall 90, with a first cam cavity 124 defined therebetween. The first cam receiving wall 92 has a cam locking portion 126 at the front of the first cam receiving wall 92, and an indented central portion 128 that is indented laterally inwardly from the cam locking portion 126. A second dosage adjustment channel 140 extends through the indented central portion 128, and the cam locking portion 126 carries an arcuate cam locking surface 130 that faces towards the second dosage adjustment channel 140. The arcuate cam locking surface 130 serves as a cam locking mechanism 414. The cam locking surface 130 has three notches 132, 134, 136 that are spaced at different heights relative to the second dosage adjustment channel 140. The uppermost notch 132 is at approximately the same height as the high dosage marker 118 on the dosage adjustment wall 90, the middle notch 134 is at approximately the same height as the medium dosage marker 120 on the dosage adjustment wall 90, and the lowermost notch 136 is at approximately the same height as the low dosage marker 122 on the dosage adjustment wall 90.

The second cam receiving wall 94 extends forwardly from the left-hand side of the rear wall 88. A central cavity 138 is defined between the first cam receiving wall 92 and the second cam receiving wall 94, with the pump engagement member 96 positioned above the central cavity 138. The second cam receiving wall 94 has a cam locking portion 126 and an indented central portion 128, similarly to the first cam receiving wall 92. The indented central portion 128 of the second cam receiving wall 94 faces towards the first cam receiving wall 92, and has a third dosage adjustment channel 142 therethrough. The cam locking portion 126 of the second cam receiving wall 94 also has three notches 132, 134, 136 that are each at approximately the same height as the high dosage marker 118, the medium dosage marker 120, and the low dosage marker 122, respectively. The first dosage adjustment channel 116, the second dosage adjustment channel 140, and the third dosage adjustment channel 142 are all aligned along an adjustment axis 144.

Figure 6:
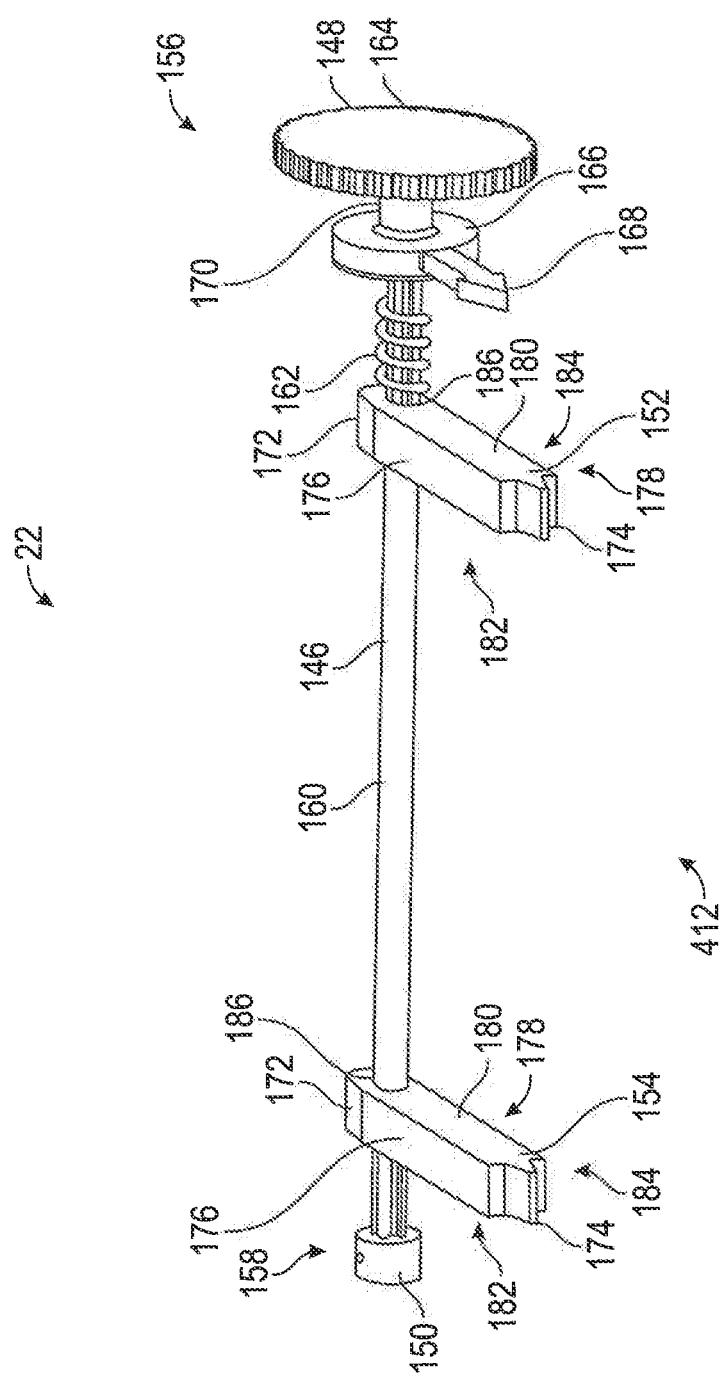
FIG. 6 is a front perspective view of a dosage adjustment member from the dispenser of FIG. 1.

The dosage adjustment member 22 is shown in FIG. 6 as including a shaft 146, an adjustment dial 148, a locking spring 162, a stop member 150, a first cam body 152, and a second cam body 154. The shaft 146 extends from a first end 156 to a second end 158, with a generally cylindrical center portion 160 therebetween. Both the first end 156 and the second end 158 have a keyed structure in which the outer surface of the shaft 146 has a number of circumferentially spaced indentations.

The adjustment dial 148 is attached to the first end 156 of the shaft 146, and includes an outer dial member 164 that is connected to an inner pointer member 166. The outer dial member 164 is a circular disc with a ridged circumferential surface. The inner pointer member 166 has a circular base portion from which an arrow-shaped pointer 168 extends radially. A connecting portion 170 connects the inner pointer member 166 to the outer dial member 164. The inner pointer member 166 has a central shaft receiving channel, not shown, which receives the first end 156 of the shaft 146. The central shaft receiving channel has a keyed structure that engages with the keyed structure of the first end 156 of the shaft 146. The engagement of the adjustment dial 148 with the shaft 146 allows the shaft 146 to be rotated in a clockwise or counter-clockwise direction by rotating the adjustment dial 148 in that direction.

The first cam body 152 is also attached to the first end 156 of the shaft 146, and is spaced from the adjustment dial 148 and positioned between the adjustment dial 148 and the cylindrical center portion 160 of the shaft 146. The first cam body 152 has a generally rectangular shape with a top surface 176, a bottom surface 178, a right surface 180, and a left surface 182, and extends from a rounded attachment end 172 to a pointed locking end 174. The bottom surface 178 of the first cam body 152 is provided as a cam surface 184. A keyed shaft receiving channel 186 extends through the attachment end 172 of the first cam body 152 from the right surface 180 to the left surface 182. The first end 156 of the shaft 146 extends through and engages with the shaft receiving channel 186. The engagement of the first cam body 152 with the shaft 146 allows the first cam body 152 to be rotated in a clockwise or counter-clockwise direction by rotating the shaft 146 in that direction.

The locking spring 162 is positioned in the space between the first cam body 152 and the adjustment dial 148, and engages with the right surface 180 of the first cam body 152. The first end 156 of the shaft 146 extends through the center of the locking spring 162.

The stop member 150 is attached to the second end 158 of the shaft 146 and has a cylindrical shape. The stop member 150 has a greater diameter than the shaft 146, and is selected to be larger than the diameter of the third dosage adjustment channel 142.

The second cam body 154 is also attached to the second end 158 of the shaft 146, and is spaced from the stop member 150 and positioned between the stop member 150 and the cylindrical center portion 160 of the shaft 146. The second cam body 154 has the same structure as the first cam body 152, including a top surface 176, a bottom surface 178, a right surface 180, a left surface 182, a rounded attachment end 172, a pointed locking end 174, and a keyed shaft receiving channel 186. The second end 158 of the shaft 146 extends through and engages with the shaft receiving channel 186 of the second cam body 154, and the engagement allows the second cam body 154 to be rotated in a clockwise or counter-clockwise direction by rotating the shaft 146 in that direction. The first cam body 152, the second cam body 154, and the pointer 168 all extend in the same radial direction from the shaft 146.

As shown in FIGS. 7 to 12, the dosage adjustment member 22 extends through the pump displacement body 20, with the shaft 146 passing through the first dosage adjustment channel 116, the second dosage adjustment channel 140, and the third dosage adjustment channel 142. Together, the dosage adjustment member 22 and the pump displacement body 20 serve as a dose adjustment mechanism 406. The dosage adjustment member 22 may also be referred to as a cam selection mechanism 412. The dosage adjustment member 22 is movable relative to the pump displacement body 20 between a locked position and an unlocked position, and between a high dosage setting, a medium dosage setting, and a low dosage setting.

Figure 7:
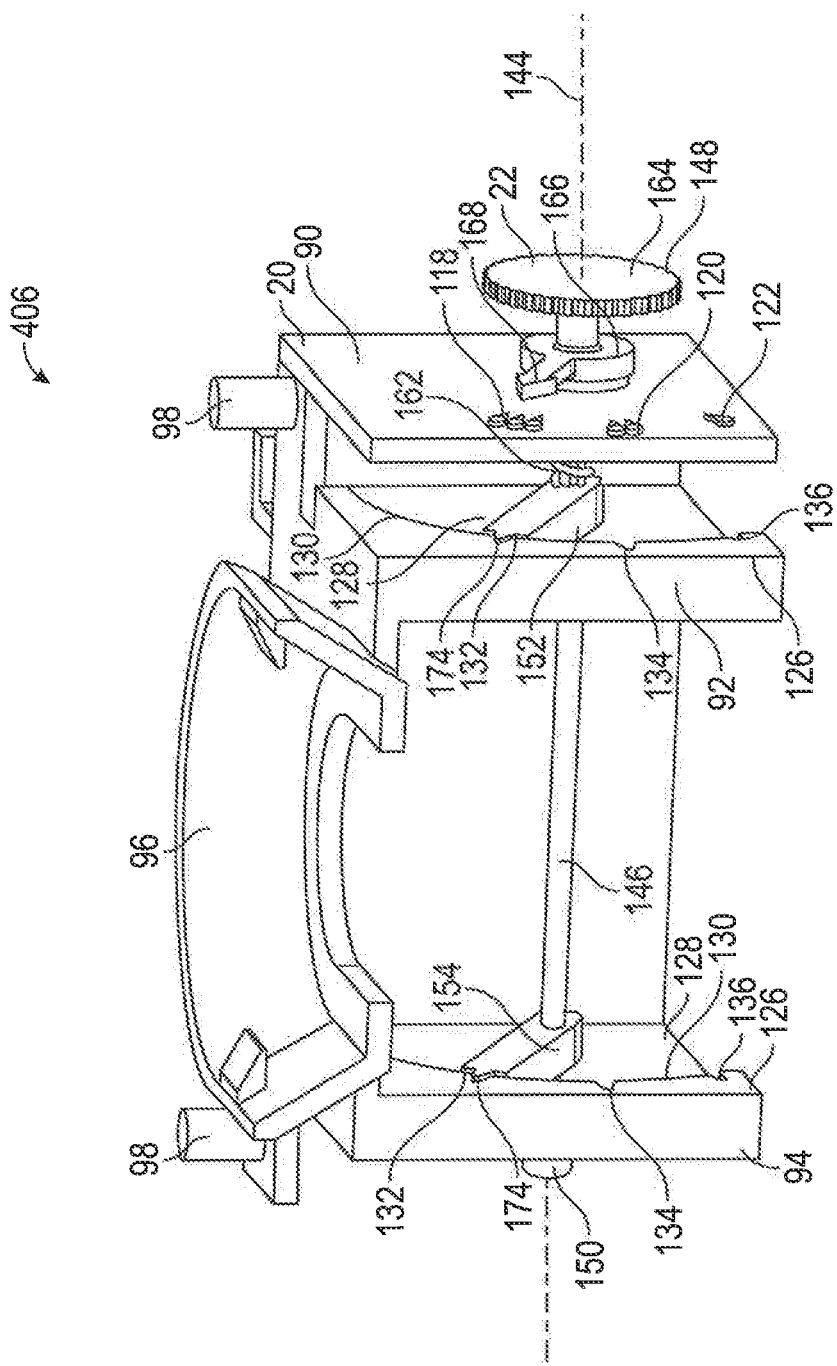
FIG. 7 is a front perspective view of the pump displacement body of FIG. 4 coupled to the dosage adjustment member of FIG. 6, with the dosage adjustment member in a locked position and rotated to a high dosage setting.

FIG. 7 shows the dosage adjustment member 22 in the locked position at the high dosage setting. When in the locked position, the inner pointer member 166 engages with the cylindrical mounting platform 114, the left surface 182 of the first cam body 152 engages with the first cam receiving wall 92, and the left surface 182 of the second cam body 154 engages with the second cam receiving wall 94. The pointed end 174 of the first cam body 152 also engages with one of the notches 132, 134, 136 in the arcuate locking surface 130 of the first cam receiving wall 92, and the pointed end 174 of the second cam body 154 engages with one of the notches 132, 134, 136 in the arcuate locking surface 130 of the second cam receiving wall 94. When at the high dosage setting, as in FIG. 7, the pointed end 174 of the first cam body 152 engages with the high dosage notch 132 of the first cam receiving wall 92, and the pointed end 174 of the second cam body 154 engages with the high dosage notch 132 of the second cam receiving wall 94. The engagement of the pointed ends 174 with the notches 132 prevents the dosage adjustment member 22 from rotating about the adjustment axis 144 while at the locked position. When at the high dosage setting, the pointed ends 174 of the first cam body 152 and the second cam body 154 are angled upwardly relative to the attachment ends 172.

Figure 8:
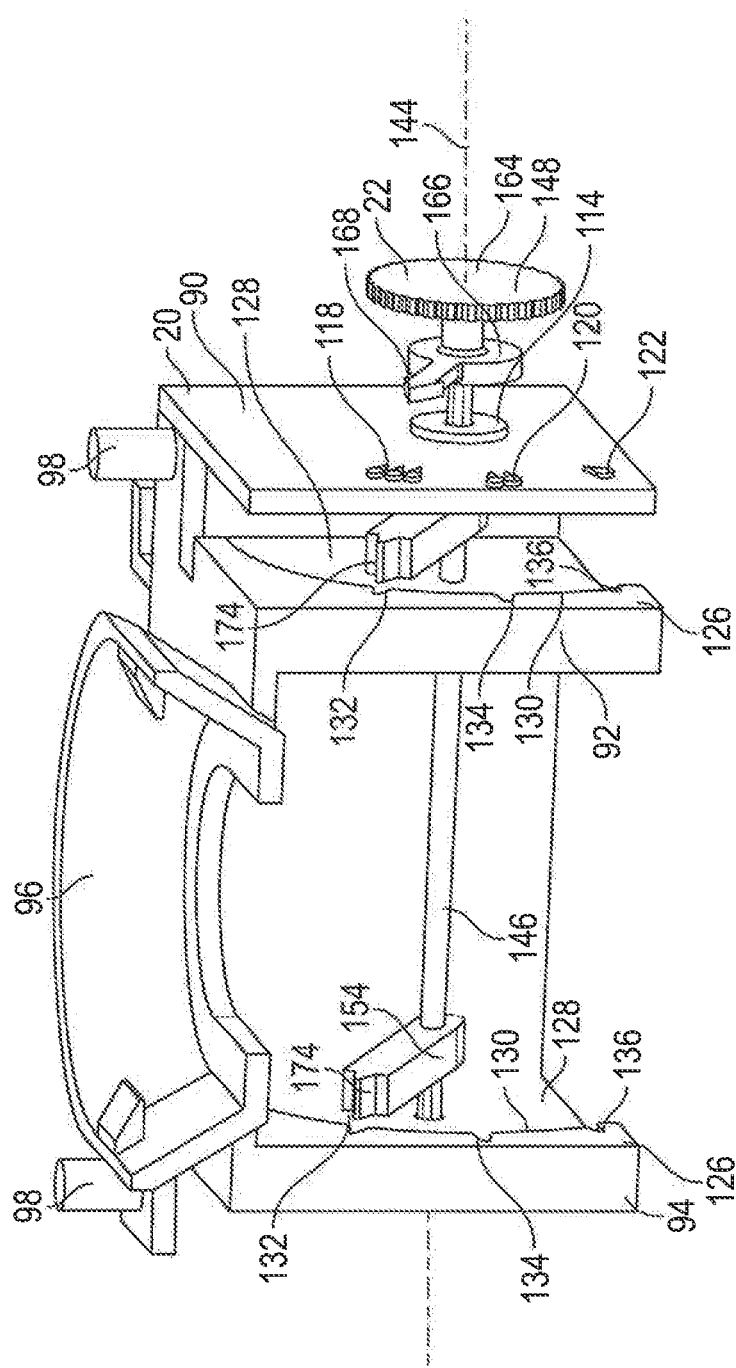
FIG. 8 is a front perspective view of the pump displacement body and the dosage adjustment member of FIG. 7, with the dosage adjustment member in an unlocked position and rotated to the high dosage setting.

The locking spring 162 extends between the right surface 180 of the first cam body 152 and the dosage adjustment wall 90, and biases the dosage adjustment member 22 towards the locked position. To move the dosage adjustment member 22 to the unlocked position, as shown in FIG. 8, the dosage adjustment member 22 is slid along the adjustment axis 144 to disengage the pointed ends 174 of the first cam body 152 and the second cam body 154 from the notches 132. This can be achieved by pulling the adjustment dial 148 away from the dosage adjustment wall 90 with sufficient force to overcome the biasing force of the locking spring 162.

Figure 9:
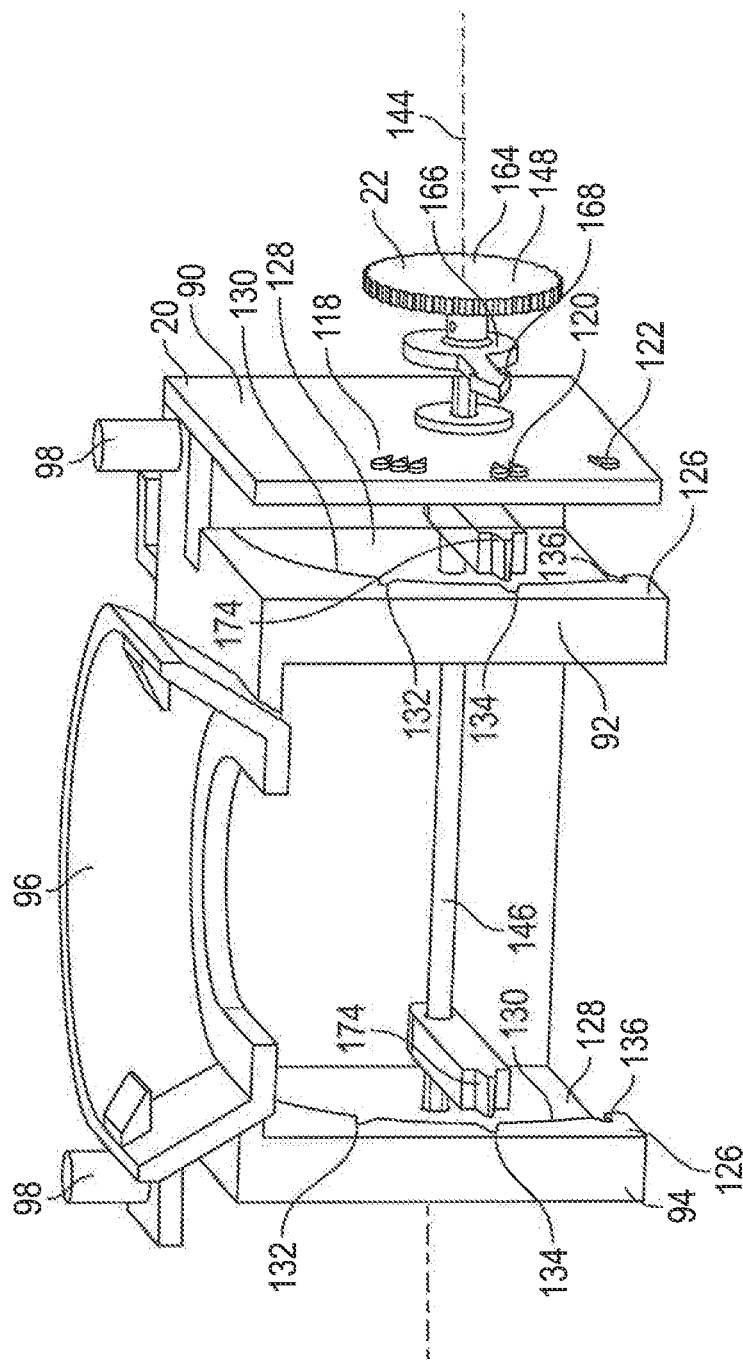
FIG. 9 is a front perspective view of the pump displacement body and the dosage adjustment member of FIG. 7, with the dosage adjustment member in an unlocked position and rotated to a medium dosage setting.
Figure 10:
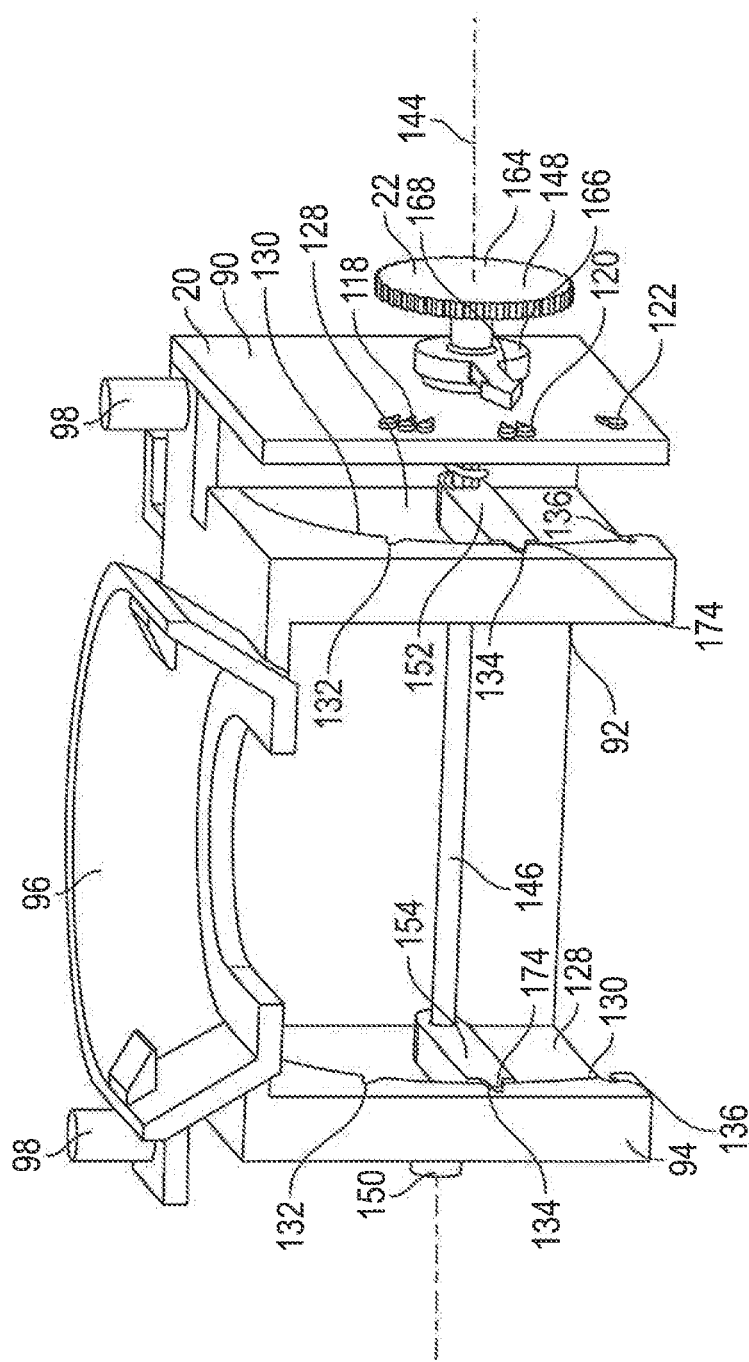
FIG. 10 is a front perspective view of the pump displacement body and the dosage adjustment member of FIG. 7, with the dosage adjustment member in the locked position and rotated to the medium dosage setting.

Once the pointed ends 174 of the first cam body 152 and the second cam body 154 are disengaged from the notches 132, the dosage adjustment member 22 is in the unlocked position and can be rotated about the adjustment axis 144 to the desired dosage setting. For example, the dosage adjustment member 22 can be rotated to the medium dosage setting, as shown in FIG. 9, by rotating the adjustment dial 148 in a counter-clockwise direction until the pointed ends 174 of the first cam body 152 and the second cam body 154 are aligned with the medium dosage notches 134, and the pointer 168 is aligned with the medium dosage selection marker 120. Upon release of the adjustment dial 148, under the biasing force of the locking spring 162, the dosage adjustment member 22 slides along the adjustment axis 144 to the locked position, as shown in FIG. 10, with the pointed ends 174 of the first cam body 152 and the second cam body 154 engaged with the medium dosage notches 134. When at the medium dosage setting, the pointed ends 174 of the first cam body 152 and the second cam body 154 are angled approximately horizontally relative to the attachment ends 172.

Figure 11:
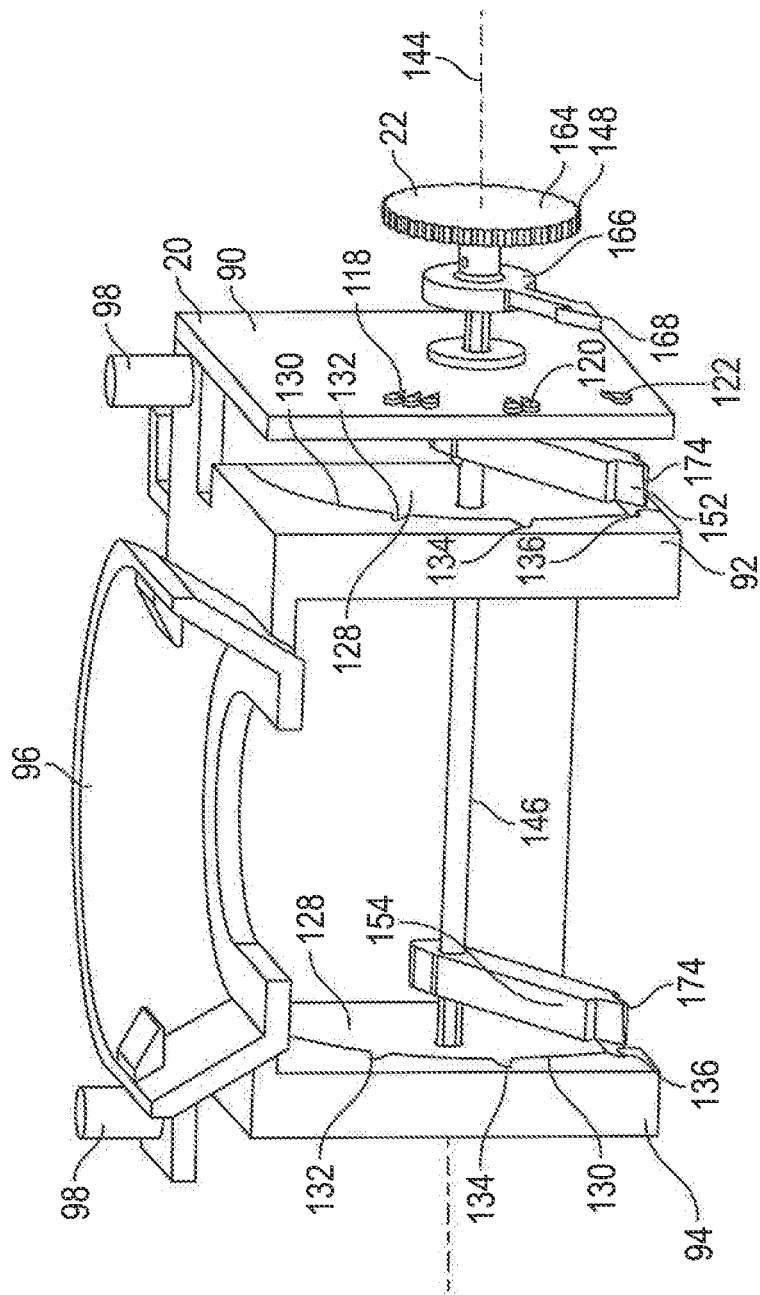
FIG. 11 is a front perspective view of the pump displacement body and the dosage adjustment member of FIG. 7, with the dosage adjustment member in the unlocked position and rotated to a low dosage setting.
Figure 12:
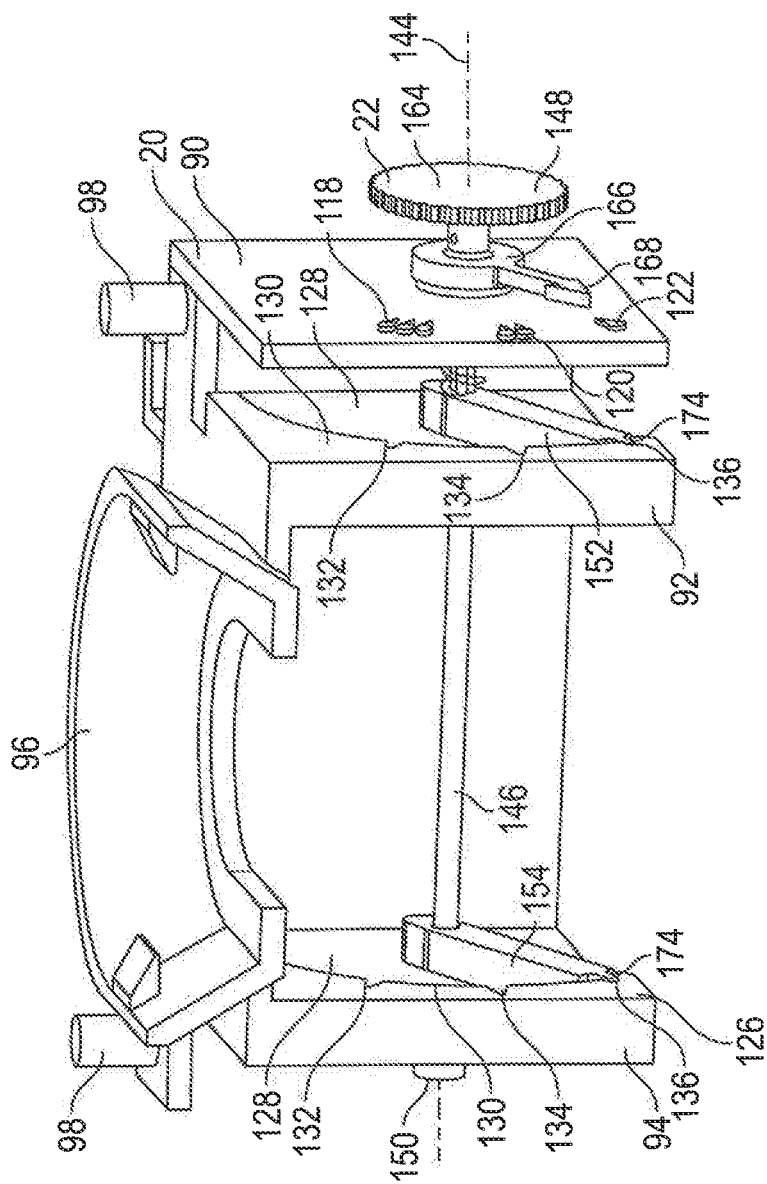
FIG. 12 is a front perspective view of the pump displacement body and the dosage adjustment member of FIG. 7, with the dosage adjustment member in the locked position and rotated to the low dosage setting.
Figure 13:
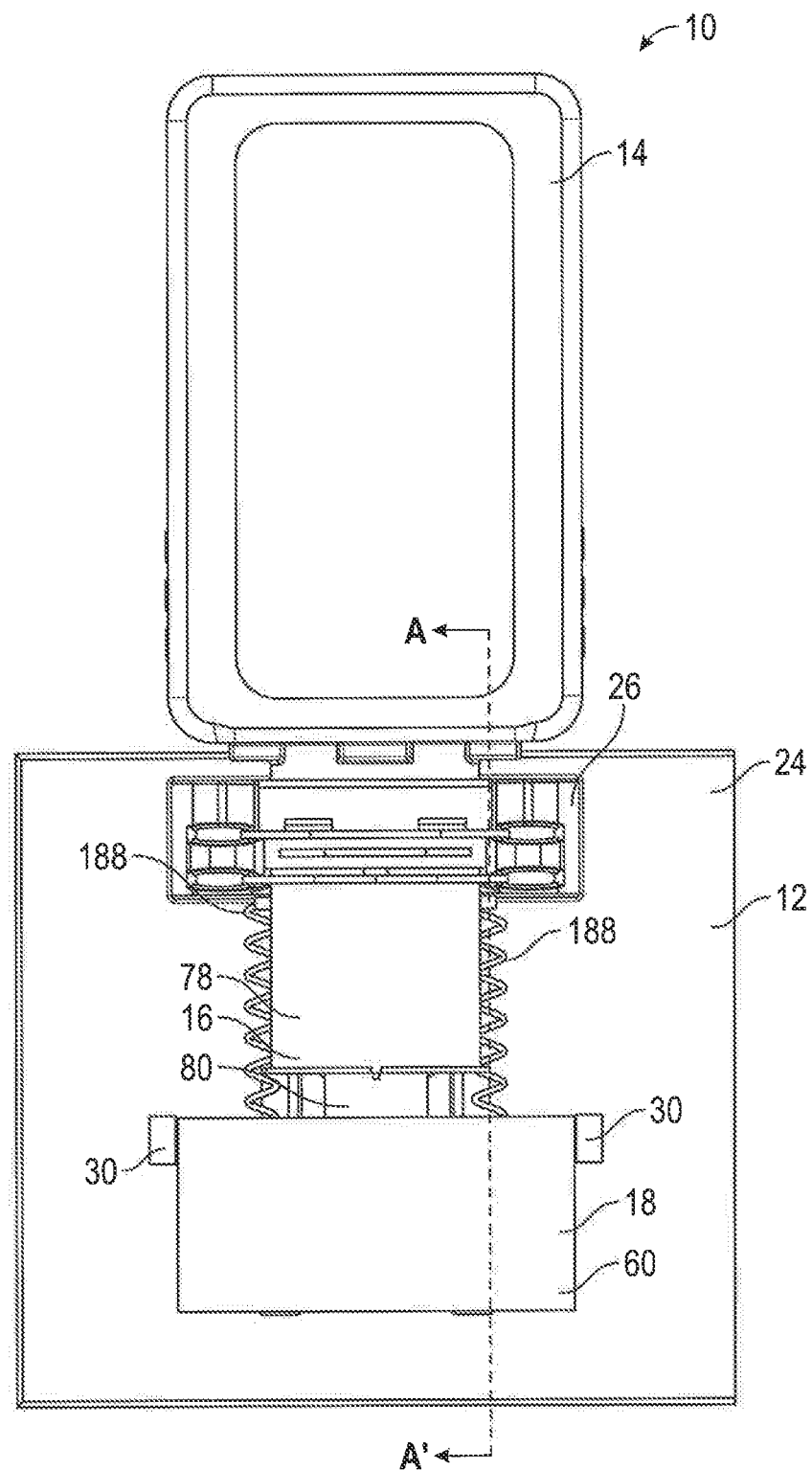
FIG. 13 is a front view of the dispenser of FIG. 1.

The dosage adjustment member 22 can also be moved to the low dosage setting by first sliding the dosage adjustment member 22 along the adjustment axis 144 to the unlocked position, as shown in FIG. 9, and then rotating the dosage adjustment member 22 further in the counter-clockwise direction until the pointed ends 174 of the first cam body 152 and the second cam body 154 are aligned with the low dosage notches 136, and the pointer 168 is aligned with the low dosage selection marker 122, as shown in FIG. 11. Upon release of the adjustment dial 148, under the biasing force of the locking spring 162, the dosage adjustment member 22 slides along the adjustment axis 144 to the locked position, as shown in FIG. 12, with the pointed ends 174 of the first cam body 152 and the second cam body 154 engaged with the low dosage notches 136. When at the low dosage setting, the pointed ends 174 of the first cam body 152 and the second cam body 154 are angled downwardly relative to the attachment ends 172.

Figure 14:
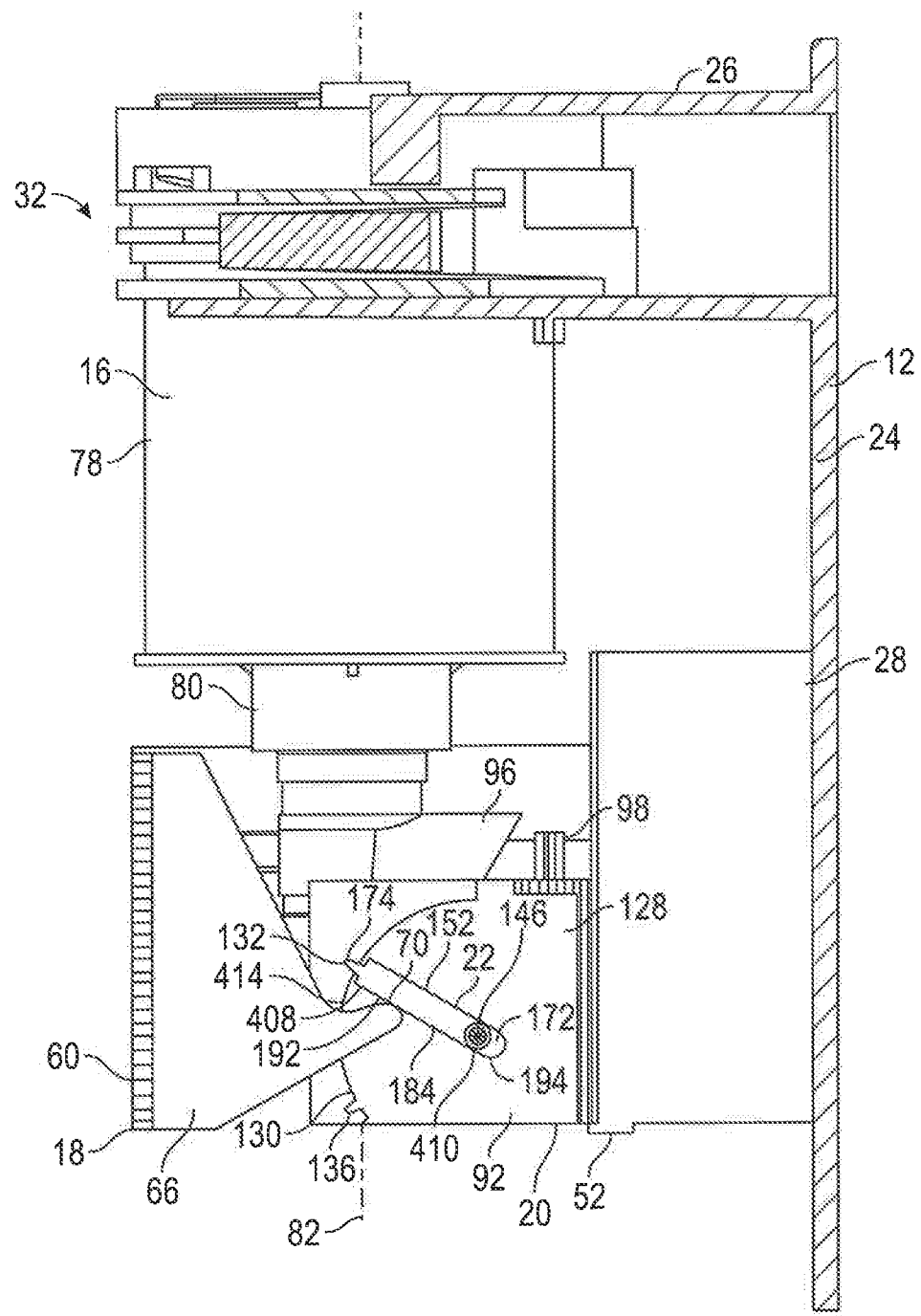
FIG. 14 is a cross-sectional side view of the dispenser of FIG. 13 taken along line A-A' in FIG. 13, with two springs and a fluid reservoir omitted, and with the actuator at the first position and the dosage adjustment member at the high dosage setting.

The operation of the fluid dispenser 10 will now be described with reference to FIGS. 1 to 19. When fully assembled and ready for use, the fluid dispenser 10 appears as shown in FIG. 1. The biasing springs 188 that extend between the pump mounting body 26 and the pump displacement body 20 bias the pump displacement body 20 downwardly, away from the pump mounting body 26. As shown in FIG. 14, this brings the cam surfaces 184 of the first cam body 152 and the second cam body 154 into engagement with the camming surfaces 70 of the actuator 18. This biases the actuator 18 towards the first position shown in FIGS. 1 and 14, in which the front panel 60 is substantially parallel with the back panel 24.

As shown in FIG. 14, when the dosage adjustment member 22 is at the high dosage setting, the biasing force of the springs 188 brings the pump displacement body 20 into engagement with the catch lips 52 of the track forming bodies 28. This prevents the pump displacement body 20 from sliding below the catch lips 52, and also prevents the engagement of the cam surfaces 184 with the camming surfaces 70 from pivoting the actuator 18 forwardly past the first position. Preferably, the fluid dispenser 10 includes an additional mechanism that prevents the actuator 18 from pivoting forwardly past the first position. For example, the actuator mounting bodies 30 may include stop tabs 190, as shown in FIGS. 1 and 2 only, which extend over the front surface 72 of the actuator 18 and prevent the actuator 18 from pivoting forwardly past the stop tabs 190.

Figure 15:
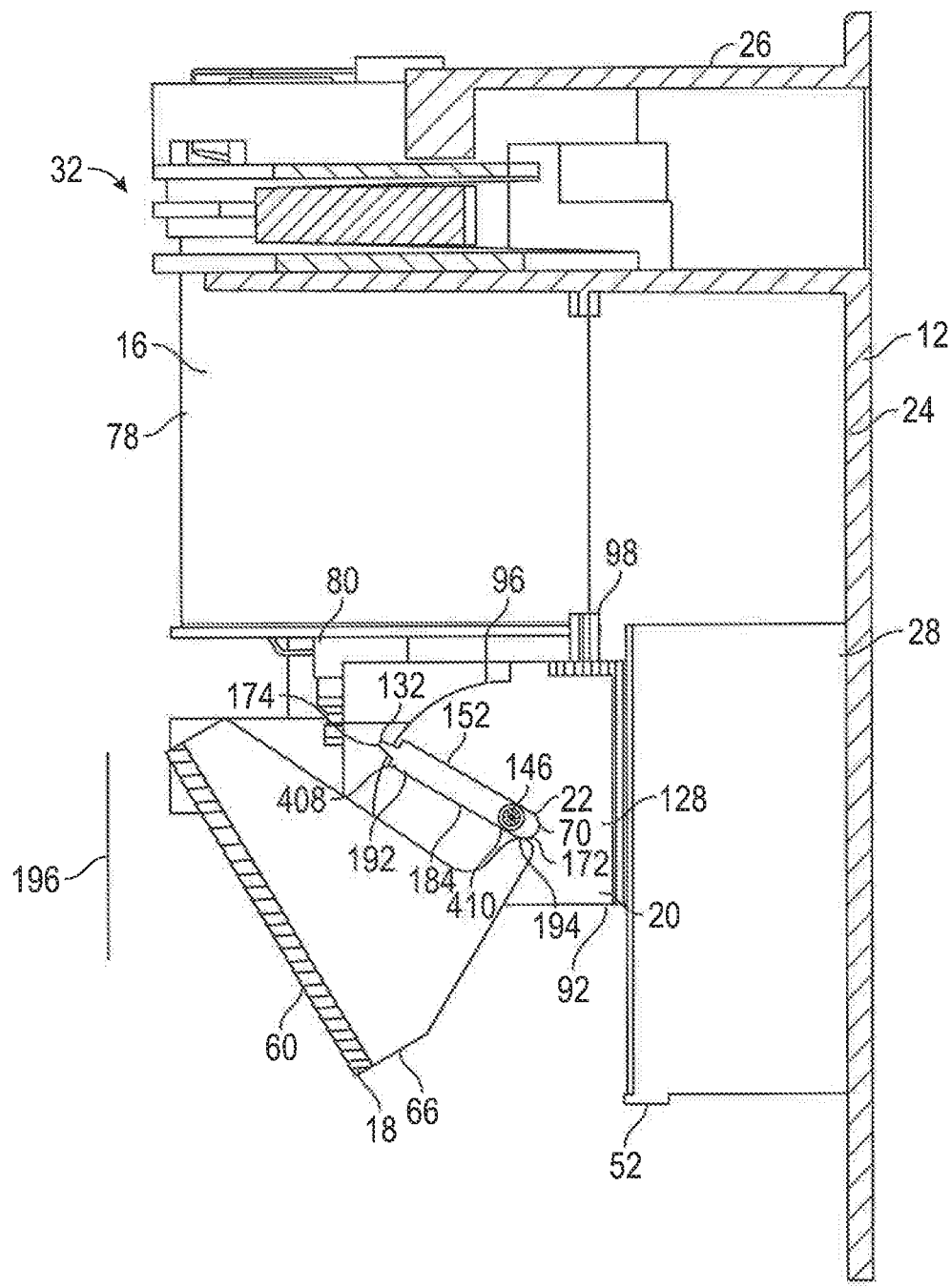
FIG. 15 is a cross-sectional side view of the dispenser of FIG. 14, with the actuator rotated to the second position and the dosage adjustment member at the high dosage setting.

To dispense fluid, the front panel 60 of the actuator 18 is manually depressed so as to overcome the biasing force of the springs 188 and pivot the actuator 18 about the actuator axis 58 from the first position, shown in FIGS. 1 and 14, to the second position, shown in FIGS. 2 and 15. The movement of the actuator 18 from the first position to the second position causes the camming surfaces 70 to move upwardly and rearwardly relative to the housing 12. The engagement of the camming surfaces 70 with the cam surfaces 184 during this movement causes the pump displacement body 20 to slide upwardly along the track members 50. The upwards movement of the pump displacement body 20 moves the piston-forming element 80 along the pump axis 82 inwardly relative to the piston chamber-forming body 78, from a high dosage extended position, as shown in FIG. 14, to a retracted position, as shown in FIG. 15.

Upon release of the actuator 18, the pump displacement body 20 slides downwardly along the track members 50 under the biasing force of the springs 188. This downwards movement of the pump displacement body 20 draws the piston-forming element 80 along the pump axis 82 outwardly relative to the piston chamber-forming body 78, from the retracted position to the high dosage extended position. The reciprocal movement of the piston-forming element 80 relative to the piston chamber-forming body 78 causes the fluid pump 16 to dispense an allotment of fluid from the dispenser outlet 110.

The volume of fluid that is dispensed upon activation of the fluid pump 16 depends on the distance that the piston-forming element 80 travels between the extended position and the retracted position. The distance between the extended position and the retracted position, and thus the volume of fluid that is dispensed, can be adjusted by changing the dosage setting of the dosage adjustment member 22.

When the dosage adjustment member 22 is at the high dosage setting, as shown in FIG. 14, front portions 192 of the cam surfaces 184 are oriented upwardly relative to the adjustment axis 144, that is, at a height above the height of the adjustment axis 144. The camming surfaces 70 engage with the front portions 192 of the cam surfaces 184 when the actuator 18 is at the first position, as shown in FIG. 14. The upwards orientation of the front portions 192 allows the pump displacement body 20 to slide down to the catch lips 52 under the biasing force of the springs 188, positioning the piston-forming element 80 at the high dosage extended position. The front portions 192 may also be referred to as the extended engagement portions 408 of the cam surfaces 184.

When the actuator 18 is pivoted from the first position to the second position, the camming surfaces 70 move rearwardly along the cam surfaces 184 from the front portions 192 to rear portions 194, as shown in FIG. 15. The rear portions 194 are positioned near the adjustment axis 144, and are at a height below the height of the front portions 192 when the dosage adjustment member 22 is at the high dosage setting. The engagement of the camming surfaces 70 with the rear portions 194 of the cam surfaces 184 when the actuator 18 is at the second position locates the pump displacement body 20 above the catch lips 52, and positions the piston-forming element 80 at the retracted position. The rear portions 194 may also be referred to as the retracted engagement portions 410 of the cam surfaces 184. The distance between the high dosage extended position and the retracted position represents a high dosage stroke distance 196.

When the dosage adjustment member 22 is at the high dosage setting and the actuator 18 is pivoted from the first position to the second position, the piston-forming element 80 moves the high dosage stroke distance 196 from the high dosage extended position to the retracted position, which causes the fluid pump 16 to dispense a relatively large volume of the fluid from the dispenser outlet 110.

If the user of the dispenser 10 desires a smaller volume of fluid to be dispensed, the dosage adjustment member 22 can be set to a different dosage setting, following the procedure as described above. To select the medium dosage setting, the adjustment dial 148 is pulled outwardly away from the dosage adjustment wall 90 from the locked position to the unlocked position, and rotated about the adjustment axis 144 in the counter-clockwise direction until the pointer 168 is aligned with the medium dosage marker 120. Upon release of the adjustment dial 148, the dosage adjustment member 22 slides back into the locked position under the biasing force of the locking spring 162.

Figure 16:
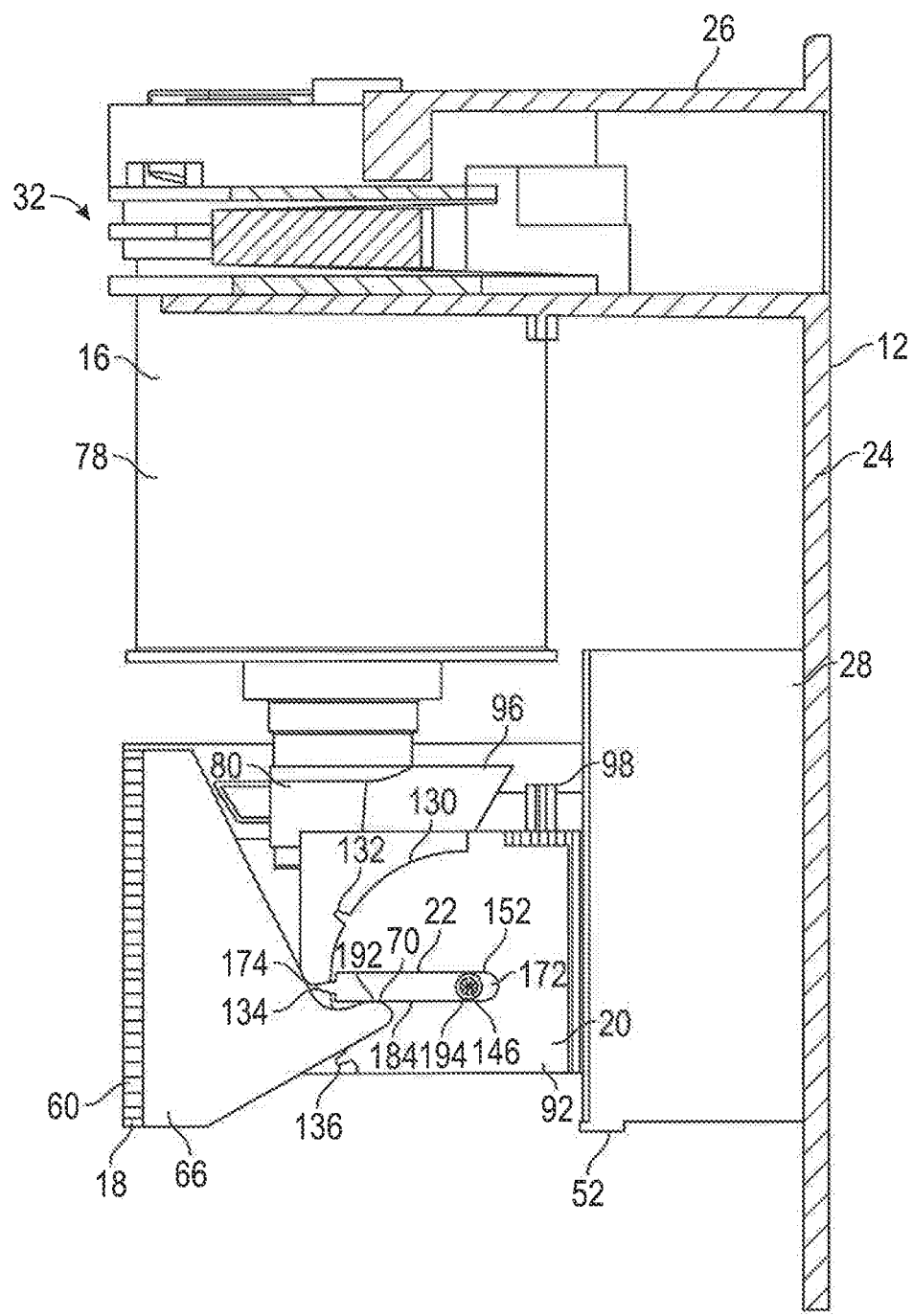
FIG. 16 is a cross-sectional side view of the dispenser of FIG. 14, with the actuator at the first position and the dosage adjustment member at the medium dosage setting.

When the dosage adjustment member 22 is at the medium dosage setting, as shown in FIG. 16, the front portions 192 of the cam surfaces 184 are oriented horizontally at approximately the same height as the adjustment axis 144. The camming surfaces 70 engage with the front portions 192 of the cam surfaces 184 when the actuator 18 is at the first position, as shown in FIG. 16. The horizontal orientation of the front portions 192 prevents the pump displacement body 20 from sliding all of the way down to the catch lips 52. The pump displacement body 20 is thus positioned relatively higher when the dosage adjustment member 22 is at the medium dosage setting and the actuator 18 is at the first position, compared to when the dosage adjustment member 22 is at the high dosage setting and the actuator 18 is at the first position. The higher position of the pump displacement body 20 locates the piston-forming element 80 at a medium dosage extended position, as shown in FIG. 16, which is located inwardly along the pump axis 82 in comparison to the high dosage extended position, as shown in FIG. 14.

Figure 17:
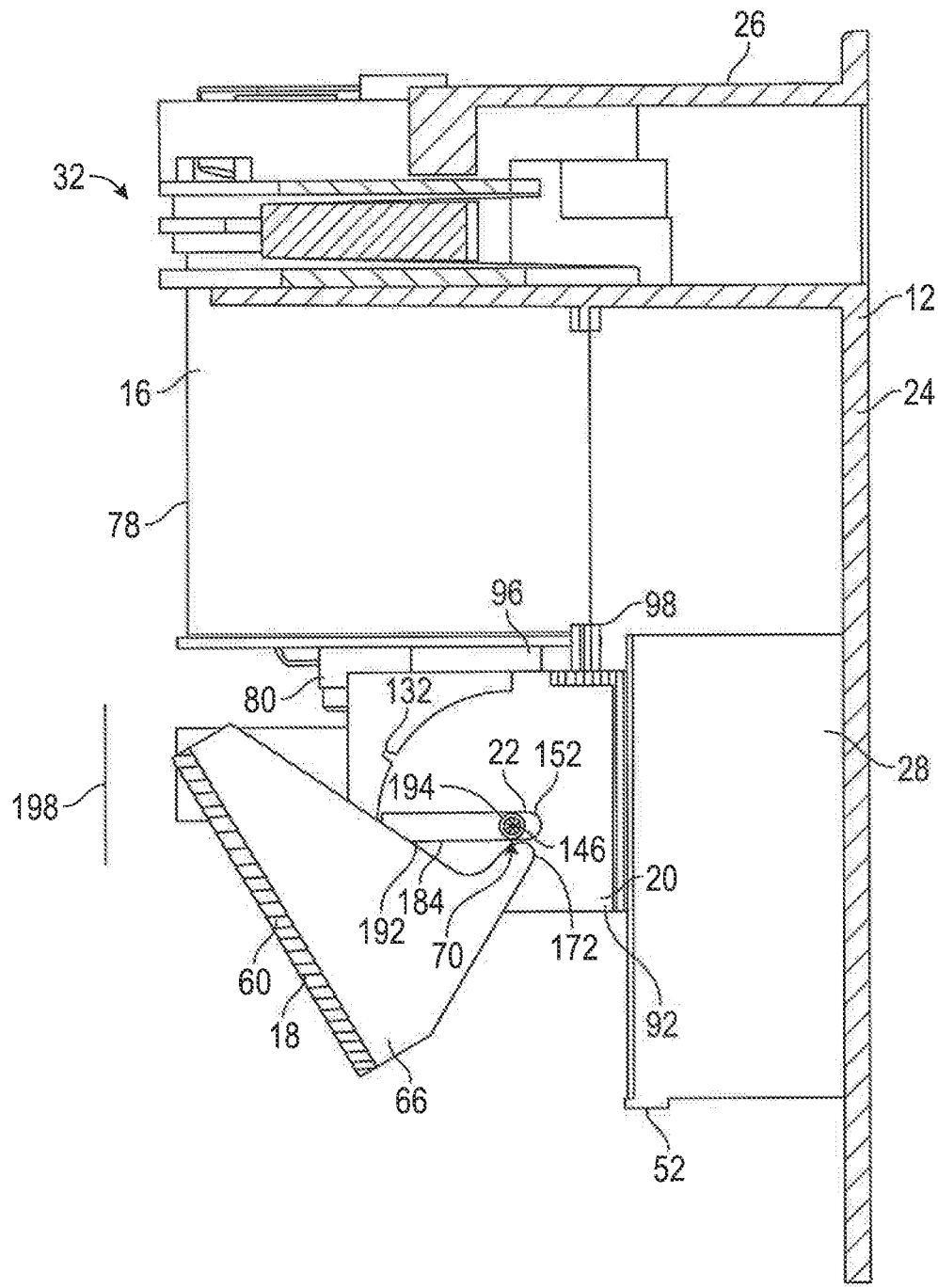
FIG. 17 is a cross-sectional side view of the dispenser of FIG. 14, with the actuator rotated to the second position and the dosage adjustment member at the medium dosage setting.

When the actuator 18 is pivoted from the first position to the second position, the camming surfaces 70 move rearwardly along the cam surfaces 184 from the front portions 192 to the rear portions 194, as shown in FIG. 17. Because the rear portions 194 are positioned near the adjustment axis 144, the height of the rear portions 194 relative to the adjustment axis 144 is relatively unchanged when at the medium dosage setting, as shown in FIG. 17, compared to when at the high dosage setting, as shown in FIG. 15. The piston-forming element 80 is thus located at approximately the same retracted position when the dosage adjustment member 22 is at the medium dosage setting and the actuator 18 is at the second position, as shown in FIG. 17, as when the dosage adjustment member 22 is at the high dosage setting and the actuator 18 is at the second position, as shown in FIG. 15.

The distance between the medium dosage extended position and the retracted position represents a medium dosage stroke distance 198. The medium dosage stroke distance 198 is smaller than the high dosage stroke distance 196, because the medium dosage extended position is located inwardly along the pump axis 82 in comparison to the high dosage extended position, and because the retracted position is approximately the same at both the medium dosage setting and the high dosage setting.

When the dosage adjustment member 22 is at the medium dosage setting and the actuator 18 is pivoted from the first position to the second position, the piston-forming element 80 moves the medium dosage stroke distance 198 from the medium dosage extended position to the retracted position, which causes the fluid pump 16 to dispense a smaller volume of fluid compared to when the dosage adjustment member 22 is at the high dosage setting, due to the shorter stroke distance.

The dosage adjustment member 22 can also be set to the low dosage setting by unlocking the dosage adjustment member 22 and rotating the adjustment dial 148 about the adjustment axis 144 until the pointer 168 is aligned with the low dosage marker 122.

Figure 18:
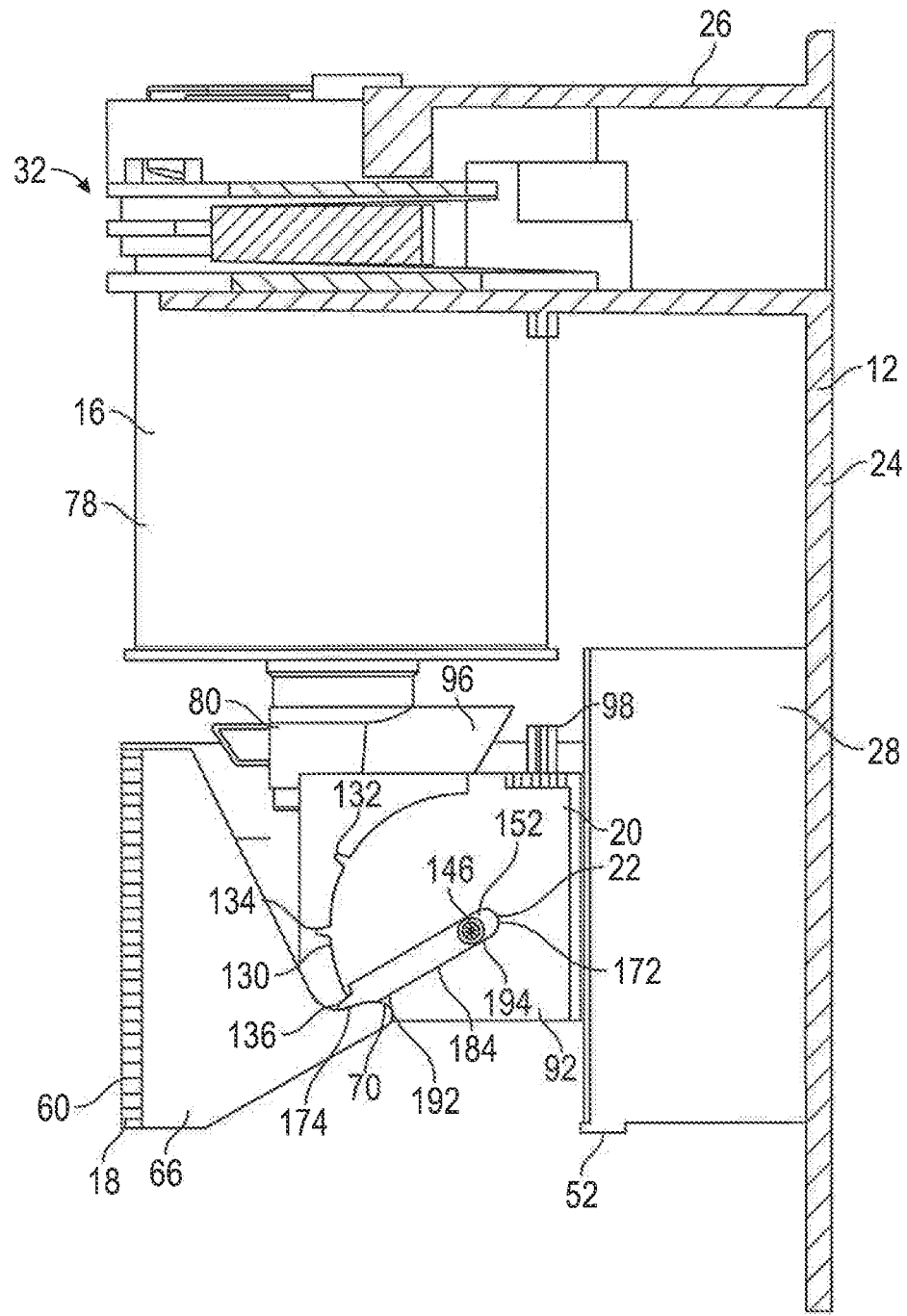
FIG. 18 is a cross-sectional side view of the dispenser of FIG. 14, with the actuator at the first position and the dosage adjustment member at the low dosage setting.

When the dosage adjustment member 22 is at the low dosage setting, as shown in FIG. 18, the front portions 192 of the cam surfaces 184 are oriented downwardly relative to the adjustment axis 144, that is, at a height below the height of the adjustment axis 144. The camming surfaces 70 engage with the front portions 192 of the cam surfaces 184 when the actuator 18 is at the first position, as shown in FIG. 18. The downwards orientation of the front portions 192 positions the pump displacement body 20 higher when the dosage adjustment member 22 is at the low dosage setting and the actuator 18 is at the first position, compared to when the dosage adjustment member 22 is at the medium dosage setting and the actuator 18 is at the first position. The higher position of the pump displacement body 20 locates the piston-forming element 80 at a low dosage extended position, as shown in FIG. 18, which is located inwardly along the pump axis 82 in comparison to the medium dosage extended position, as shown in FIG. 16.

Figure 19:
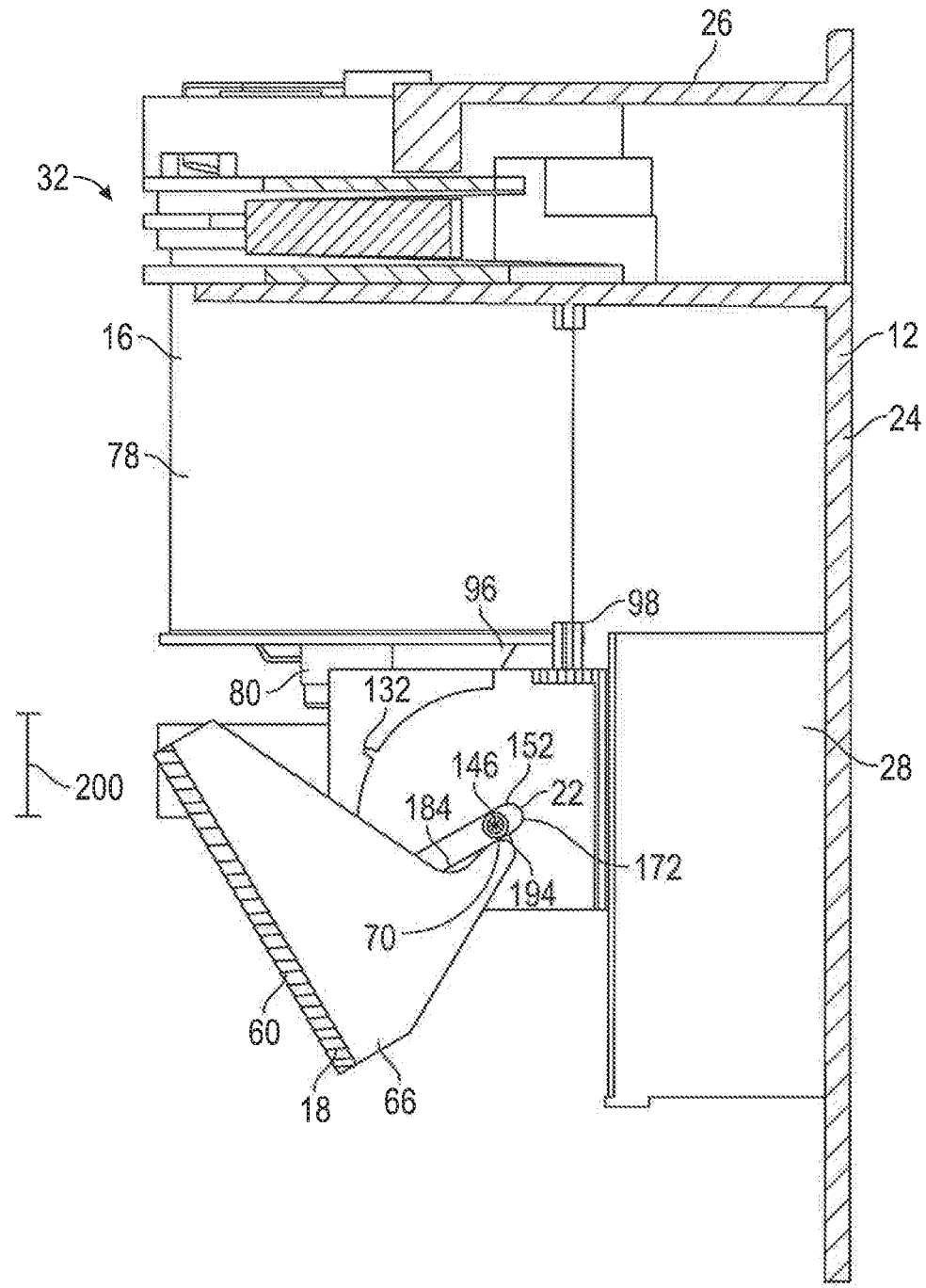
FIG. 19 is a cross-sectional side view of the dispenser of FIG. 14, with the actuator rotated to the second position and the dosage adjustment member at the low dosage setting.

When the actuator 18 is pivoted from the first position to the second position, the camming surfaces 70 move rearwardly along the cam surfaces 184 from the front portions 192 to the rear portions 194, as shown in FIG. 19. Because the rear portions 194 are positioned near the adjustment axis 144, the height of the rear portions 194 relative to the adjustment axis 144 is relatively unchanged when at the low dosage setting, as shown in FIG. 19, compared to when at the high dosage setting, as shown in FIG. 15, and when at the medium dosage setting, as shown in FIG. 17. The piston-forming element 80 is thus located at approximately the same retracted position when the dosage adjustment member 22 is at the low dosage setting and the actuator 18 is at the second position, as shown in FIG. 19, as when the dosage adjustment member 22 is at the high dosage setting and the actuator 18 is at the second position, as shown in FIG. 15, and when the dosage adjustment member 22 is at the medium dosage setting and the actuator 18 is at the second position, as shown in FIG. 17.

The distance between the low dosage extended position and the retracted position represents a low dosage stroke distance 200. The low dosage stroke distance 200 is smaller than the medium dosage stroke distance 198, because the low dosage extended position is located inwardly along the pump axis 82 in comparison to the medium dosage extended position, and because the retracted position is approximately the same at both the low dosage setting and the medium dosage setting.

When the dosage adjustment member 22 is at the low dosage setting and the actuator 18 is pivoted from the first position to the second position, the piston-forming element 80 moves the low dosage stroke distance 200 from the low dosage extended position to the retracted position, which causes the fluid pump 16 to dispense a smaller volume of fluid compared to when the dosage adjustment member 22 is at the medium dosage setting, due to the shorter stroke distance.

The fluid dispenser 10 thus allows for the selection of three different dosage volumes by pivoting the dosage adjustment member 22 about the adjustment axis 144 between the high dosage setting, the medium dosage setting, and the low dosage setting. Furthermore, no matter which dosage setting is selected, on movement of the actuator 18 from the first position to the second position, the pump 16 always returns to substantially the same retracted position. The pump 16 can thus be configured so that the piston-forming element 80 fully retracts into the piston chamber-forming body 78 with each complete stroke, regardless of the dosage setting. This helps to prevent air from becoming entrapped in the pump 16, which could otherwise cause priming or dosage consistency issues.

The actuator 18 also pivots the same distance from the first position to the second position regardless of the dosage setting that is selected, and effects movement of the piston-forming element 80 for the entire duration of the movement from the first position to the second position. In other words, the dosage adjustment mechanism does not introduce a lost link between the actuator 18 and the pump 16 that could otherwise cause the actuator 18 to feel loose. These features help to improve the user experience by giving the feel of a complete stroke no matter which dosage setting is selected. The mechanism also provides a mechanical advantage at the lower dosage settings, since the same movement of the actuator 18 is used to effect a smaller stroke distance of the pump 16.

Figure 20:
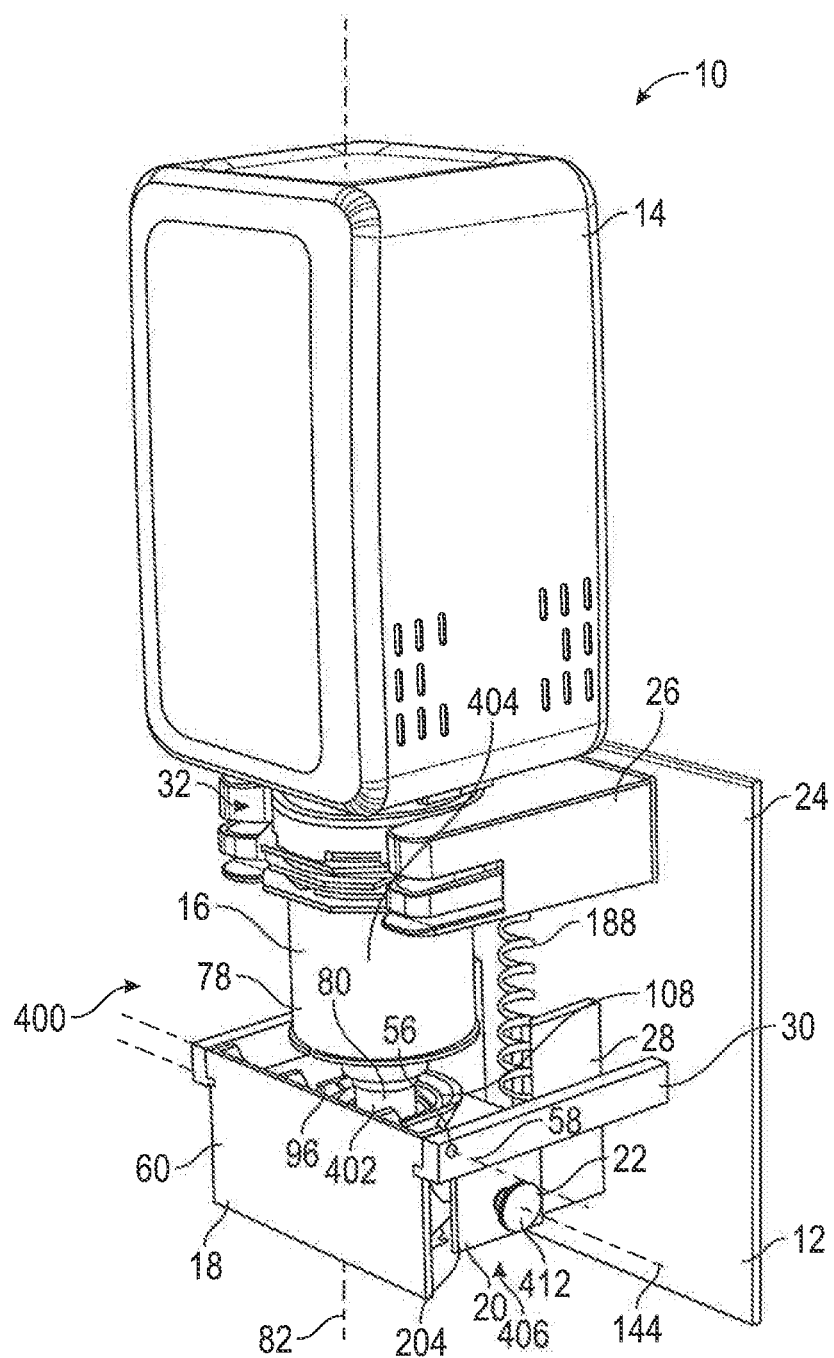
FIG. 20 is a front perspective view of a fluid dispenser in accordance with a second embodiment of the present invention.
Figure 21:
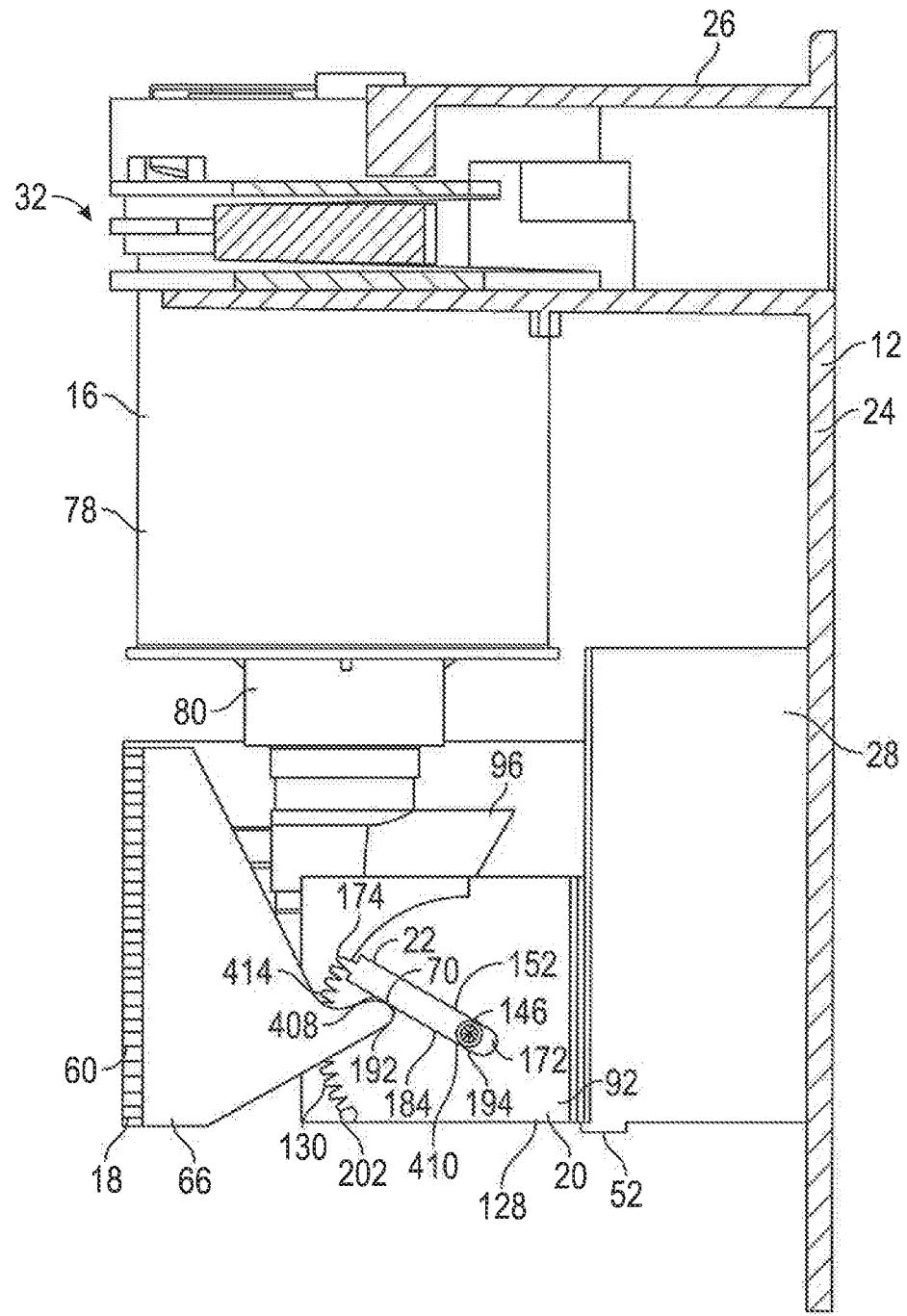
FIG. 21 is a cross-sectional side view of the dispenser of FIG. 20, with two springs and the fluid reservoir omitted.

Reference is now made to FIGS. 20 and 21, which depict a fluid dispenser 10 in accordance with a second embodiment of the invention. The fluid dispenser 10 shown in FIGS. 20 and 21 is identical to the dispenser 10 shown in FIGS. 1 to 19, with the exception that the arcuate cam locking surfaces 130 each carry thirteen adjacent dosage notches 202 in place of the high dosage notch 132, the medium dosage notch 134, and the low dosage notch 136. The dosage adjustment wall 90 also displays a single high-to-low dosage selection marker 204 in place of the separate high dosage selection marker 118, medium dosage selection marker 120, and low dosage selection marker 122. Like numerals are used to denote like components.

The fluid dispenser 10 as shown in FIGS. 20 and 21 operates in an identical fashion to the dispenser 10 shown in FIGS. 1 to 19, with the exception that the dosage adjustment member 22 provides a finer granularity of control over the dosage of fluid that is dispensed. As in the embodiment shown in FIGS. 1 to 19, in the embodiment shown in FIGS. 20 and 21 the dosage setting is adjusted by pulling the adjustment dial 148 away from the dosage adjustment wall 90, so that the pointed ends 174 of the first and second cam bodies 152, 154 disengage from the notches 202, and then rotating the adjustment dial 148 in a clockwise or counter clockwise direction to align the pointed ends 174 with different notches 202. Upon release of the adjustment dial 148, the pointed ends 174 of the first and second cam bodies 152, 154 engage with the aligned notches 202 under the bias of the locking spring 162. Each notch represents a different dosage setting that may be selected. There are thus thirteen different dosage settings that are available in the embodiment shown in FIGS. 20 and 21, compared to the three dosage settings in the embodiment shown in FIGS. 1 to 19.

As in the embodiment shown in FIGS. 1 to 19, in the embodiment shown in FIGS. 20 and 21 the selected dosage setting determines the position of the piston-forming element 80 relative to the piston chamber-forming body 78 when the actuator 18 is at the first position. The position of the piston-forming element 80 relative to the piston chamber-forming body 78 when the actuator 18 is at the first position may be referred to as the selected extended position. The distance between the selected extended position and the retracted position is the stroke distance, and determines the amount of fluid that is dispensed when the actuator 18 is pivoted from the first position to the second position. The amount of fluid that is dispensed can thus be controlled by rotating the dosage adjustment member 22 about the adjustment axis 144 to select the extended position of the piston-forming element 80. A higher dosage is selected by rotating the adjustment dial 148 in the clockwise direction, thereby selecting an extended position that is further outwards relative to the piston chamber-forming body 78, and a lower dosage is selected by rotating the adjustment dial 148 in the counter clockwise direction, thereby selecting an extended position that is further inwards relative to the piston chamber-forming body 78.

Reference is now made to FIGS. 22 to 25, which depict a fluid dispenser 10 in accordance with a third embodiment of the invention. The fluid dispenser 10 shown in FIGS. 22 to 25 is identical to the dispenser 10 shown in FIGS. 1 to 19, with the exception that the actuator 18 incorporates two rearwardly extending spring receiving arms 206, and the first and second cam bodies 152, 154 each incorporate a lower slot forming extension 208. Like numerals are used to denote like components.

Figure 22:
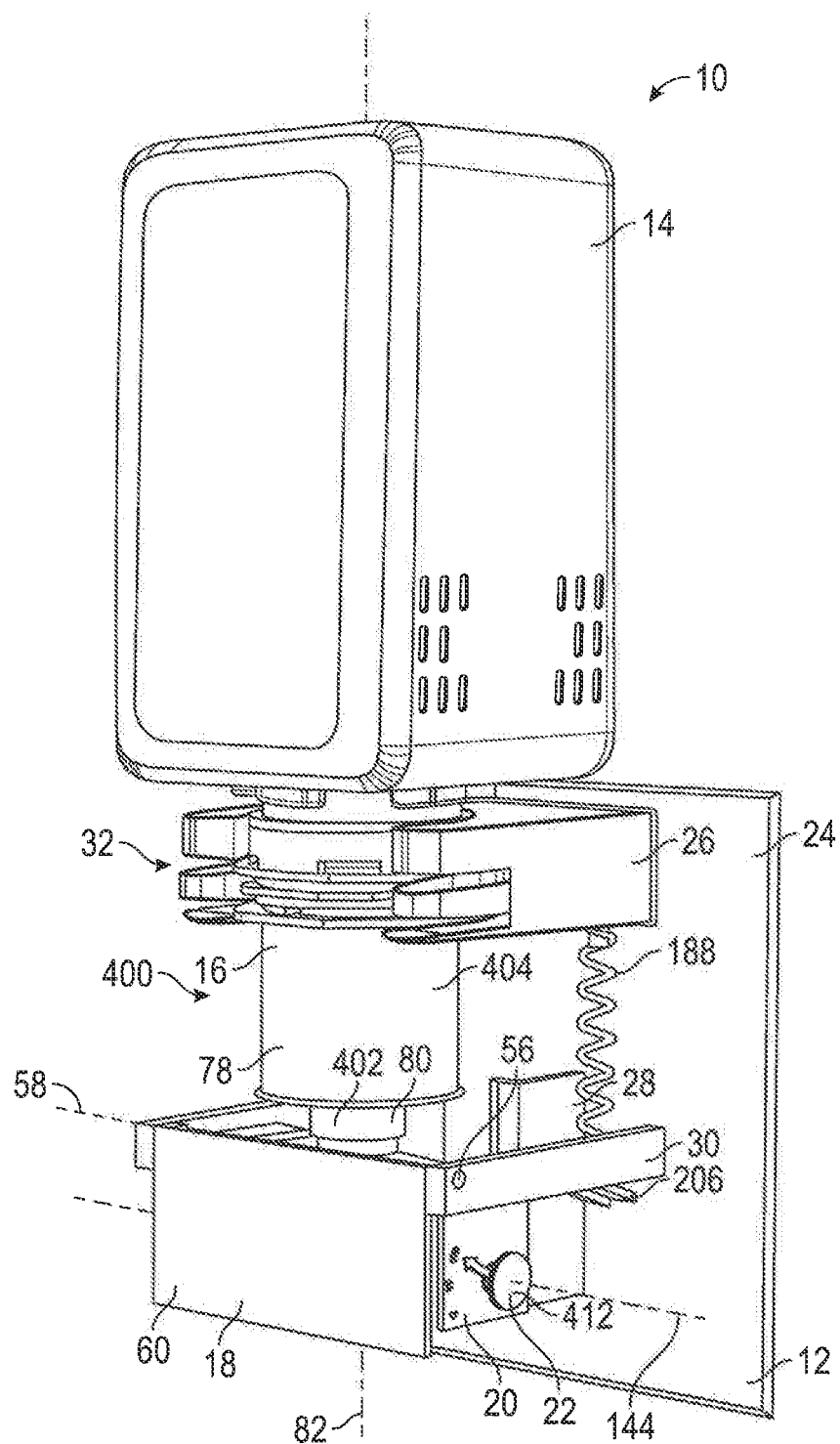
FIG. 22 is a front perspective view of a fluid dispenser in accordance with a third embodiment of the present invention.
Figure 23:
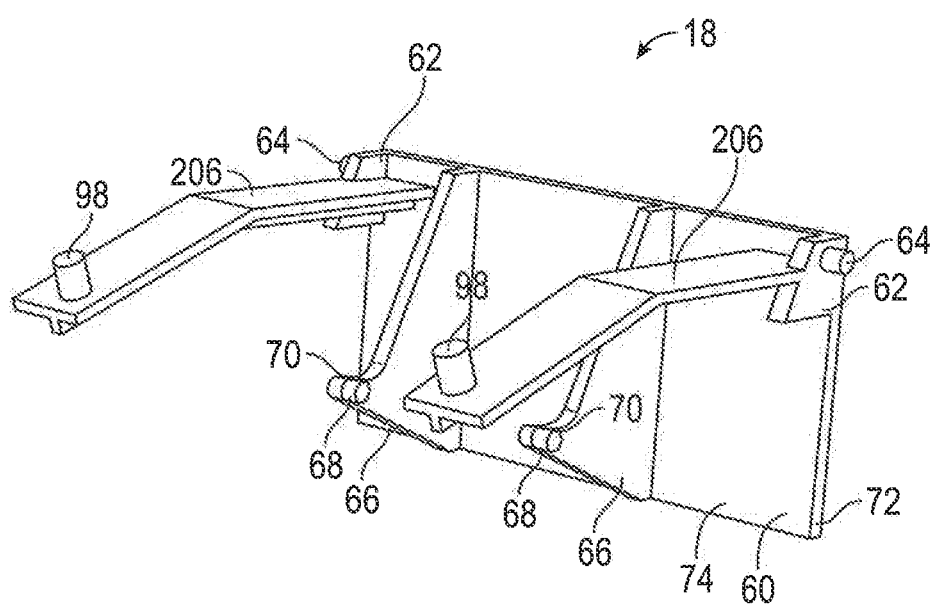
FIG. 23 is a rear perspective view of the actuator from the dispenser of FIG. 22.

The fluid dispenser 10 as shown in FIGS. 22 to 25 operates in an identical fashion to the dispenser 10 shown in FIGS. 1 to 19, with the exception that the biasing springs 188 act directly on the actuator 18 rather than the pump displacement body 20. As shown in FIG. 23, two spring receiving arms 206 extend rearwardly from the rear surface 74 of the actuator 18. Each spring receiving arm 206 has a spring carrying pin 98 that extends upwardly from an upper surface of the arm 206. As best seen in FIG. 22, the biasing springs 188 extend between the spring carrying pins 98 on the spring receiving arms 206 and the pump mounting body 26. The biasing springs 188 bias the spring receiving arms 206 downwardly, which pivotally biases the actuator 18 towards the first position.

Figure 24:
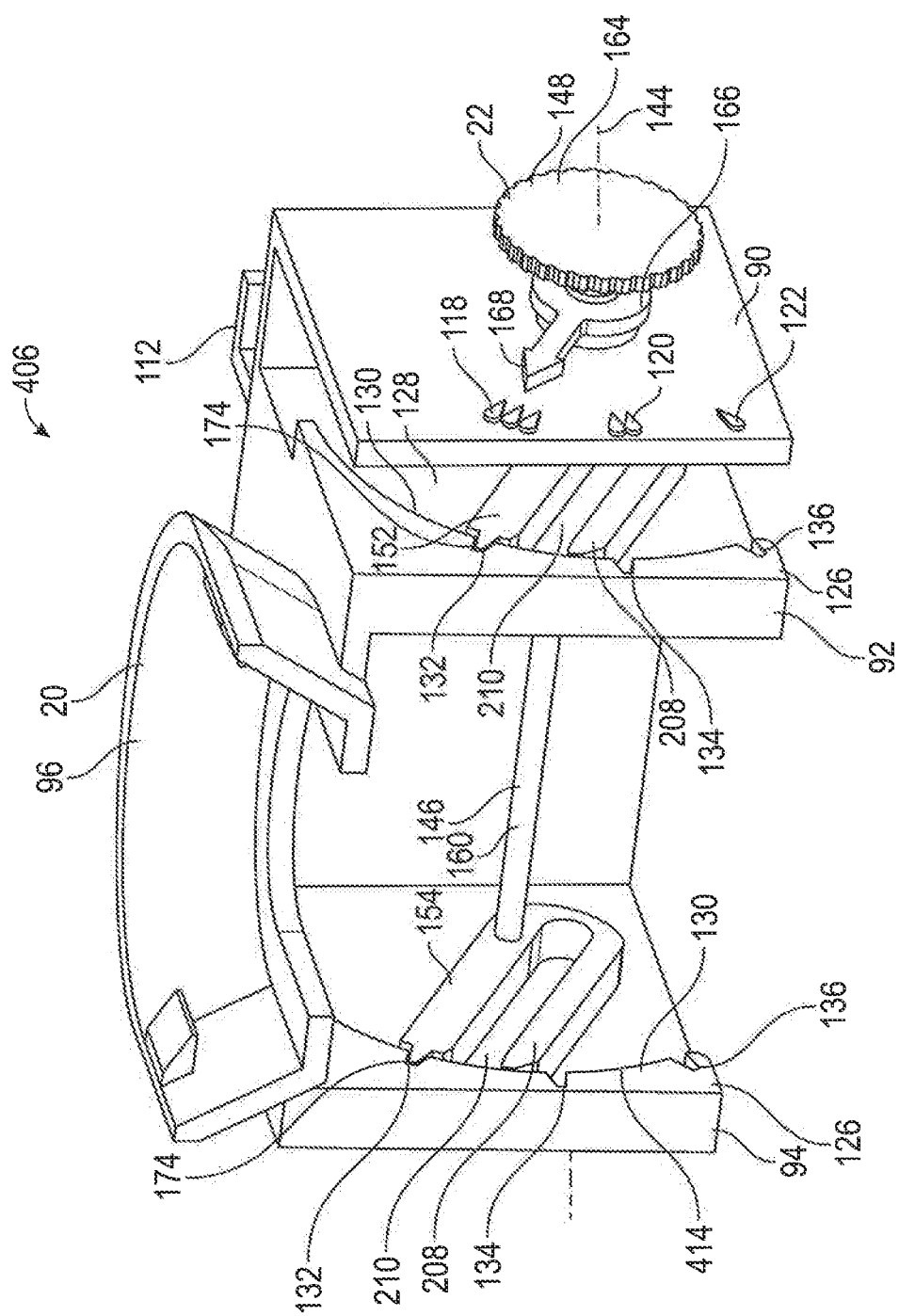
FIG. 24 is a front perspective view of the pump displacement body and the dosage adjustment member from the dispenser of FIG. 22.
Figure 25:
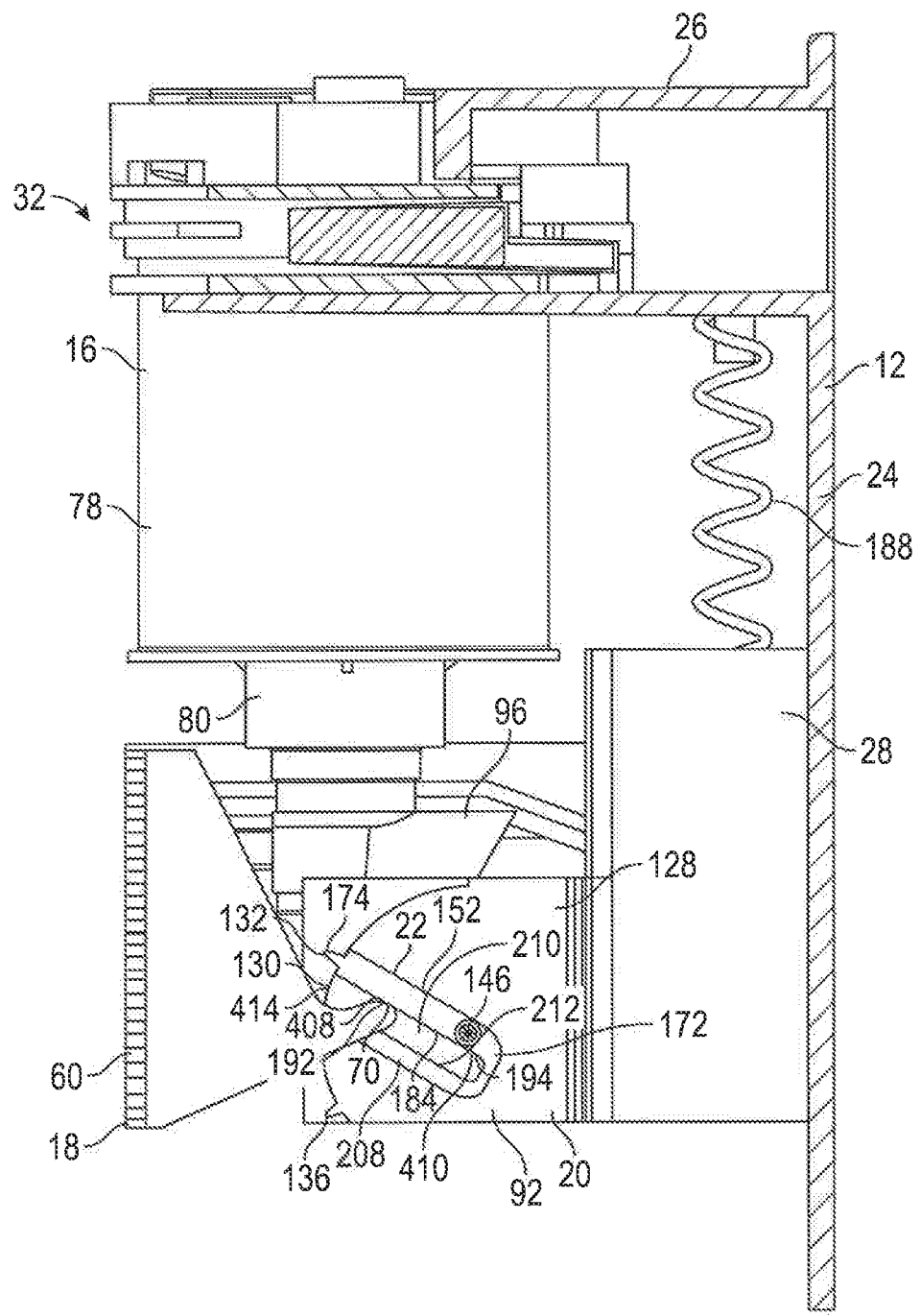
FIG. 25 is a cross-sectional side view of the dispenser of FIG. 22, with the fluid reservoir omitted.

As shown in FIGS. 24 and 25, the first and second cam bodies 152, 154 each have a lower slot forming extension 208 that extends parallel to the cam surface 184 and is spaced below the cam surface 184 so as to define a cam slot 210 therebetween. The camming pins 68 of the actuator 18 each extend into a respective one of the cam slots 210 and engage with the cam surface 184. As in the embodiments shown in FIGS. 1 to 21, when the actuator 18 is pivoted from the first position to the second position, the camming pins 68 move upwardly and rearwardly, with the engagement of the camming surfaces 70 and the cam surfaces 185 displacing the pump displacement body 20 and the piston-forming element 80 upwardly.

Upon release of the actuator 18, the biasing springs 188 pivot the actuator 18 back to the first position. This moves the camming pins 68 downwardly and forwardly, and brings each of the camming pins 68 into engagement with a second cam surface 212 on the lower slot forming extensions 208. The engagement of the camming pins 68 with the second cam surfaces 212 displaces the pump displacement body 20 and the piston-forming element 80 downwardly. As in the embodiments shown in FIGS. 1 to 21, the upwards and downwards movement of the pump displacement body 20 upon pivoting the actuator 18 between the first position and the second position moves the piston-forming element 80 between the selected extended position to the retracted position, causing the pump 16 to dispense a dosage of the fluid.

As in the embodiments shown in FIGS. 1 to 21, the dosage setting is adjusted by pulling the adjustment dial 148 away from the dosage adjustment wall 90, so that the pointed ends 174 of the first and second cam bodies 152, 154 disengage from the notches 132, 134, 136, and then rotating the adjustment dial 148 in a clockwise or counter clockwise direction to align the pointed ends 174 with different notches 132, 134, 136. Upon release of the adjustment dial 148, the pointed ends 174 of the first and second cam bodies 152, 154 engage with the aligned notches 132, 134, 136 under the bias of the locking spring 162. In the embodiment shown in FIGS. 22 to 25, the camming bodies 66 of the actuator 18 need to be sufficiently spaced from the first and second cam receiving walls 92, 94 to permit the first and second cam bodies 152, 154 to disengage from the notches 132, 134, 136 and move to the unlocked position without the lower slot forming extensions 208 being obstructed by the camming bodies 66.

Having the biasing springs 188 act directly on the actuator 18 rather than on the pump displacement body 20 provides the advantage that the biasing springs 188 do not need to be pre-compressed when a lower dosage setting is selected. This can improve the user experience by reducing the amount of force that is required to overcome the initial biasing force of the springs 188 when moving the actuator 18 from the first position to the second position at a lower dosage setting.

Reference is now made to FIGS. 26 to 36, which depict a fluid dispenser 10 in accordance with a fourth embodiment of the invention. The fluid dispenser 10 shown in FIGS. 26 to 36 is identical to the dispenser 10 shown in FIGS. 1 to 19, except for the structure of the pump displacement body 20 and the dosage adjustment member 22. The fluid dispenser 10 of FIGS. 26 to 36 also has a housing cover 214, which pivotally carries the actuator 18 in place of the actuator mounting bodies 30. Like numerals are used to denote like components.

Figure 26:
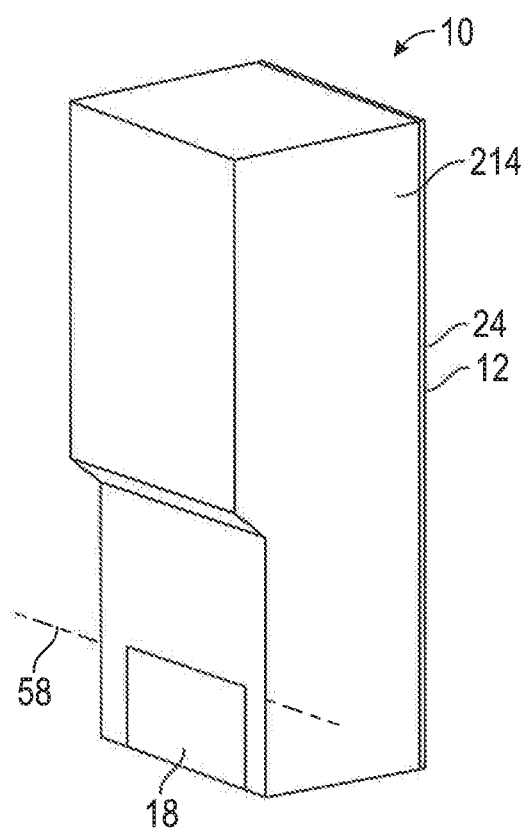
FIG. 26 is a front perspective view of a fluid dispenser in accordance with a fourth embodiment of the present invention.
Figure 27:
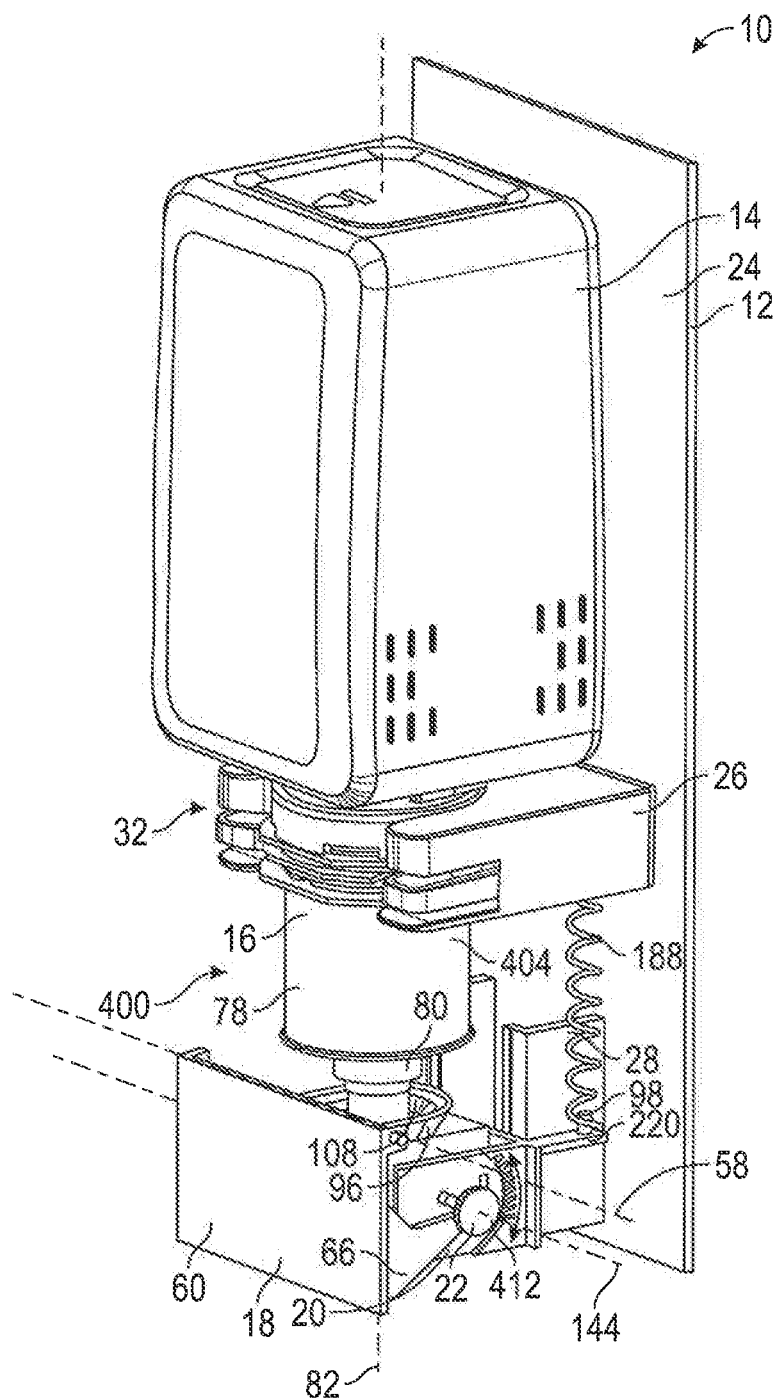
FIG. 27 is a front perspective view of the fluid dispenser of FIG. 26 with the housing cover removed.

As shown in FIG. 26, the fluid dispenser 10 according to the fourth embodiment of the invention has a housing cover 214, which is removably secured to the back panel 24 of the housing 12. Although not shown, the housing cover 214 has a pair of actuator mounting channels 56 that are identical to the actuator mounting channels 56 of the actuator mounting bodies 30 shown in FIG. 2a, and which receive the mounting pins 64 of the actuator 18 for pivotally mounting the actuator 18 to the housing 12 and allowing the actuator 18 to pivot about the actuator axis 58 relative to the housing 12.

Figure 28:
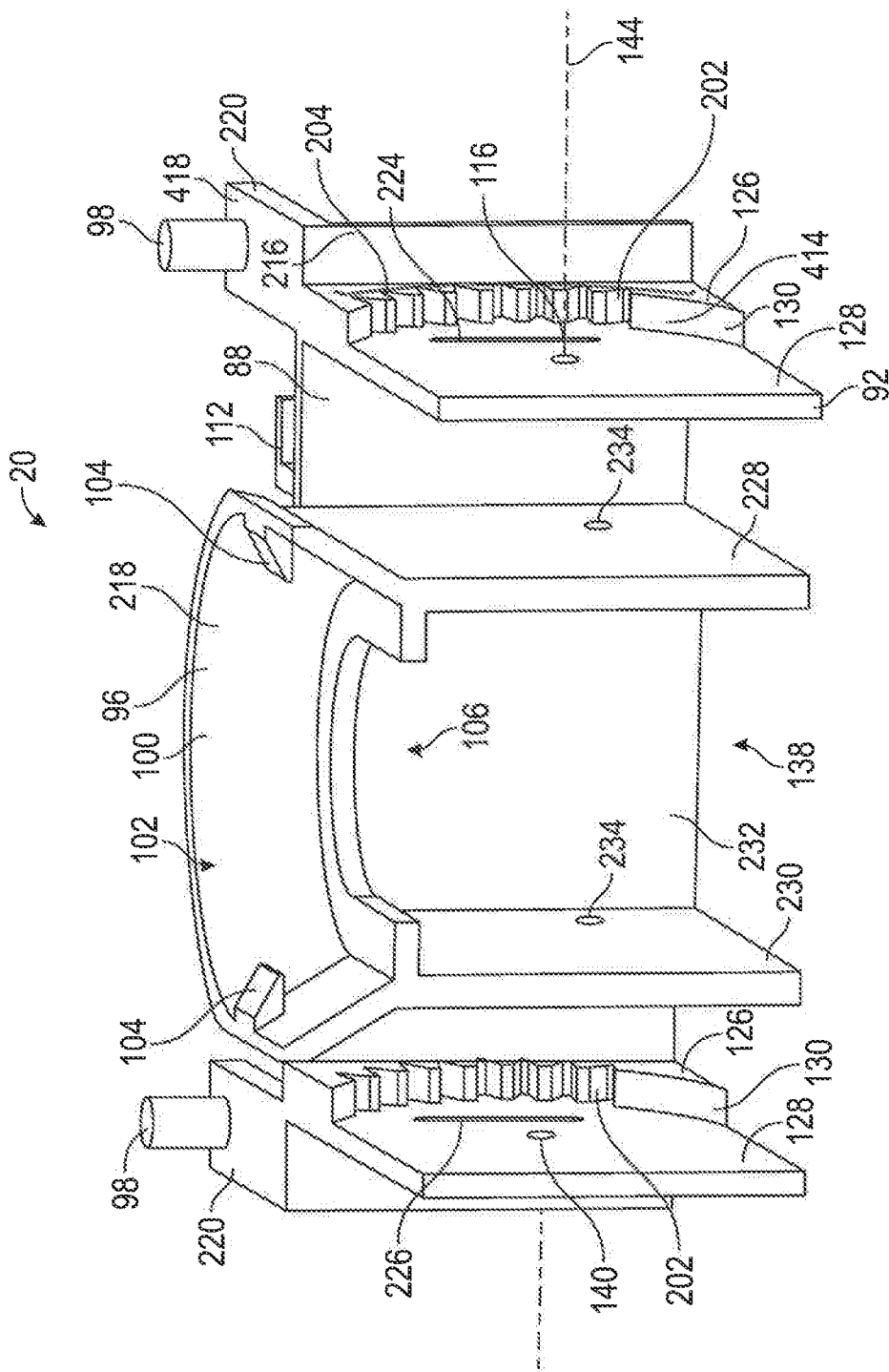
FIG. 28 is a front perspective view of the pump displacement body from the dispenser of FIG. 26, with a pump engagement portion of the pump displacement body in a lowered position.
Figure 29:
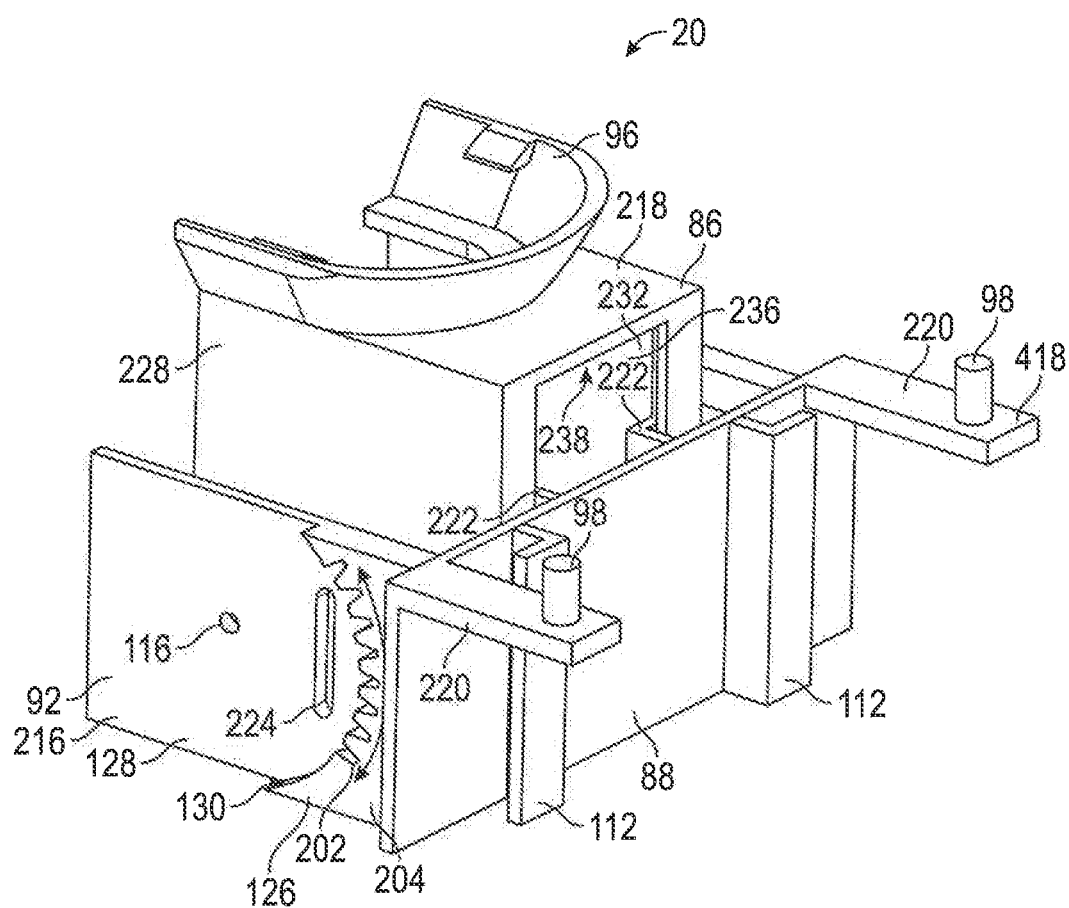
FIG. 29 is a rear perspective of the pump displacement body of FIG. 28, with the pump engagement portion in a raised position.

As shown in FIGS. 28 and 29, the pump displacement body 20 has a cam adjustment portion 216 and a pump engagement portion 218. The cam adjustment portion 216 may also be referred to as the spring receiving portion 418. The cam adjustment portion 216 has a rear wall 88, a first cam receiving wall 92, and a second cam receiving wall 94. As shown in FIG. 29, two rear sliding connectors 112 extend rearwardly from the rear wall 88 of the cam adjustment portion 216. The rear sliding connectors 112 are identical to the sliding connectors 112 shown in FIG. 5, and are configured to extend into the mounting cavity 46 between the track forming bodies 28 of the housing 12 for sliding engagement with the track members 50.

In addition to the two rear sliding connectors 112, the rear wall 88 also carries two forward sliding connectors 222 that extend forwardly from the rear wall 88. The forward sliding connectors 222 are spaced laterally from each other, and each forward sliding connector 222 has a generally L-shaped body that extends from the top of the rear wall 88 to the bottom of the rear wall 88. The forward sliding connectors 222 are configured for sliding engagement with the pump engagement portion 218 of the pump displacement body 20.

Two spring carrying arms 220 also extend rearwardly from the rear wall 88. The spring carrying arms 220 each have an upwardly extending spring carrying pin 98. Biasing springs 188 extend between the spring carrying pins 98 and the pump mounting body 26, and bias the pump displacement body 20 downwardly relative to the housing 12.

The first cam receiving wall 92 extends forwardly from the right-hand side of the rear wall 88. The first cam receiving wall 92 has a cam locking portion 126 at the rear of the first cam receiving wall 92, and an indented central portion 128 that is indented laterally inwardly from the cam locking portion 126. A first dosage adjustment channel 116 and a first dosage adjustment slot 224 extend through the indented central portion 128, and the cam locking portion 126 carries an arcuate cam locking surface 130 that faces towards the first dosage adjustment channel 116 and the first dosage adjustment slot 224. The first dosage adjustment slot 224 is positioned between the first dosage adjustment channel 116 and the cam locking portion 126, and extends vertically. The cam locking surface 130 has eight adjacent notches 202 that are positioned at different heights relative to the first dosage adjustment channel 116. A high-to-low dosage selection marker 204 is displayed on the cam locking portion 126 adjacent to the arcuate cam locking surface 130.

The second cam receiving wall 94 extends forwardly from the left-hand side of the rear wall 88. The second cam receiving wall 94 has a cam locking portion 126 and an indented central portion 128, similarly to the first cam receiving wall 92. The indented central portion 128 of the second cam receiving wall 94 faces towards the first cam receiving wall 92, and has a second dosage adjustment channel 140 and a second dosage adjustment slot 226 therethrough. The cam locking portion 126 of the second cam receiving wall 94 also has eight notches 202. The first dosage adjustment channel 116 and the second dosage adjustment channel 140 are aligned along an adjustment axis 144.

The pump engagement portion 218 of the pump displacement body 20 has an upper wall 86, a right wall 228, a left wall 230, and a back wall 232. A pump engagement member 96 extends upwardly from the upper wall 86. The pump engagement member 98 has a generally cup-shaped outer wall 100 that defines an internal pump receiving cavity 102. Two pump engagement tabs 104 extend laterally inwardly from the left and right sides of the outer wall 100, spaced upwardly from the upper wall 86. At the center of the pump engagement member 98, there is a central opening 106 through the upper wall 86. The pump engagement member 96 is configured to engage with the piston-forming element 80 of the fluid pump 16, with the catch member 108 of the piston-forming element 80 received within the pump receiving cavity 102 between the upper wall 86 and the pump engagement tabs 104, and with the dispenser outlet 110 of the piston-forming element 80 extending downwardly through the central opening 106.

The right wall 228 extends downwardly from the right-hand side of the upper wall 86, and the left wall 230 extends downwardly from the left-hand side of the upper wall 86. The right wall 228 and the left wall 230 each have a height adjustment channel 234 extending therethrough. The height adjustment channels 234 are aligned with the first and second dosage adjustment slots 224, 226. A central cavity 138 is defined between the right wall 228 and the left wall 230, with the pump engagement member 96 positioned above the central cavity 138.

The back wall 232 extends downwardly from the back of the upper wall 86, between the right wall 228 and the left wall 230. As shown in FIG. 29, the back wall 232 has a rear facing slotway 236 which receives the forward sliding connectors 222 for sliding engagement of the pump engagement portion 218 relative to the cam adjustment portion 216. A closed upper end 238 of the slotway 236 prevents the upper wall 86 of the pump engagement portion 218 from sliding below the top of the forward sliding connectors 222.

Figure 30:
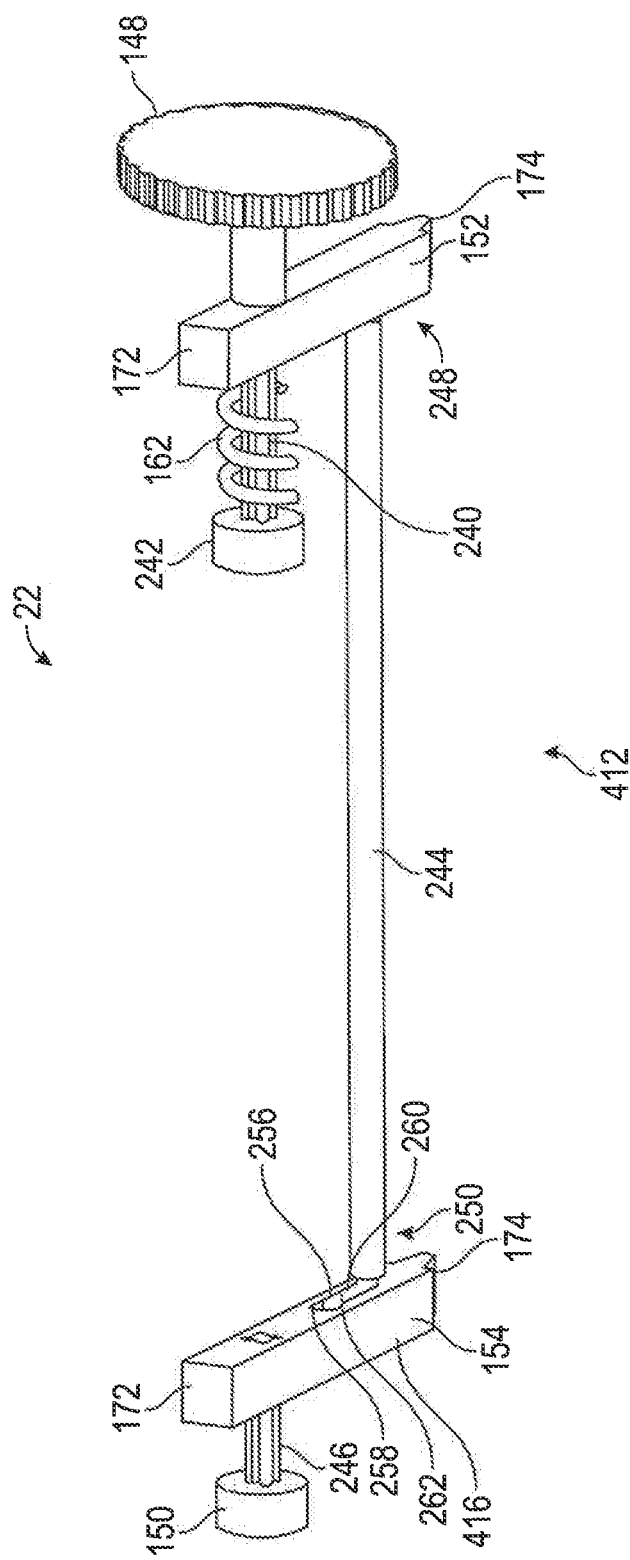
FIG. 30 is a front perspective view of the dosage adjustment member from the dispenser of FIG. 26.
Figure 31:
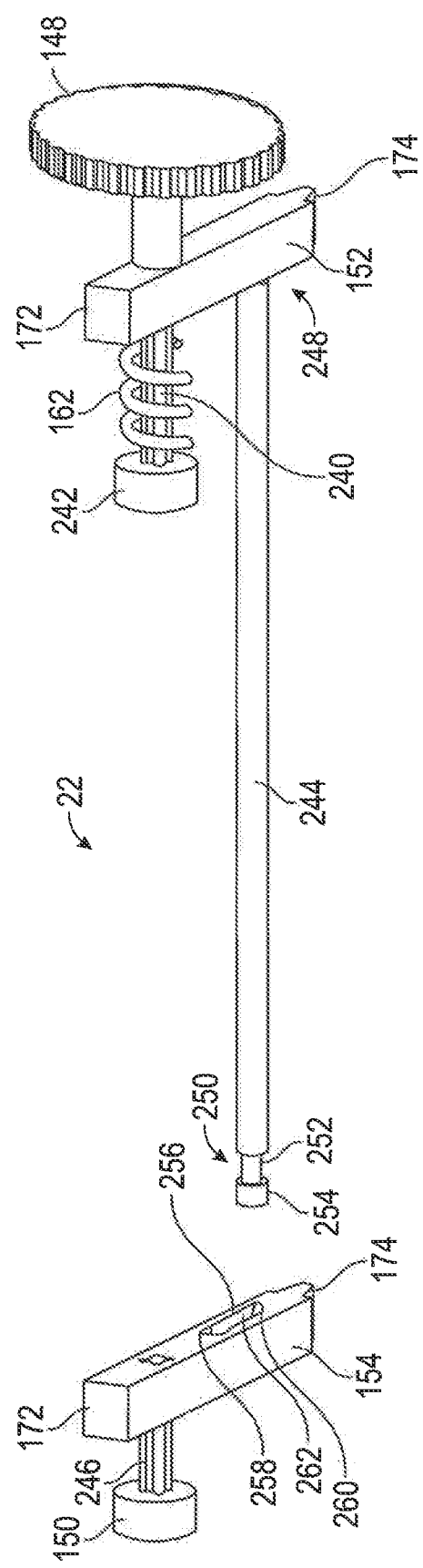
FIG. 31 is a partially exploded front perspective view of the dosage adjustment member of FIG. 30.

The dosage adjustment member 22 is shown in FIGS. 30 and 31 as including an adjustment dial 148, a first cam adjustment peg 240, a locking spring 162, a spring cap member 242, a first cam body 152, a cam adjustment shaft 244, a second cam body 154, a second cam adjustment peg 246, and a stop member 150. The first cam adjustment peg 240 has an elongated and keyed cylindrical body, with the adjustment dial 148 attached to one end and the spring cap member 242 attached to the other end. The adjustment dial 148 is a circular disc with a ridged circumferential surface, similar to the adjustment dial 148 shown in FIG. 6. The spring cap member 242 is a smaller circular disc with a smooth circumferential surface. Between the adjustment dial 148 and the spring cap member 242, the first cam adjustment peg 240 passes through an attachment end 172 of the first cam body 152. The locking spring 162 is coiled around the first cam adjustment peg 240 between the first cam body 152 and the spring cap member 242. The spring cap member 242 prevents the locking spring 162 from sliding off of the first cam adjustment peg 240.

The cam adjustment shaft 244 has an elongated cylindrical body with a first attachment end 248 and a second attachment end 250, of which only the second attachment end 250 is visible in FIG. 31. Each of the first and second attachment ends 248, 250 has a neck portion 252 in which the circumference of the cam adjustment shaft 244 is reduced, followed by a terminal locking portion 254 in which the circumference of the cam adjustment shaft is greater than in the neck portion 252. The first and second attachment ends 248, 250 are for attaching the cam adjustment shaft 244 to the first and second cam bodies 152, 154.

The first and second cam bodies 152, 154 have an identical structure to the first and second cam bodies 152, 154 shown in FIG. 6, with the exception that their attachment ends 172 are flat instead of rounded, and they each have an identical shaft receiving slot 256 near their pointed ends 174. Only the shaft receiving slot 256 on the second cam body 154 is visible in FIGS. 30 and 31. The portion of the first and second cam bodies 152, 154 where the shaft receiving slot 256 is located may be referred to as the connection portion 416. The shaft receiving slots 257 extend lengthwise on the inwardly facing surfaces of the first and second cam bodies 152, 154, and each have a front section 258 that is positioned nearer to the attachment end 172 and a rear section 260 that is positioned nearer to the pointed end 174. The front sections 258 provide an opening that is wide enough to allow the locking portions 254 of the first and second attachment ends 248, 250 to pass therethrough. The rear sections 260 provide a narrower opening that is wide enough to allow the neck portions 252 of the first and second attachment ends 248, 250 to pass therethrough, but not the locking portions 254. A locking channel 262 that is wide enough to receive the locking portions 254 extends along the entire length of each of the shaft receiving slots 256, behind both the front sections 258 and the rear sections 260.

The locking portion 254 of the first attachment end 248 of the cam adjustment shaft 244 is received within the locking channel 262 of the shaft receiving slot 256 of the first cam body 152, and the locking portion 254 of the second attachment end 250 of the cam adjustment shaft 244 is received within the locking channel 262 of the shaft receiving slot 256 of the second cam body 154. The locking portions 254 are able to slide along the length of the shaft receiving slots 256, and when the locking portions 254 are at the rear sections 260 of the slots 256 the narrow opening prevents the locking portions 254 from falling out of the locking channels 262. The wider front sections 258 provide a place to insert the locking portions 254 into the locking channels 262 during assembly of the dispenser 10.

The second cam adjustment peg 246 has an elongated and keyed cylindrical body, similar but shorter than the first cam adjustment peg 240. The stop member 150 is attached to one end of the second cam adjustment peg 246 and the attachment end 172 of the second cam body 154 is attached to the other end.

Figure 31A:
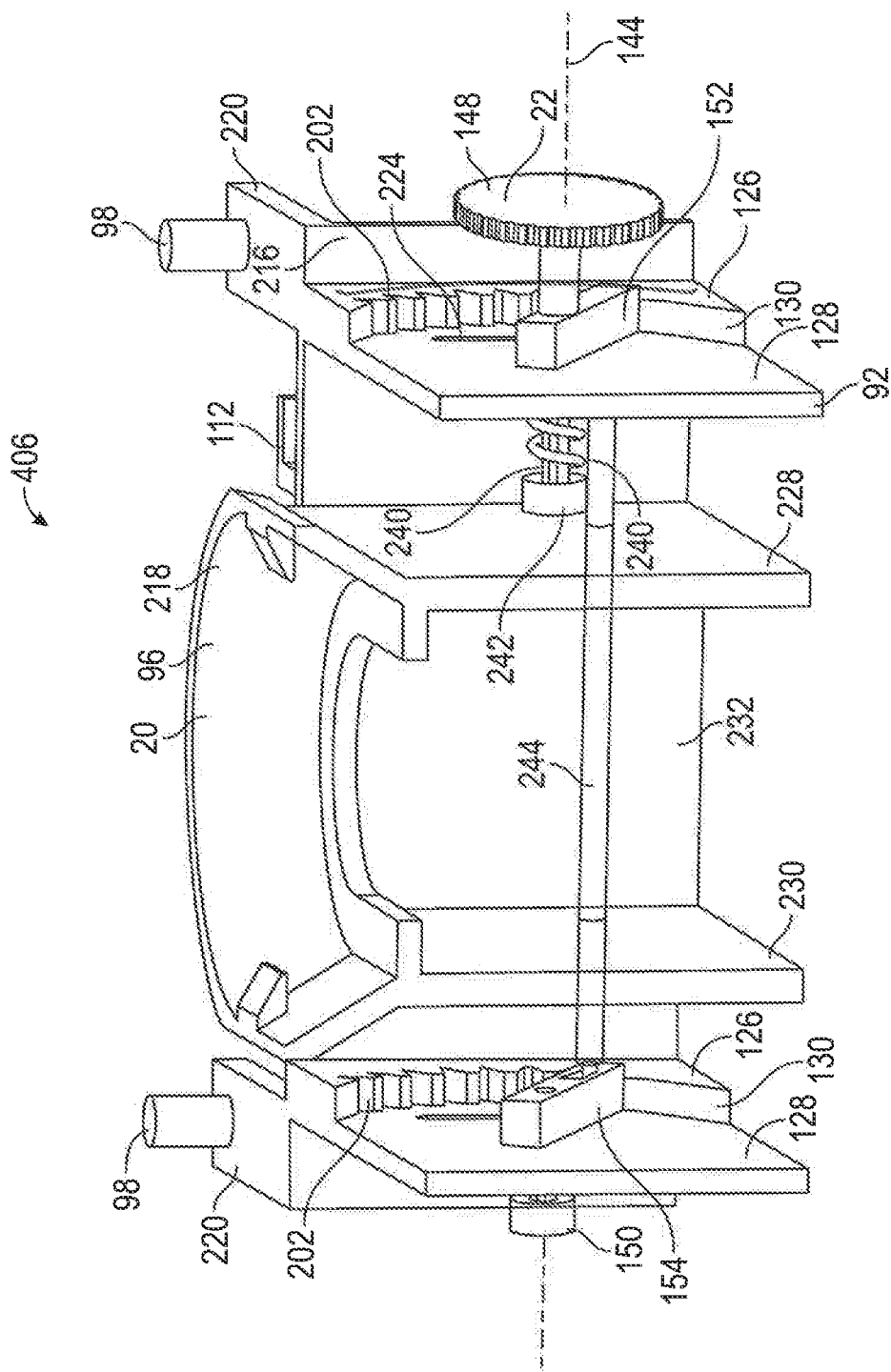
FIG. 31a is a front perspective view of the pump displacement body of FIG. 28 coupled with the dosage adjustment member of FIG. 30, with the dosage adjustment member at a high dosage setting.

As shown in FIG. 31a, the dosage adjustment member 22 extends through the pump displacement body 20, with the first cam adjustment peg 240 passing through the first dosage adjustment channel 116, the cam adjustment shaft 244 passing through the first dosage adjustment slot 224 and the height adjustment channels 234, and the second cam adjustment peg 246 passing through the second dosage adjustment channel 140. As in the embodiments shown in FIGS. 1 to 25, the dosage adjustment member 22 is movable relative to the pump displacement body 20 between a locked position and an unlocked position, and between a variety of dosage settings.

When in the locked position, as shown in FIG. 31a, the left surface 182 of the first cam body 152 engages with the indented central portion 128 of the first cam receiving wall 92, with the pointed end 174 engaging with one of the notches 202 in the arcuate locking surface 130 of the first cam receiving wall 92, and the second cam body 154 engages with the indented central portion 128 of the second cam receiving wall 94, with the pointed end 174 engaging with one of the notches 202 in the arcuate locking surface 130 of the second cam receiving wall 94. The locking spring 162 extends between the spring cap member 242 and the first cam receiving wall 92, and biases the dosage adjustment member 22 towards the locked position. To move the dosage adjustment member 22 to the unlocked position, the adjustment dial 148 is pulled away from the first cam receiving wall 92 with sufficient force to overcome the biasing force of the locking spring 162. This moves the first cam adjustment peg 240 to the right, which in turn moves the first cam body 152 away from the first cam receiving wall 92 and out of engagement with the notches 202. The rightwards movement of the first cam body 152 furthermore moves the cam adjustment shaft 244 to the right, which in turn moves the second cam body 154 away from the second cam receiving wall 94. When the dosage adjustment member 22 is in the unlocked position, the first and second cam bodies 152, 154 can be pivoted about the adjustment axis 144 to select a dosage setting by rotating the adjustment dial 148 in a clockwise or counter clockwise direction.

Figure 32:
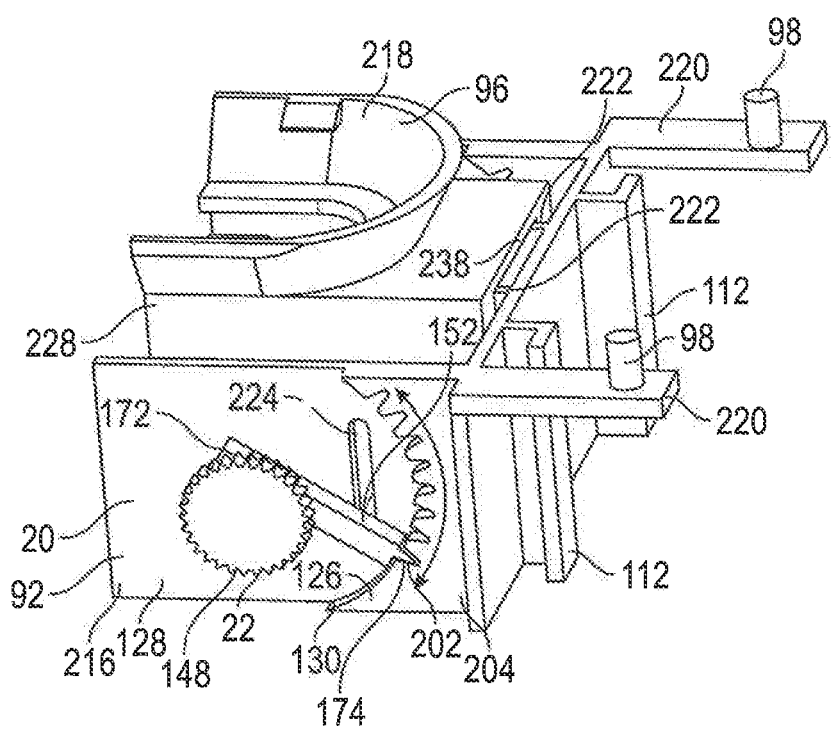
FIG. 32 is a rear perspective view of the pump displacement body and the dosage adjustment member of FIG. 31a, with the dosage adjustment member at the high dosage setting.
Figure 32A:
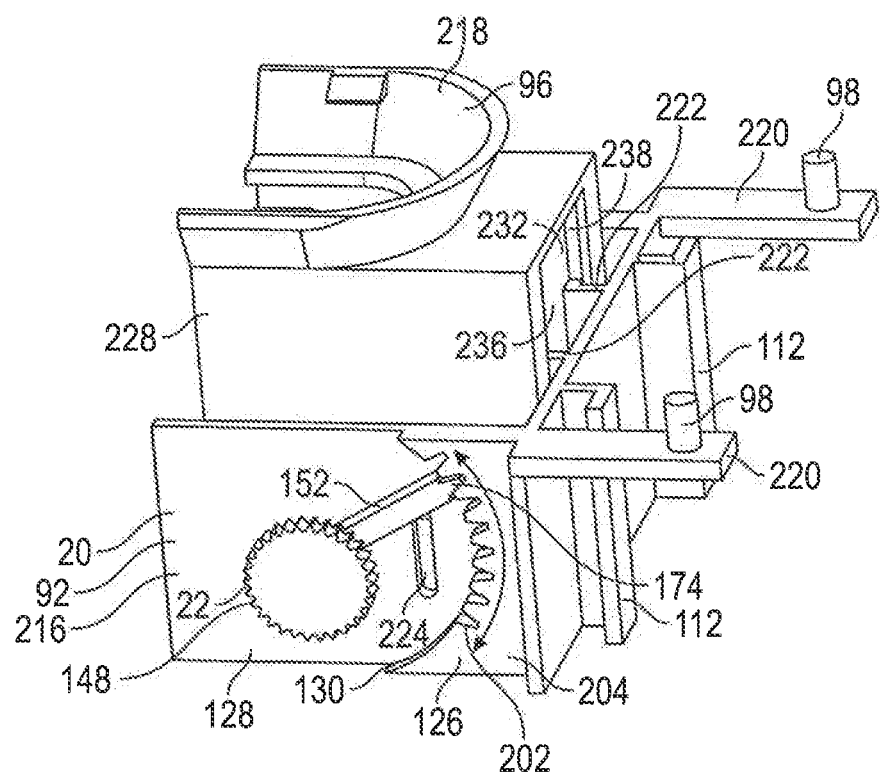
FIG. 32a is a rear perspective view of the pump displacement body and the dosage adjustment member of FIG. 32, with the dosage adjustment member at a low dosage setting.

As shown in FIG. 32, when the dosage adjustment member 22 is at the highest dosage setting, the pointed end 174 of the first cam body 152 is engaged with the bottom-most notch 202. Although not visible in FIG. 32, the pointed end 174 of the second cam body 154 is also engaged with the bottom-most notch 202. To move the dosage adjustment member 22 to a lower dosage setting, the dosage adjustment member 22 is first moved from the locked position to the unlocked position by pulling the adjustment dial 148 as described above. The adjustment dial 148 is then rotated about the adjustment axis 144 in a counter clockwise direction until the pointed ends 174 are aligned with one of the upper notches 202, as shown in FIG. 32a. Upon release of the adjustment dial 148, the dosage adjustment member 22 returns to the locked position under the biasing force of the locking spring 162.

In the embodiment shown in FIGS. 32 and 32a, the rotation of the adjustment dial 148 affects not only the orientation of the first and second cam bodies 152, 154, but also the position of the pump engagement portion 218 of the pump displacement body 20 relative to the cam adjustment portion 216. When the adjustment dial 148 is rotated in the counter clockwise direction, this rotational movement is transferred to the first cam body 152 via the first cam adjustment peg 240. As the first cam body 152 rotates about the adjustment axis 144, the shaft receiving slot 256 moves upwardly, which in turn lifts the cam adjustment shaft 244 upwardly. The upwards movement of the cam adjustment shaft 244 lifts the pump engagement portion 218 upwards relative to the cam adjustment portion 218. The upwards movement of the cam adjustment shaft 244 also lifts the pointed end 174 of the second cam body 154, causing the second cam body 154 to also rotate about the adjustment axis 144 in the counter clockwise direction. In this manner, the height of the pump engagement portion 218 relative to the cam adjustment portion 218 can be adjusted, with the relative height of the pump engagement portion 218 being higher at lower dosage settings, and the relative height of the pump engagement portion 218 being lower at higher dosage settings.

Figure 33:
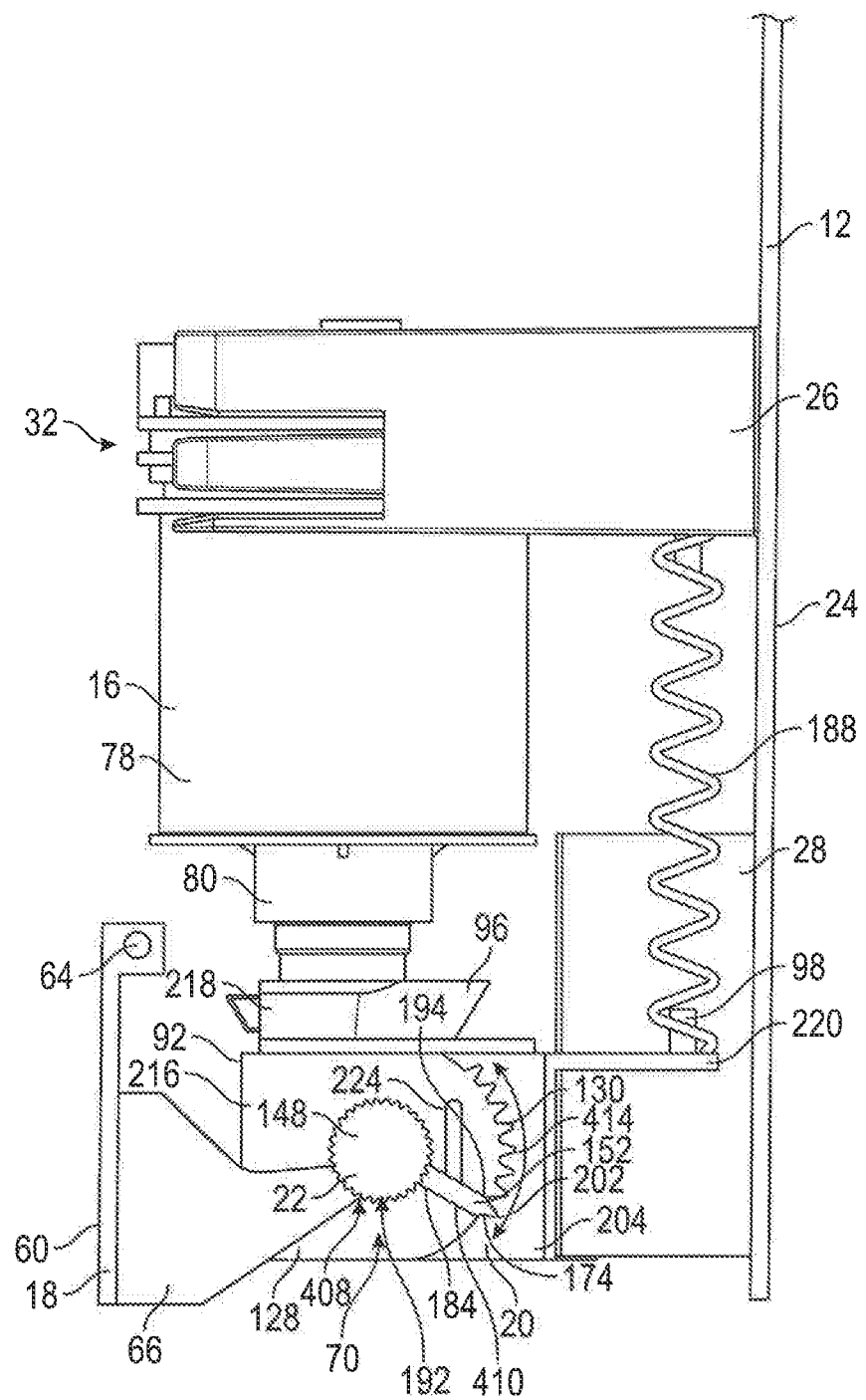
FIG. 33 is a side view of the fluid dispenser of FIG. 26, with the housing cover and the fluid reservoir omitted, and with the actuator at the first position and the dosage adjustment member at the high dosage setting.
Figure 34:
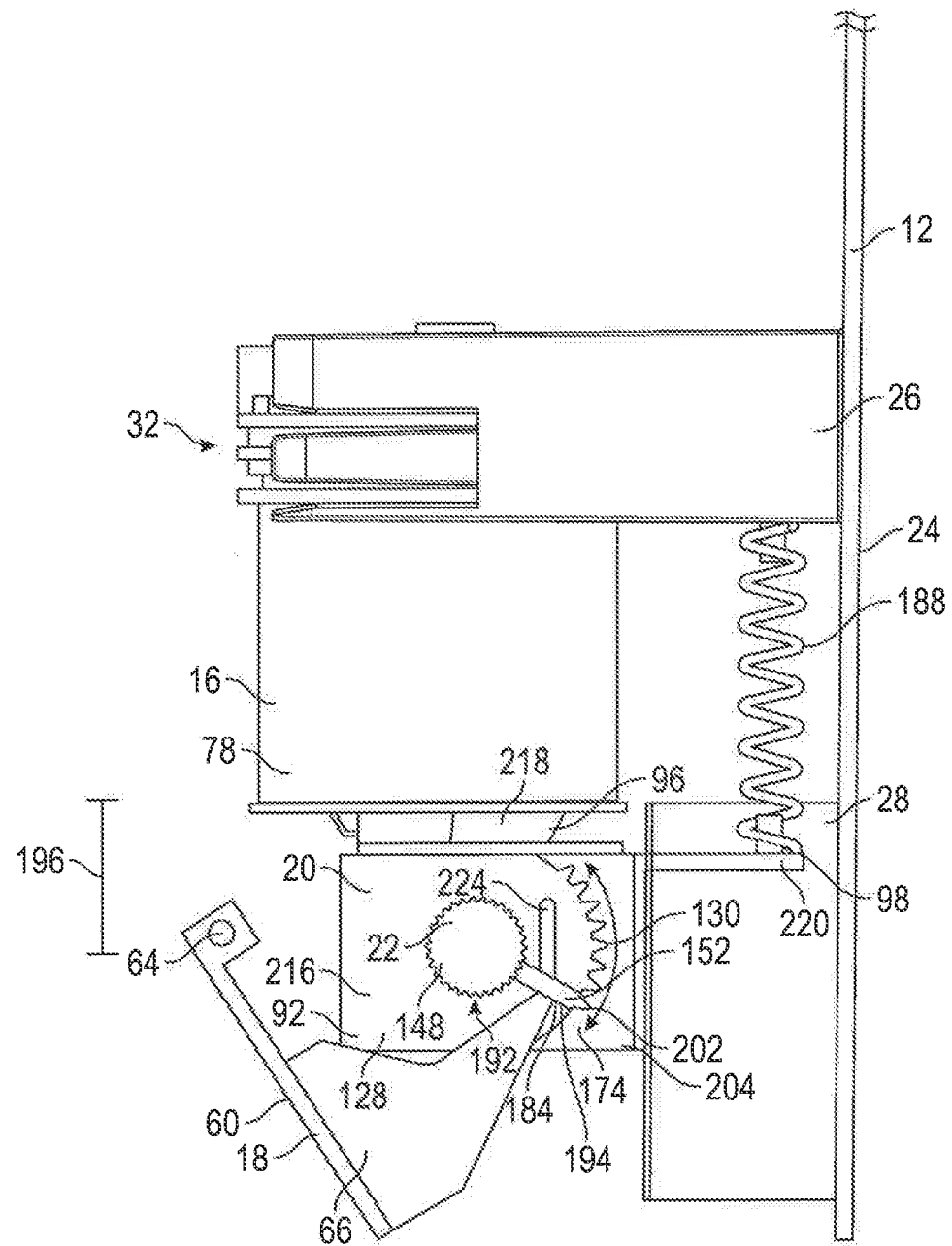
FIG. 34 is a side view of the fluid dispenser of FIG. 33, with the actuator at the second position and the dosage adjustment member at the high dosage setting.

As in the embodiments shown in FIGS. 1 to 25, to dispense fluid from the fluid dispenser 10 shown in FIGS. 26 to 36, the front panel 60 of the actuator 18 is manually depressed so as to overcome the biasing force of the springs 188 and pivot the actuator 18 about the actuator axis 58 from a first position, as shown in FIG. 33, to a second position, as shown in FIG. 34. The movement of the actuator 18 from the first position to the second position causes the camming surfaces 70 to move upwardly and rearwardly relative to the housing 12. The engagement of the camming surfaces 70 with the cam surfaces 184 during this movement causes the pump displacement body 20 to slide upwardly along the track members 50. The upwards movement of the pump displacement body 20 displaces the piston-forming element 80 along the pump axis 82 inwardly relative to the piston chamber-forming body 78, from an extended position, as shown in FIG. 33, to a retracted position, as shown in FIG. 34. Upon release of the actuator 18, the pump displacement body 20 slides downwardly along the track members 50 under the biasing force of the springs 188. This downwards movement of the pump displacement body 20 draws the piston-forming element 80 along the pump axis 82 outwardly relative to the piston chamber-forming body 78, from the retracted position to the extended position. The reciprocal movement of the piston-forming element 80 relative to the piston chamber-forming body 78 causes the fluid pump 16 to dispense an allotment of fluid from the dispenser outlet 110.

As in the embodiments shown in FIGS. 1 to 25, in the embodiment shown in FIGS. 26 to 36 the volume of fluid that is dispensed upon activation of the fluid pump 16 depends on the distance that the piston-forming element 80 travels between the extended position and the retracted position. The distance between the extended position and the retracted position, and thus the volume of fluid that is dispensed, can be adjusted by changing the dosage setting of the dosage adjustment member 22.

When the dosage adjustment member 22 is at the highest dosage setting, as shown in FIG. 33, the pump engagement portion 218 of the pump displacement body 20 is positioned as low as possible relative to the cam adjustment portion 216, and the pointed ends 174 of the first and second cam bodies 152, 154 are oriented rearwardly and downwardly relative to the attachment ends 172. When the actuator 18 is at the first position, as shown in FIG. 33, the camming surfaces 70 engage with the front portions 192 of the cam surfaces 184, which are positioned near the adjustment axis 144. The height of the front portions 192 of the cam surfaces 184 and the height of the pump engagement portion 218 of the pump displacement body 20 relative to the housing 12 determines the position of the piston-forming element 80 relative to the piston chamber-forming body 78 when the actuator 18 is at the first position. The low relative position of the pump engagement portion 218 of the pump displacement body 20 locates the piston-forming element 80 at a high dosage extended position, as shown in FIG. 33.

When the actuator 18 is pivoted from the first position to the second position, the camming surfaces 70 move upwardly and rearwardly along the cam surfaces 184 from the front portions 192 to the rear portions 194, as shown in FIG. 34. This displaces the pump displacement body 20 upwardly, moving the piston-forming element 80 from the high dosage extended position, as shown in FIG. 33, to a high dosage retracted position, as shown in FIG. 34. The distance between the high dosage extended position and the high dosage retracted position is a high dosage stroke distance 196.

When the dosage adjustment member 22 is at the high dosage setting and the actuator 18 is pivoted from the first position to the second position, the piston-forming element 80 moves the high dosage stroke distance 196 from the high dosage extended position to the high dosage retracted position, which causes the fluid pump 16 to dispense a relatively large volume of the fluid from the dispenser outlet 110.

Figure 35:
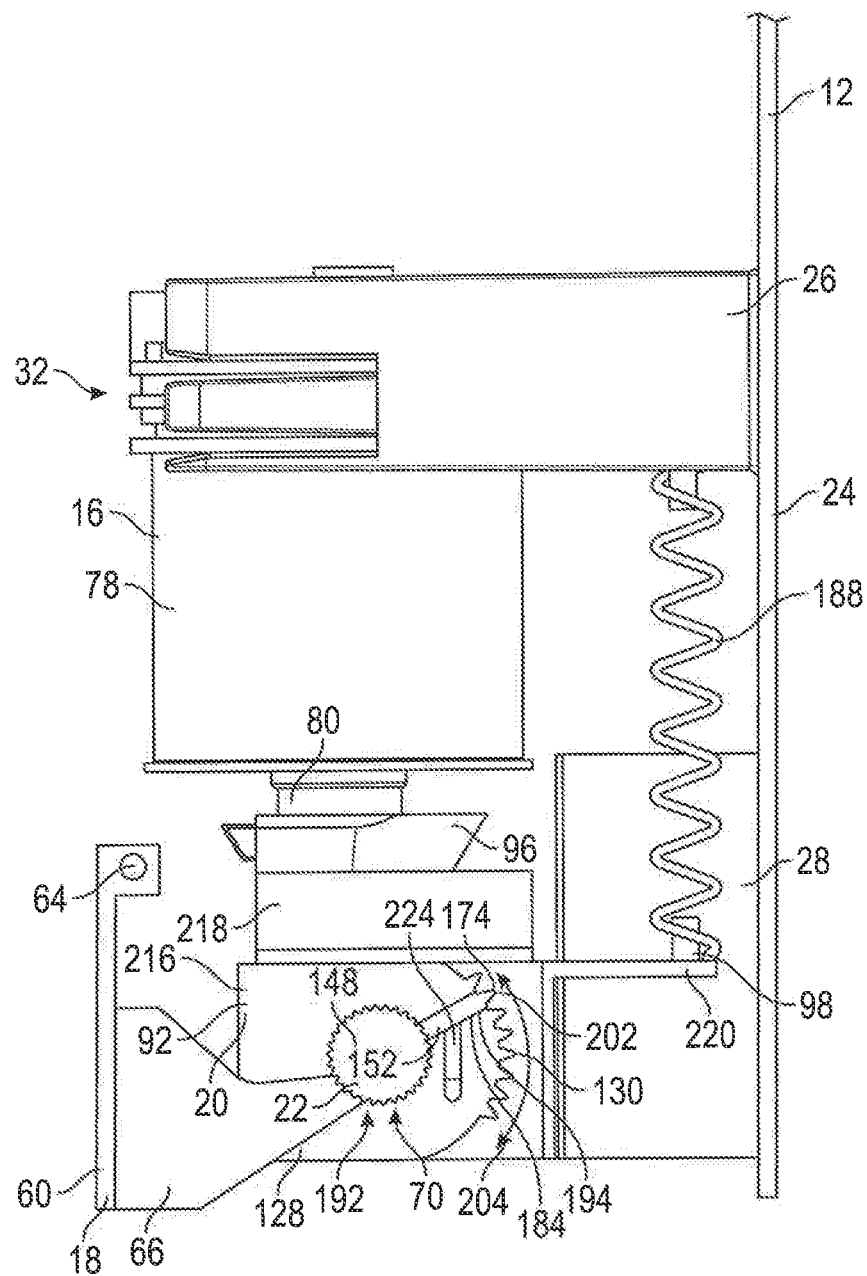
FIG. 35 is a side view of the fluid dispenser of FIG. 33, with the actuator at the first position and the dosage adjustment member at the low dosage setting.

If the user of the dispenser 10 desires a smaller volume of fluid to be dispensed, the dosage adjustment member 22 can be set to a different dosage setting, following the procedure as described above. To select a lower dosage setting, the adjustment dial 148 is pulled outwardly away from the first cam receiving wall 92 from the locked position to the unlocked position, and rotated about the adjustment axis 144 in the counter clockwise direction until the pointed ends 174 are aligned with lower dosage notches 202, such as the second lowest dosage notches 202 as shown in FIG. 35. Upon release of the adjustment dial 148, the dosage adjustment member 22 slides back into the locked position under the biasing force of the locking spring 162.

When the dosage adjustment member 22 is at the second lowest dosage setting, as shown in FIG. 35, the pump engagement portion 218 of the pump displacement body 20 is positioned higher relative to the cam adjustment portion 216 than when the dosage adjustment member 22 is at the highest dosage setting, as shown in FIG. 33. When the dosage adjustment member 22 is at the second lowest dosage setting, as shown in FIG. 35, the pointed ends 174 of the first and second cam bodies 152, 154 are oriented rearwardly and upwardly relative to the attachment ends 172. When the actuator 18 is at the first position, as shown in FIG. 35, the camming surfaces 70 engage with the front portions 192 of the cam surfaces 184. Because the front portions 192 of the cam surfaces 184 are positioned near the adjustment axis 144, the relative height of the cam adjustment portion 216 of the pump displacement body 20 relative to the housing 12 is approximately the same when the dosage adjustment member 22 is at the second lowest dosage setting, as shown in FIG. 35, as it is when the dosage adjustment member 22 is at the highest dosage setting, as shown in FIG. 33. The length and biasing force of the biasing springs 188 is therefore approximately the same when the actuator 18 is at the first position, regardless of whether the dosage adjustment member 22 is at the highest dosage setting, the second lowest dosage setting, or any other dosage setting.

The high relative position of the pump engagement portion 218 of the pump displacement body 20 when the dosage adjustment member 22 is at the second lowest dosage setting locates the piston-forming element 80 at a low dosage extended position, as shown in FIG. 35. As can be seen by comparing FIGS. 33 and 35, the piston-forming element 80 is much closer to the piston chamber-forming body 78 along the pump axis 82 when at the low dosage extended position, as shown in FIG. 35, compared to when the piston-forming element 80 is at the high dosage extended position, as shown in FIG. 33.

Figure 36:
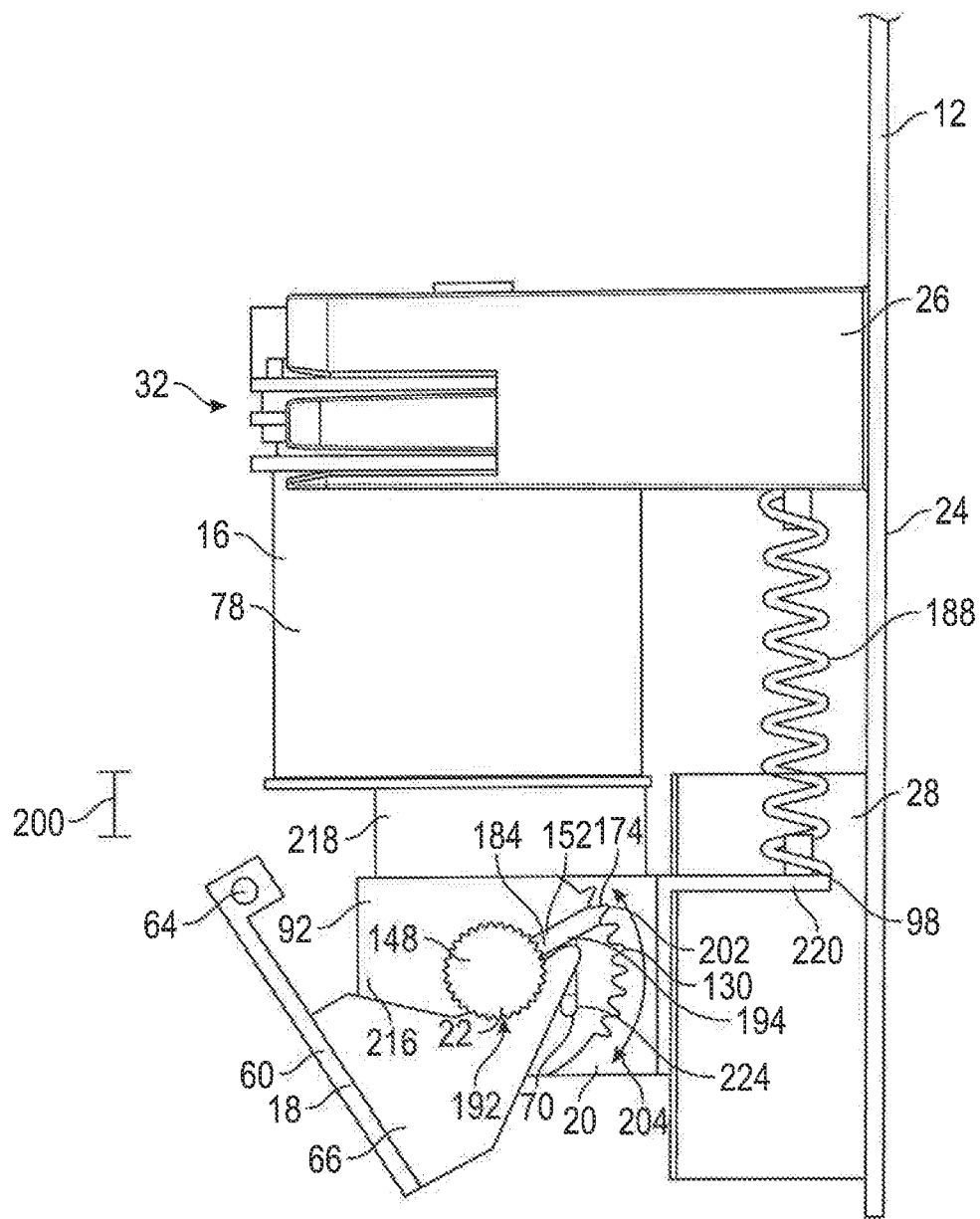
FIG. 36 is a side view of the fluid dispenser of FIG. 33, with the actuator at the second position and the dosage adjustment member at the low dosage setting.

When the actuator 18 is pivoted from the first position to the second position, the camming surfaces 70 move upwardly and rearwardly along the cam surfaces 184 from the front portions 192 to the rear portions 194, as shown in FIG. 36. This displaces the pump displacement body 20 upwardly, moving the piston-forming element 80 from the low dosage extended position, as shown in FIG. 35, to a low dosage retracted position, as shown in FIG. 36. The distance between the low dosage extended position and the low dosage retracted position is a low dosage stroke distance 200.

When the dosage adjustment member 22 is at the second lowest dosage setting and the actuator 18 is pivoted from the first position to the second position, the piston-forming element 80 moves the low dosage stroke distance 200 from the low dosage extended position to the low dosage retracted position. Because the low dosage stroke distance 200 is smaller than the high dosage stroke distance 196, this causes the fluid pump 16 to dispense a relatively smaller volume of the fluid from the dispenser outlet 110 compared to when the dosage adjustment member 22 is at the highest dosage setting.

As can be seen by comparing FIGS. 34 and 36, the low dosage retracted position is not precisely the same as the high dosage retracted position. Nonetheless, the rearwards and upwards angle of the first and second cam bodies 152, 154 when at the second lowest dosage setting does cause the pump displacement body 20 to move a relatively shorter distance upwardly when the actuator 18 is pivoted from the first position to the second position, compared to the relatively longer distance when the first and second cam bodies 152, 154 are angled rearwardly and downwardly at the highest dosage setting. This causes the low dosage retracted position, as shown in FIG. 36, to be closer to the high dosage retracted position, as shown in FIG. 34, than the low dosage extended position, as shown in FIG. 35, is to the high dosage extended position, as shown in FIG. 33. In other embodiments, the low dosage retracted position could be adjusted so as to be even closer to the high dosage retracted position, by tweaking the angles, curvatures, and other parameters of the dosage adjustment member 22, the pump displacement body 20, and the actuator 18.

Similarly to the embodiment shown in FIGS. 22 to 25, the embodiment shown in FIGS. 26 to 36 provides the advantage that the biasing springs 188 do not need to be precompressed when a lower dosage setting is selected. This is because the selection of the dosage setting adjusts the height of the pump engagement portion 218 of the pump displacement body 20 relative to the housing 12, but not the height of the cam adjustment portion 216 relative to the housing 12, and it is the cam adjustment portion 216 that carries the springs 188.

Reference is now made to FIGS. 37 to 54, which depict a fluid dispenser 10 in accordance with a fifth embodiment of the invention. As in the embodiments shown in FIGS. 1 to 36, the fluid dispenser 10 of FIGS. 37 to 54 includes a housing 12, a fluid reservoir 14, a fluid pump 16, an actuator 18, a pump displacement body 20, and a dosage adjustment member 22. The fluid pump 16 is identical to the fluid pump 16 shown in FIGS. 1 to 19, but the other components differ from those shown in the earlier embodiments. Like numerals are used to denote like components.

Figure 37:
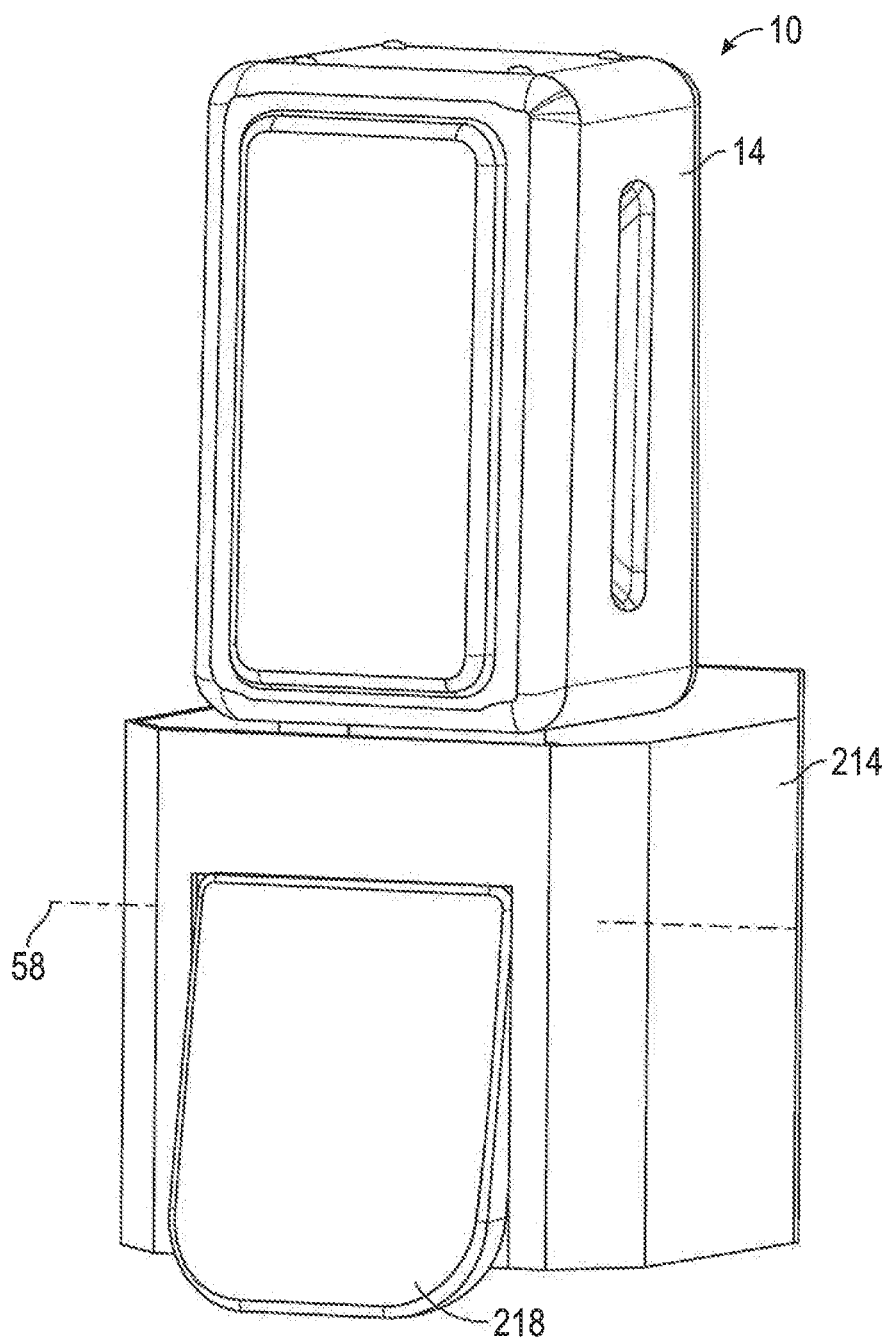
FIG. 37 is a front perspective view of a fluid dispenser in accordance with a fifth embodiment of the present invention.
Figure 38:
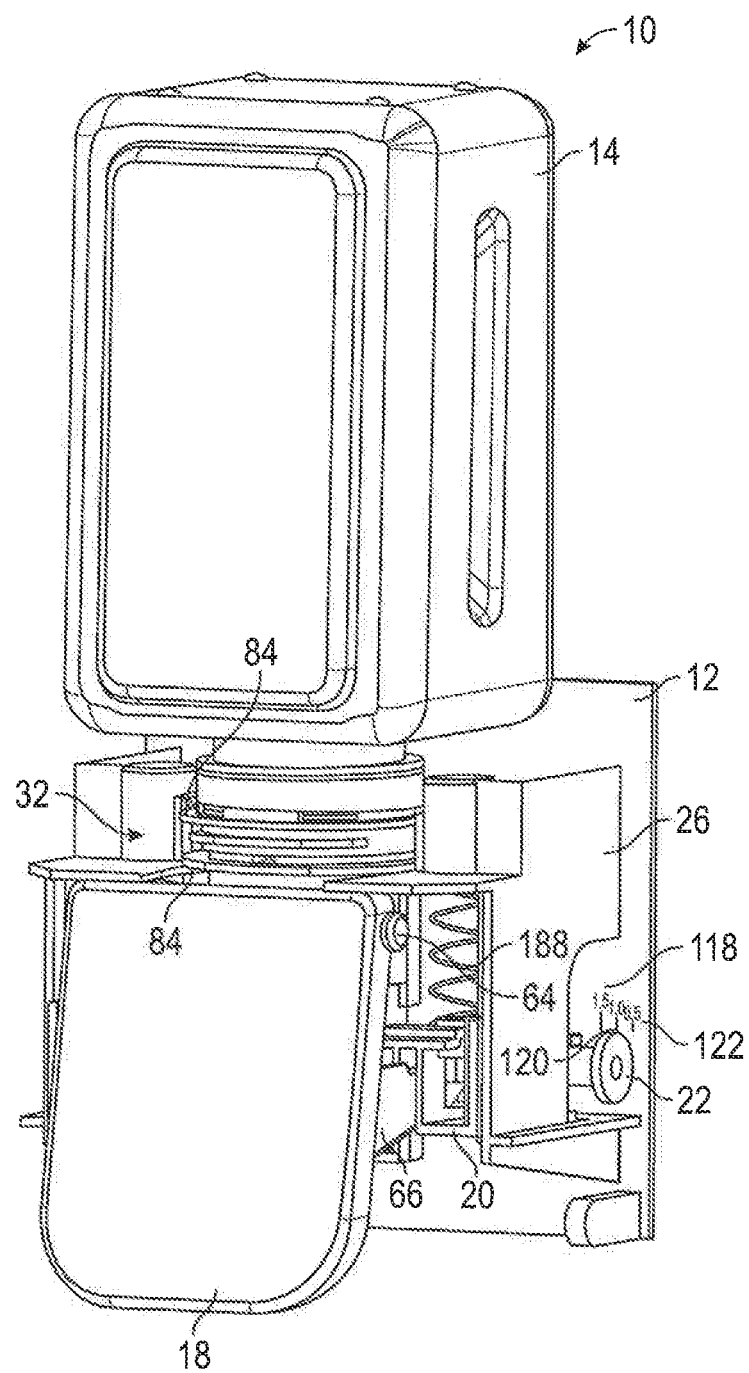
FIG. 38 is a front perspective view of the fluid dispenser of FIG. 37, with the housing cover removed.

As shown in FIG. 37, the fluid dispenser 10 according to the fifth embodiment of the invention has a housing cover 214, which is removably secured to the back panel 24 of the housing 12. Although not shown, the housing cover 214 has a pair of actuator mounting channels 56 that receive the mounting pins 64 of the actuator 18 for pivotally mounting the actuator 18 to the housing 12 and allowing the actuator 18 to pivot about the actuator axis 58 relative to the housing 12. In the embodiment shown in FIG. 37, the housing cover 214 does not enclose the fluid reservoir 14, which sits above the housing cover 214. The fluid reservoir 14 itself has a different style of construction in the embodiment shown in FIG. 37, but is otherwise identical to the fluid reservoirs 14 in the embodiments of FIGS. 1 to 36.

Figure 40:
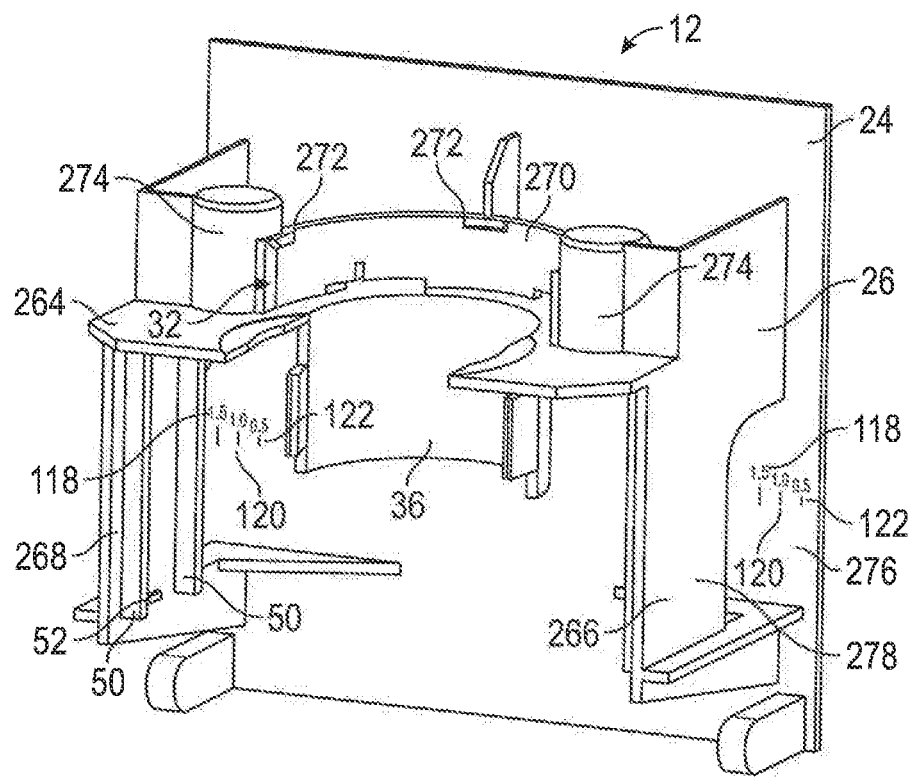
FIG. 40 is a front perspective view of the housing from the fluid dispenser of FIG. 37.

As shown in FIG. 40, the housing 12 includes a back panel 24 and a pump mounting body 26. The back panel 24 is a flat, generally rectangular panel for mounting the housing 12 to a wall or other vertical support surface, and displays a low dosage marker 122, a medium dosage marker 120, and a high dosage marker 118 on each of its left and right sides. The pump mounting body 26 extends forwardly from the back panel 24 and has an upper platform 264, a right sidewall 266, and a left sidewall 268. The upper platform 264 carries a mounting mechanism 32 for releasably receiving and carrying the fluid pump 16. The mounting mechanism 32 includes an arcuate mounting wall 270 that extends upwardly from the upper platform 264 and carries three pump mounting tabs 272 at its upper end. A pump receiving cavity 36 extends through the upper platform 264 at the front and center of the upper platform 264, adjacent to the arcuate mounting wall 270. The pump receiving cavity 36 is sized to receive the piston chamber-forming body 78 of the fluid pump 16, with the mounting flanges 84 of the piston chamber-forming body 78 held between the pump mounting tabs 272 and the upper platform 264 so as to mount the piston chamber-forming body 78 in a stationary position relative to the housing 12.

Two spring receiving cylindrical bodies 274 extend upwardly from the upper platform 264 on either side of the arcuate mounting wall 270. The spring receiving bodies 274 each have a closed upper end and an open lower end for receiving the biasing springs 188.

The right sidewall 266 and the left sidewall 268 extend vertically adjacent to the right and left sides of the back panel 24, respectively. The right sidewall 266 and the left sidewall 268 each have a central section 278 that is spaced from the back panel 24 so as to define a dosage adjustment opening 276, which is positioned adjacent to the low dosage marker 122, the medium dosage marker 120, and the high dosage marker 118. On the inner surface of each sidewall 266, 268 there are two vertically extending bar shaped track members 50. A catch lip 52 extends inwardly from the inner surface of the left sidewall 288 near the bottom of the track members 50.

Figure 41:
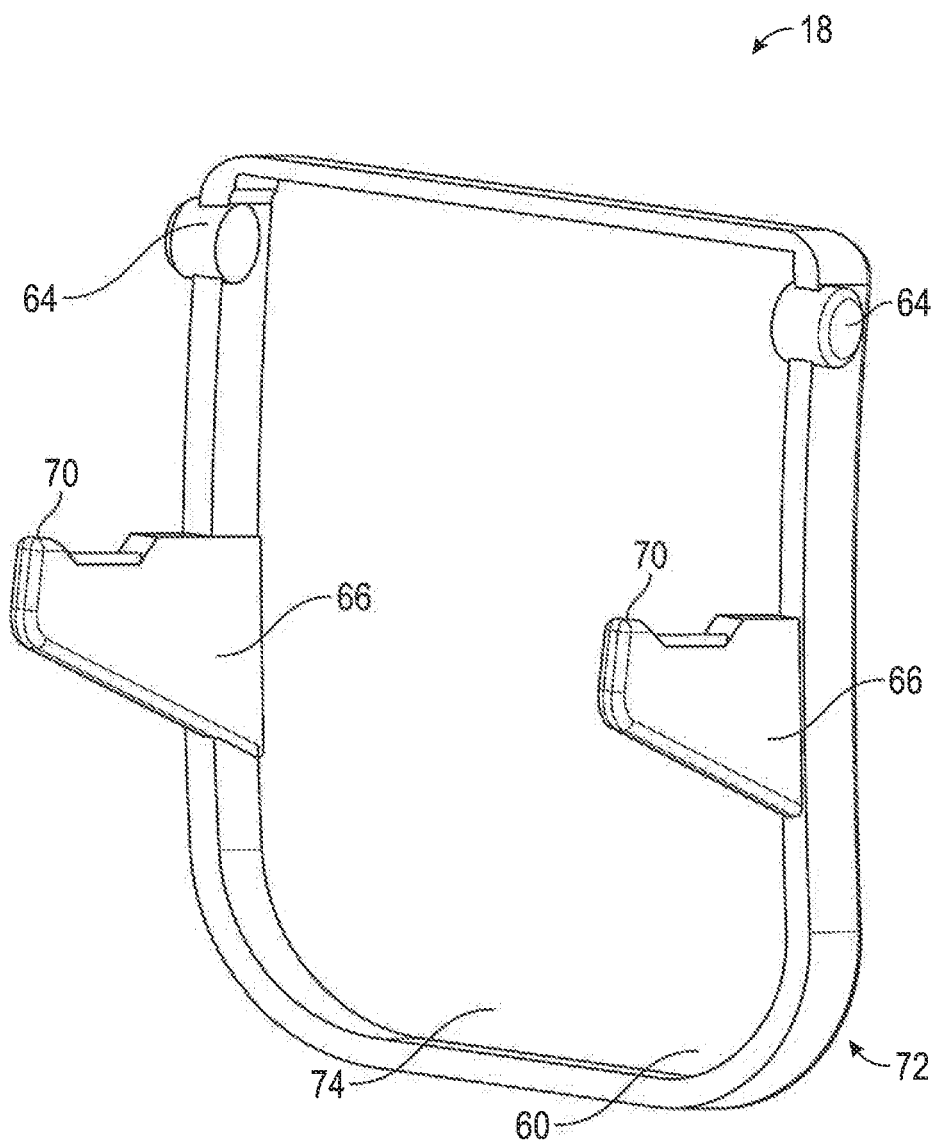
FIG. 41 is a rear perspective view of the actuator from the fluid dispenser of FIG. 37.

The actuator 18 is shown in FIG. 41 as having a front panel 60, two mounting pins 64, and two camming bodies 66. The front panel 60 is a generally rectangular panel having a generally flat front surface 72 and a rear surface 74. The camming bodies 66 extend from the rear surface 74 of the front panel 60, and each have a rearmost upper corner that serves as a camming surface 70. The mounting pins 64 extend laterally outwardly from the upper corners of the front panel 60. The mounting pins 64 are each rotatably received by one of the actuator mounting channels 56 in the housing cover 214, thereby mounting the actuator 18 to the housing 12 and allowing the actuator 18 to pivot about the actuator axis 58 relative to the housing 12.

Figure 39:
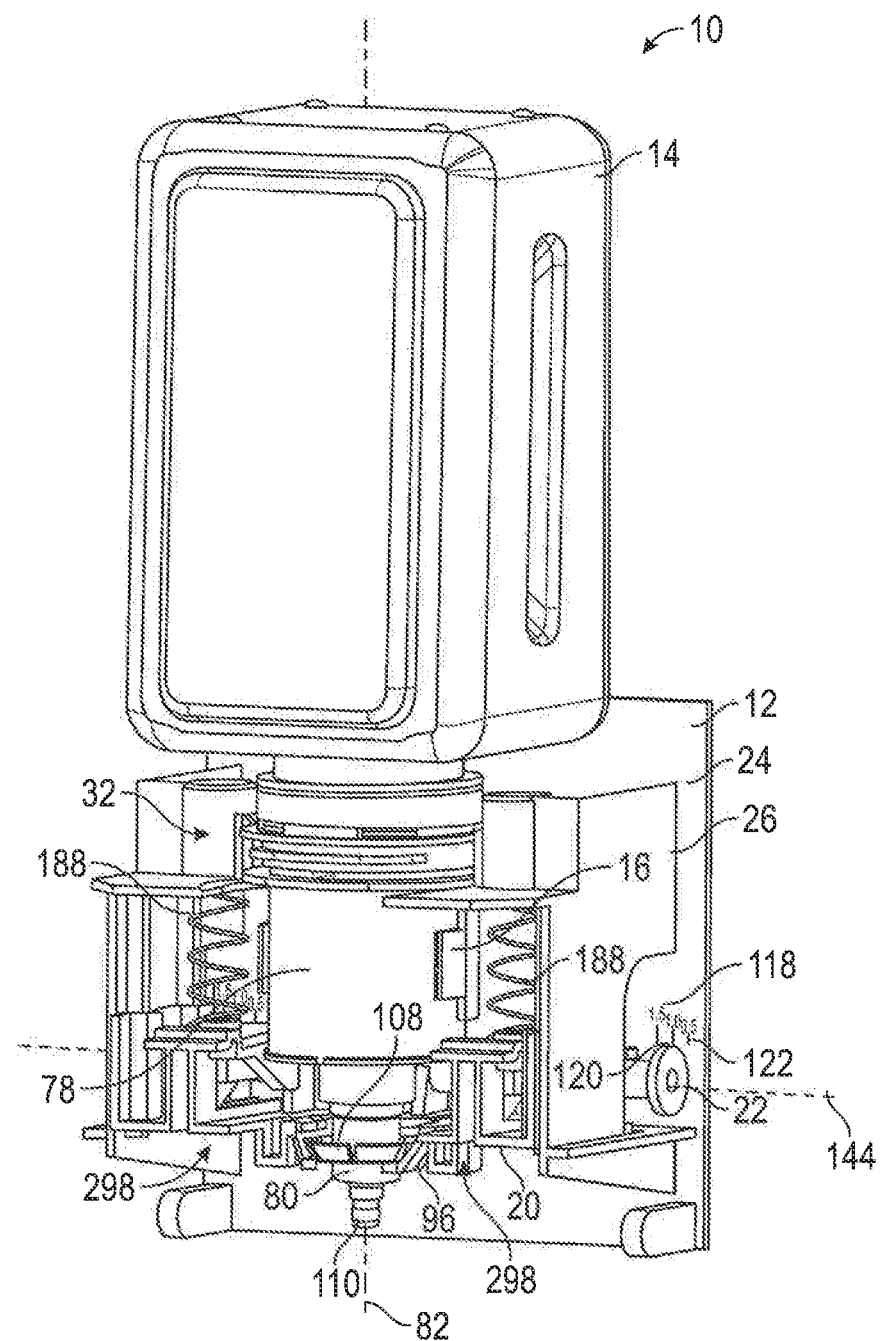
FIG. 39 is a front perspective view of the fluid dispenser of FIG. 37, with the housing cover and the actuator removed.
Figure 42:
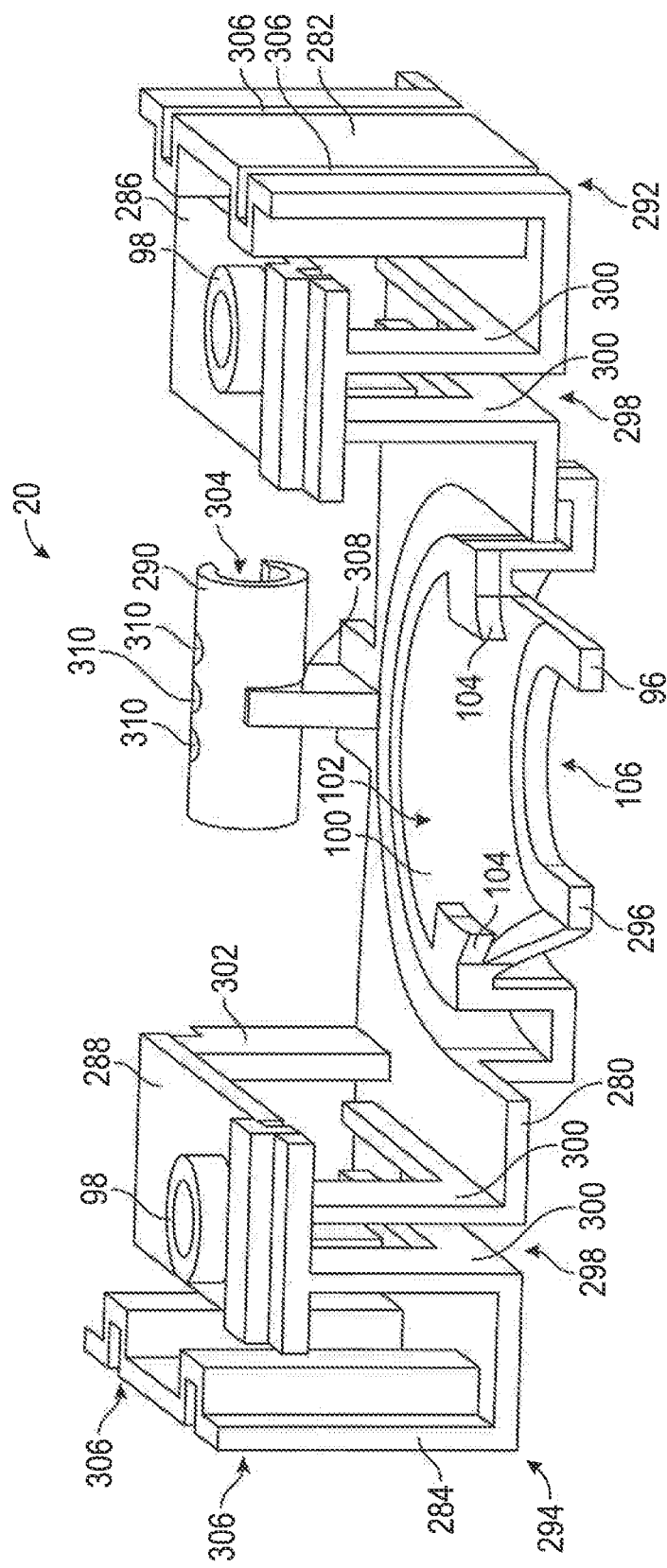
FIG. 42 is a front perspective view of the pump displacement body from the fluid dispenser of FIG. 37.
Figure 43:
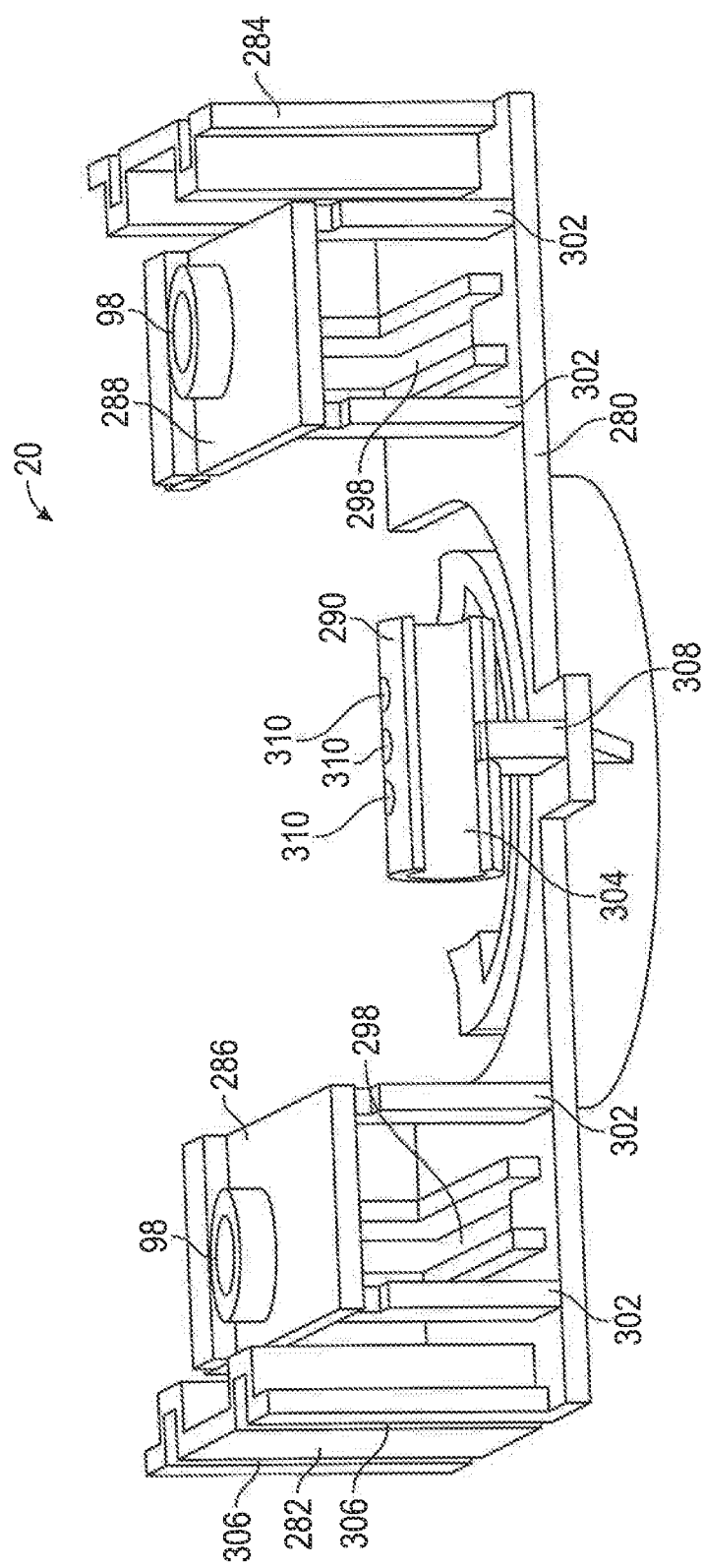
FIG. 43 is a rear perspective view of the pump displacement body of FIG. 42.

The pump displacement body 20 is shown in FIGS. 42 and 43 as having a lower wall 280, a right sliding wall 282, a left sliding wall 284, a right spring platform 286, a left spring platform 288, a cylindrical locking body 290, and a pump engagement member 96. The lower wall 280 extends from a right side 292 to a left side 294, with the pump engagement member 96 positioned in the middle of the lower wall 280 between the right side 292 and the left side 294. The pump engagement member 96 as shown in FIGS. 42 and 43 has a similar structure to the pump engagement member 96 as shown in FIGS. 4 and 5, and has a generally cup-shaped wall 100 with a pump engagement flange 296 at its lower end and two pump engagement tabs 104 at its upper end. The cup-shaped wall 100 defines an internal pump receiving cavity 102, and the pump engagement flange 296 has a central opening 106. The pump engagement member 96 is configured to engage with the piston-forming element 80 of the fluid pump 16, with the catch member 108 of the piston-forming element 80 received within the pump receiving cavity 102 between the pump engagement flange 296 and the pump engagement tabs 104, and with the dispenser outlet 110 of the piston-forming element 80 extending downwardly through the central opening 106, as shown in FIG. 39.

The lower wall 280 has two actuator receiving channels 298, which are positioned on either side of the pump engagement member 96. The actuator receiving channels 298 extend rearwardly from the front of the lower wall 280, and are sized to receive the camming bodies 66 of the actuator 18.

The right spring platform 286 is positioned above the actuator receiving channel 298 near the right side 292 of the lower wall 280, and the left spring platform 288 is positioned above the actuator receiving channel 298 near the left side 294 of the lower wall 280. Each of the right and left spring platforms 286, 288 have two generally L-shaped cam alignment walls 300 that extend downwardly from the front of the spring platforms 286, 288 on either side of the actuator receiving channels 298, and two rear posts 302 that extend downwardly from the rear of the spring platforms 286, 288 to the rear of the lower wall 280. Each of the right and left spring platforms 286, 288 have a spring carrying pin 98 that extends upwardly therefrom. The biasing springs 188 extend between the spring carrying pins 98 on the pump displacement body 20 and the spring receiving cylindrical bodies 274 on the pump mounting body 26, as shown in FIG. 39.

The right sliding wall 282 extends upwardly from the right side 292 of the lower wall 280, and the left sliding wall 284 extends upwardly from the left side 294 of the lower wall 280. Each of the right and left sliding walls 282, 284 have two vertically oriented sliding channels 306 that are sized to receive the track members 50 on the right and left sidewalls 266, 268 of the housing 12, respectively, for sliding engagement relative thereto. The catch lip 52 extends below the left sliding wall 284 and prevents the pump displacement body 20 from sliding below the catch lip 52.

The cylindrical locking body 290 is supported by a central pedestal 308 that extends upwardly from the lower wall 280 at the rear of the lower wall 280, behind the pump engagement member 96. The cylindrical locking body 290 defines a dosage adjustment channel 304 that extends horizontally from a right end of the locking body 290 to a left end of the locking body 290 along an adjustment axis 144. The dosage adjustment channel 304 is open rearwardly, as well as at the right and left ends of the locking body 290. Three dosage locking holes 310 extend through the top of the locking body 290.

Figure 44:
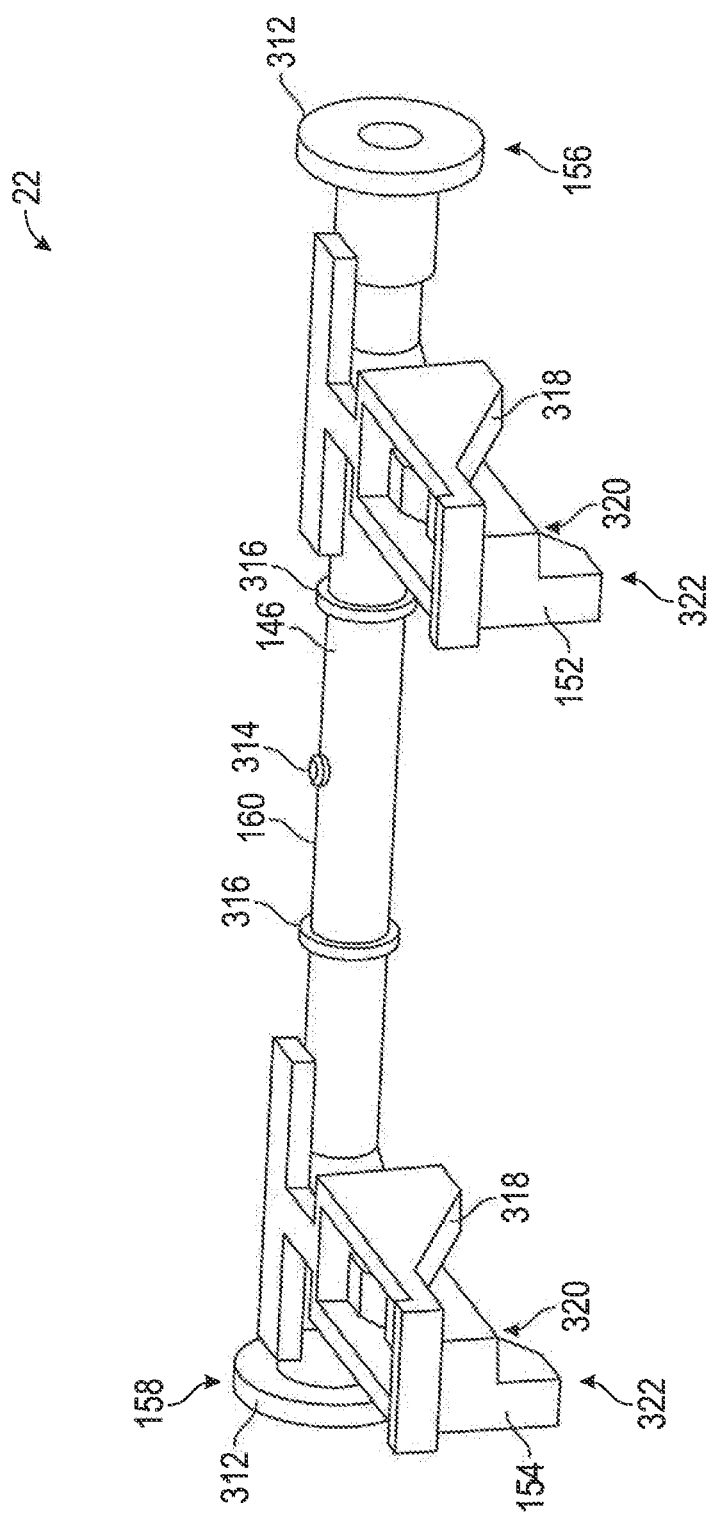
FIG. 44 is a front perspective view of the dosage adjustment member from the fluid dispenser of FIG. 37.
Figure 45:
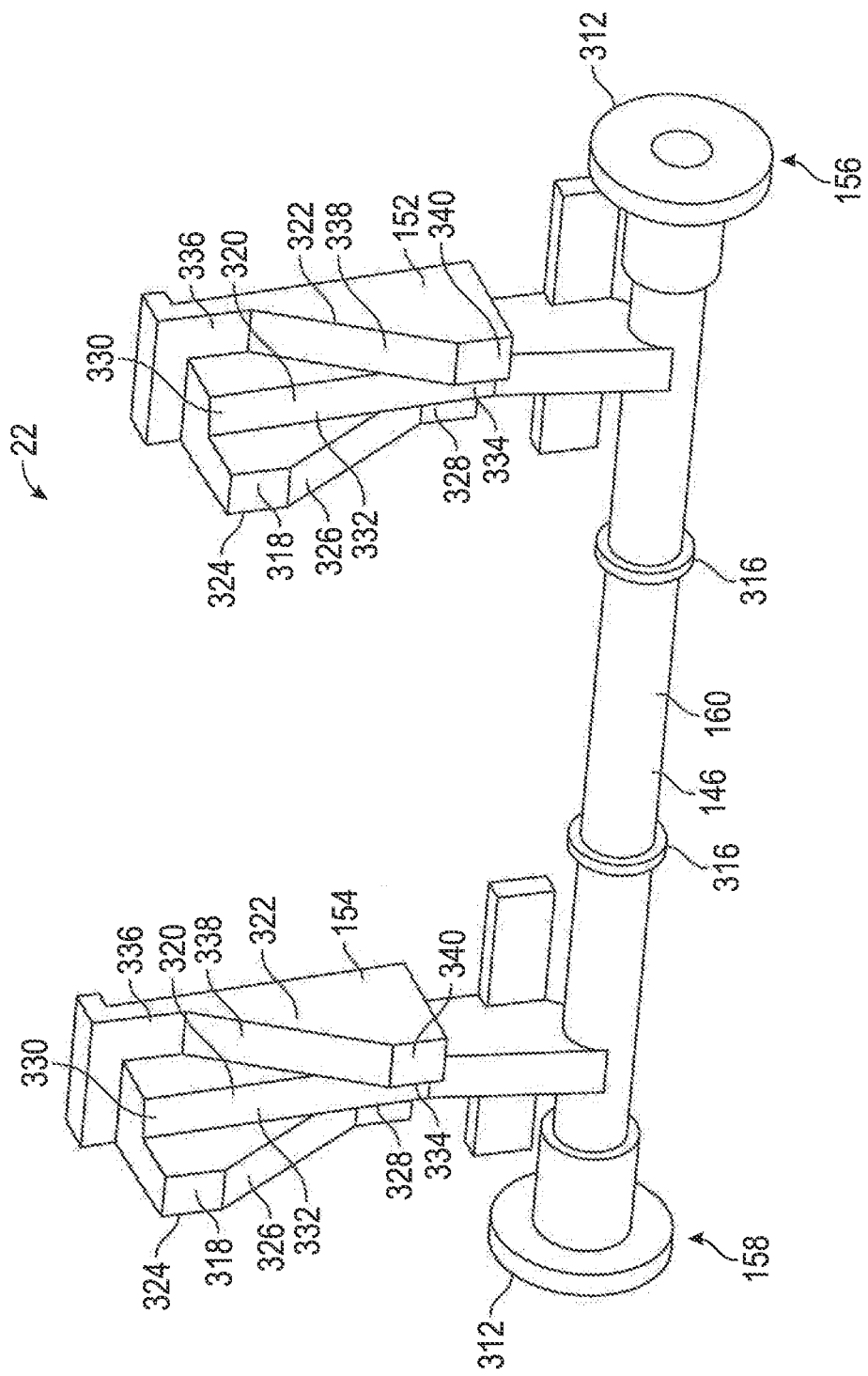
FIG. 45 is a bottom perspective view of the dosage adjustment member of FIG. 44.

The dosage adjustment member 22 is shown in FIGS. 44 and 45 as including a shaft 146, a first cam body 152, and a second cam body 154. The shaft 146 extends from a first end 156 to a second end 158, with a generally cylindrical center portion 160 therebetween. Each of the first and second ends 156, 158 has a disc-shaped adjustment handle 312. At the center of the center portion 160 of the shaft 146 there is a locking pin 314 that extends upwardly and is sized to be received within one of the locking holes 310 in the locking body 290. Two stopping rings 316 having a wider diameter than the center portion 160 of the shaft 146 are positioned on either side of the locking pin 314. The central portion 160 of the shaft 146 has a diameter that is selected so as to be received within the adjustment channel 304 of the locking body 290.

The first cam body 152 and the second cam body 154 are identical and extend forwardly from the shaft 146 near the first end 156 and the second end 158, respectively. Each of the first and second cam bodies 152, 154 has a low dosage cam surface 318, a medium dosage cam surface 320, and a high dosage cam surface 322. The low dosage cam surfaces 318 face downwardly and are positioned at the left side of the first and second cam bodies 152, 154. Each low dosage cam surface 318 has a front segment 324, a central segment 326, and a rear segment 328. The front segment 324 of the low dosage cam surface 318 is flat and is positioned downwardly relative to the shaft 146. The central segment 326 of the low dosage cam surface 318 is inclined upwardly from the front of the central segment 326 towards the rear of the central segment 326. The rear segment 328 of the low dosage cam surface 318 is flat and is positioned upwardly relative to the first segment 324 of the low dosage cam surface 318.

The medium dosage cam surfaces 320 also face downwardly and are positioned immediately to the right of the low dosage cam surfaces 318. Each medium dosage cam surface 320 has a front segment 330, a central segment 332, and a rear segment 334. The front segment 330, the central segment 332, and the rear segment 334 are all flat and are at the same height relative to each other. The medium dosage cam surfaces 320 are positioned upwardly relative to the first segment 324 of the low dosage cam surface 318, and downwardly relative to the rear segment 328 of the low dosage cam surface 318.

The high dosage cam surfaces 322 also face downwardly and are positioned immediately to the right of the medium dosage cam surfaces 320. Each high dosage cam surface 322 has a front segment 336, a central segment 338, and a rear segment 340. The front segment 336 of the high dosage cam surface 322 is flat and is positioned upwardly relative to the medium dosage cam surface 320. The central segment 338 of the high dosage cam surface 322 is inclined downwardly from the front of the central segment 338 towards the rear of the central segment 338. The rear segment 340 of the high dosage cam surface 322 is flat and is positioned downwardly relative to the medium dosage cam surface 320.

Figure 46:
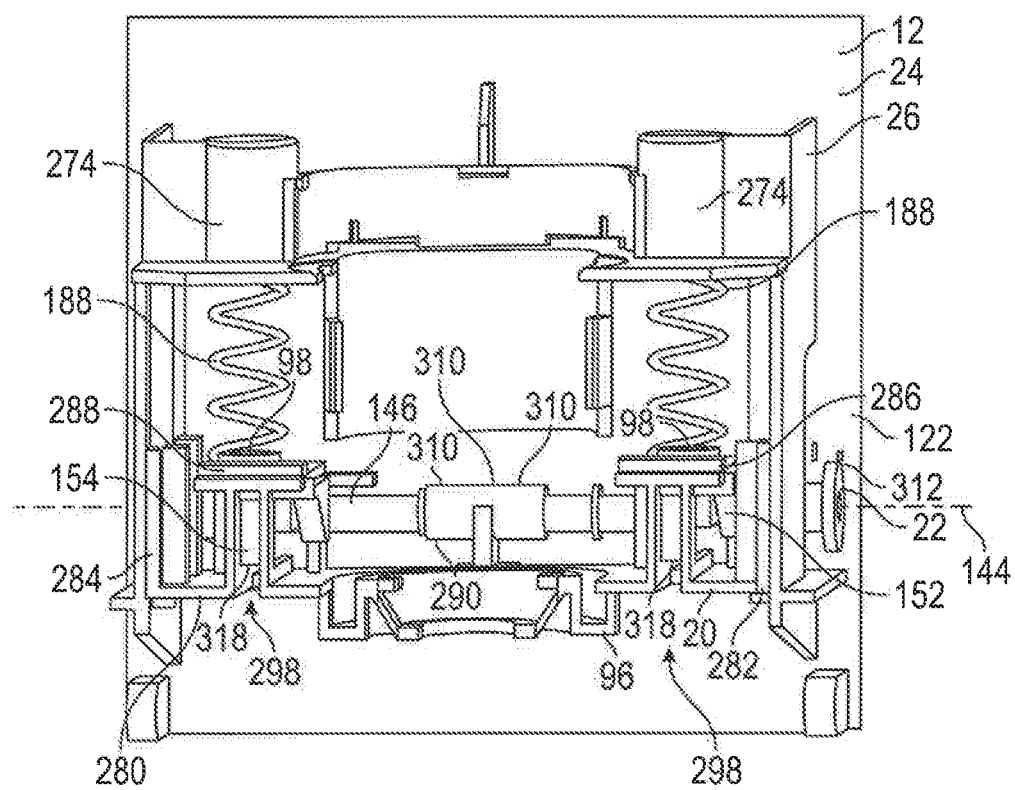
FIG. 46 is a front perspective view of fluid dispenser of FIG. 37, with the housing cover, the actuator, the fluid pump, and the fluid reservoir omitted, and with the dosage adjustment member at a low dosage setting.
Figure 47:
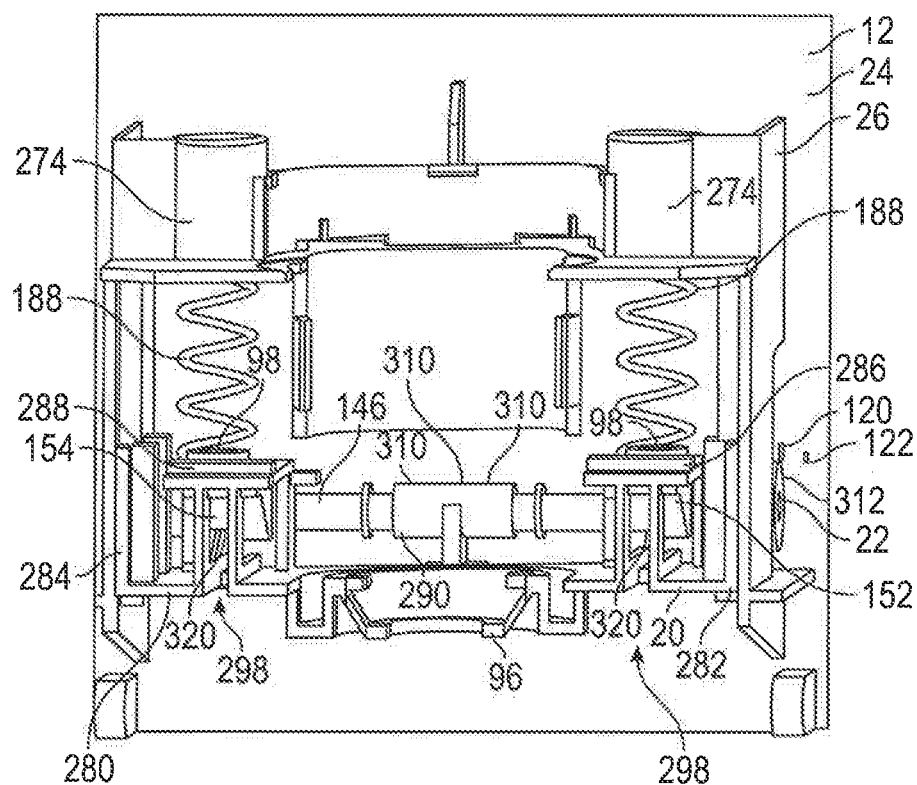
FIG. 47 is a front perspective view of fluid dispenser of FIG. 46, with the dosage adjustment member at a medium dosage setting.
Figure 48:
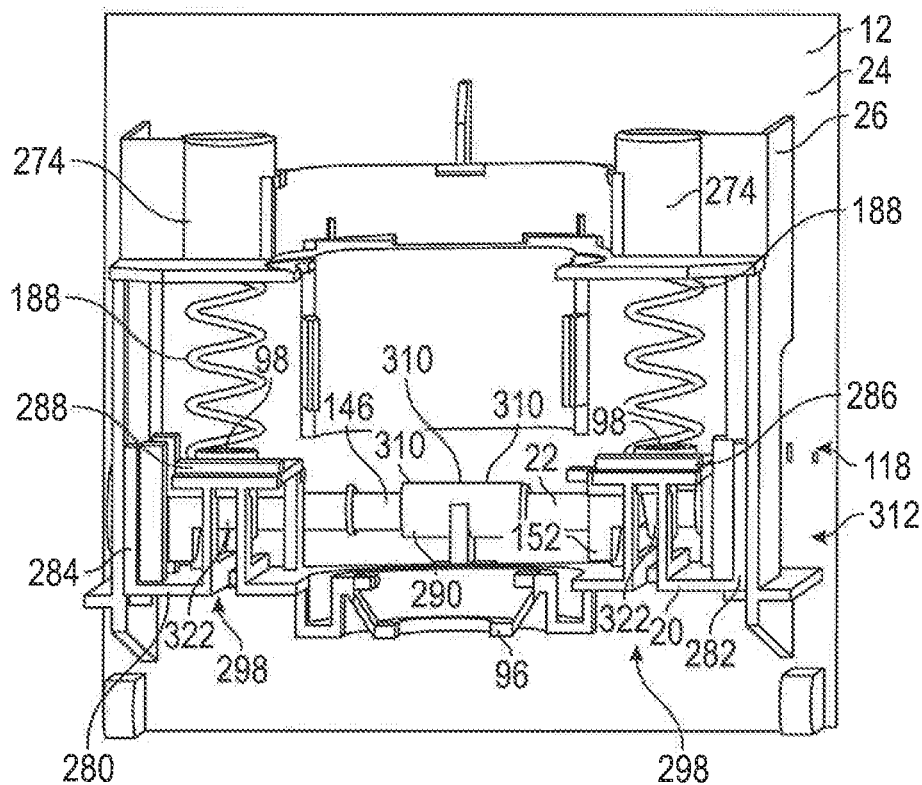
FIG. 48 is a front perspective view of fluid dispenser of FIG. 46, with the dosage adjustment member at a high dosage setting.

As shown in FIGS. 46 to 48, the shaft 146 of the dosage adjustment member 22 extends through the dosage adjustment channel 304 of the pump displacement body 20, with the first cam body 152 extending below the right spring platform 286 and the second cam body 154 extending below the left spring platform 288. The dosage adjustment member 22 is movable along the adjustment axis 144 relative to the pump displacement body 20 between a low dosage setting, as shown in FIG. 46, a medium dosage setting, as shown in FIG. 47, and a high dosage setting, as shown in FIG. 48.

When at the low dosage setting, as shown in FIG. 46, the adjustment handles 312 are aligned with the low dosage selection markers 122 on the back panel 24, the locking pin 314 is received in the right locking hole 310, and the low dosage cam surfaces 318 are positioned above the actuator receiving channels 298 between the cam alignment walls 300. To move the dosage adjustment member 22 to the medium dosage setting, the shaft 146 is moved to the left along the adjustment axis 144 by pushing the adjustment handle 312 at the first end 156 of the shaft or by pulling the adjustment handle 312 at the second end 158 of the shaft 146, until the adjustment handles 312 are aligned with the medium dosage adjustment markers 120. Preferably, the locking pin 314 engages with the locking holes 310 in a friction fit that holds the dosage adjustment member 20 at the selected dosage setting, but which can be disengaged to select a new dosage setting by applying sufficient force to the adjustment handles 312.

When at the medium dosage setting, as shown in FIG. 47, the adjustment handles 312 are aligned with the medium dosage selection markers 120 on the back panel 24, the locking pin 314 is received in the middle locking hole 310, and the medium dosage cam surfaces 320 are positioned above the actuator receiving channels 298 between the cam alignment walls 300. To move the dosage adjustment member 22 to the high dosage setting, the shaft 146 is moved further to the left along the adjustment axis 144 by pushing the adjustment handle 312 at the first end 156 of the shaft or by pulling the adjustment handle 312 at the second end 158 of the shaft 146, until the adjustment handles 312 are aligned with the high dosage adjustment markers 118. When at the high dosage setting, as shown in FIG. 48, the adjustment handles 312 are aligned with the high dosage selection markers 118 on the back panel 24, the locking pin 314 is received in the left locking hole 310, and the high dosage cam surfaces 322 are positioned above the actuator receiving channels 298 between the cam alignment walls 300.

Figure 49:
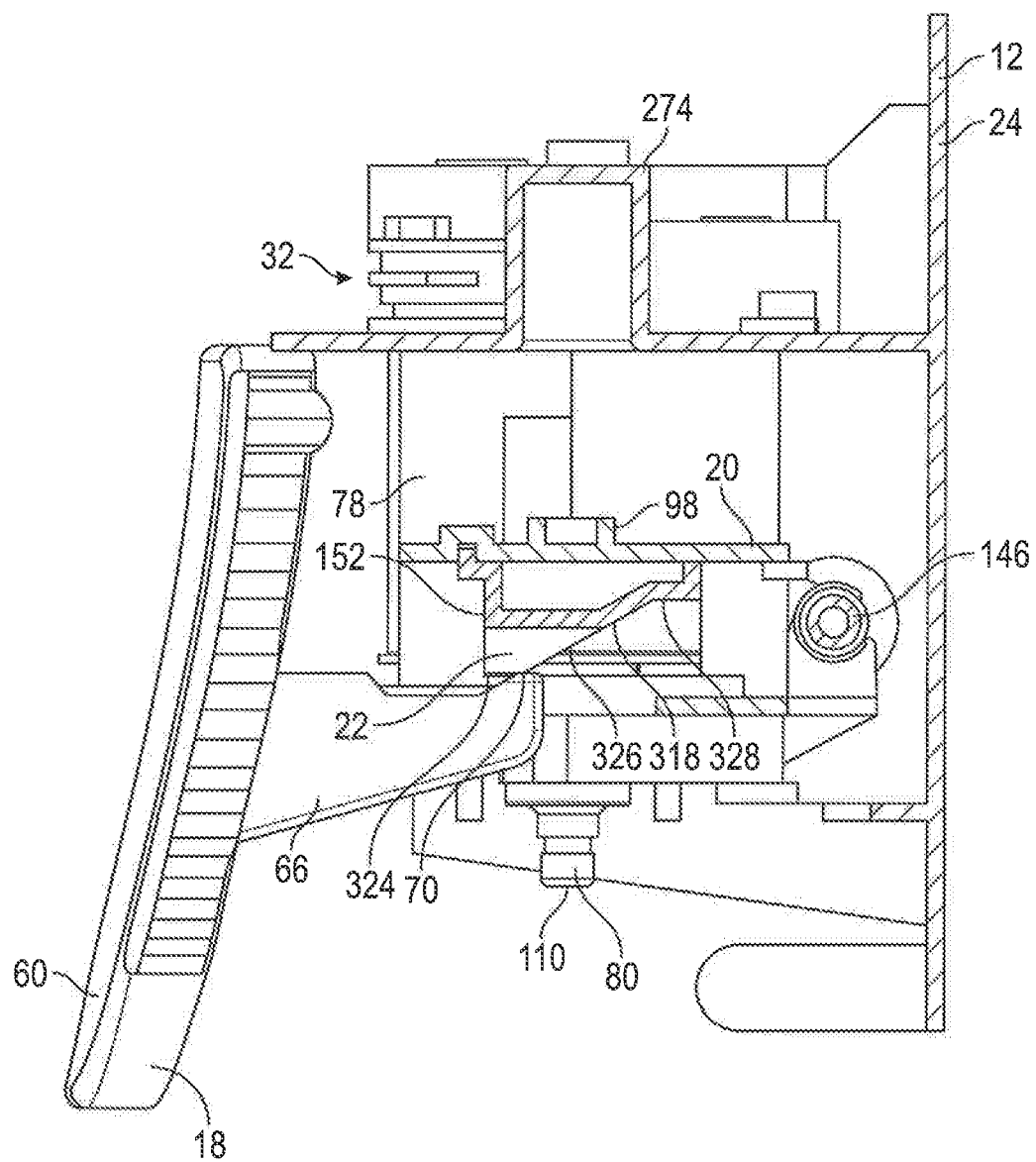
FIG. 49 is a cross-sectional side view of the fluid dispenser of FIG. 37, with the housing cover, the fluid reservoir, and the biasing springs omitted, and with the actuator at the first position and the dosage adjustment member at the low dosage setting.
Figure 50:
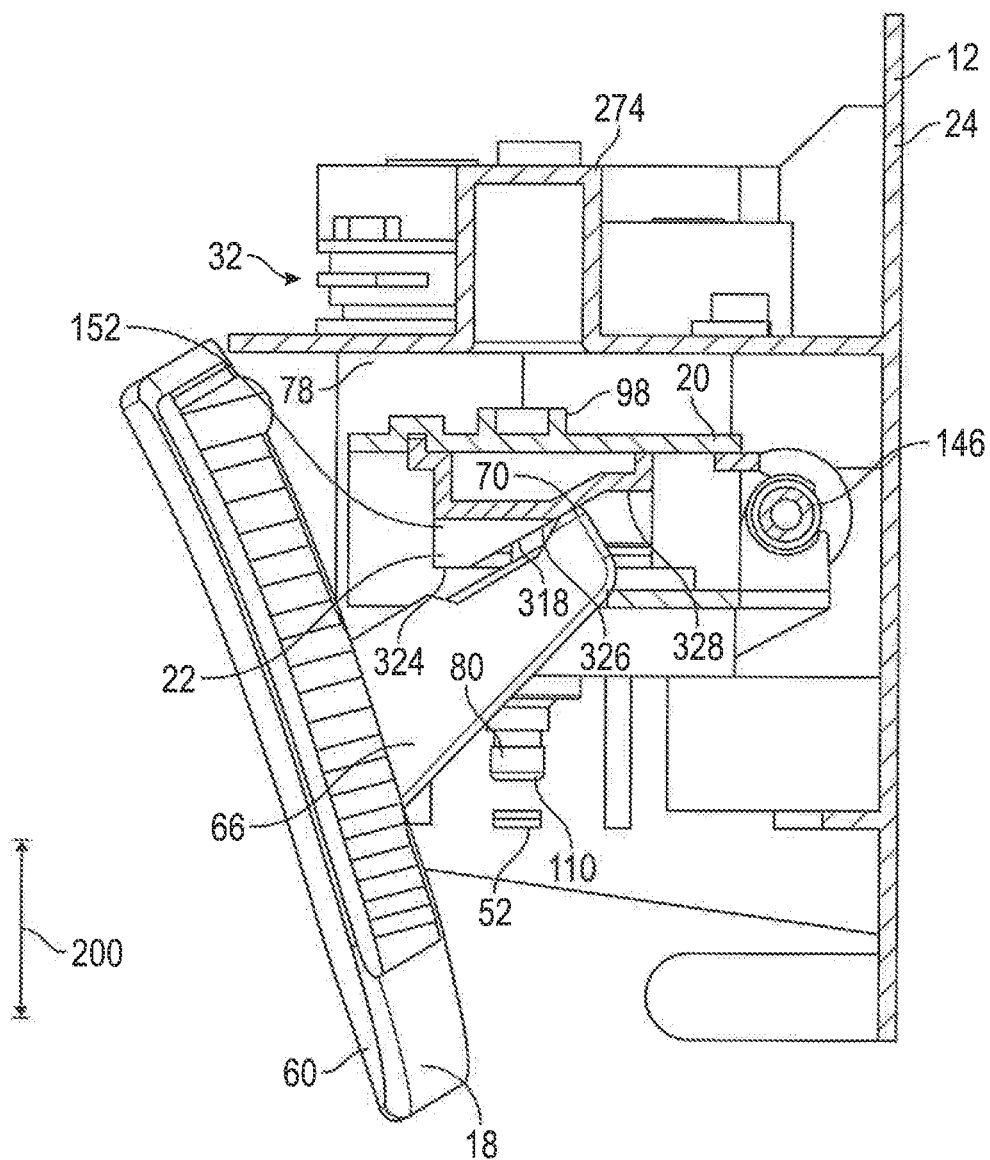
FIG. 50 is a cross-sectional side view of the fluid dispenser of FIG. 49, with the actuator at the second position and the dosage adjustment member at the low dosage setting.

As in the embodiments shown in FIGS. 1 to 36, in the embodiment shown in FIGS. 37 to 54 fluid is dispensed by manually depressing the front panel 60 of the actuator 18 so as to overcome the biasing force of the springs 188 and pivot the actuator 18 about the actuator axis 58 from the first position, as shown in FIG. 49, to the second position, as shown in FIG. 50. When the actuator 18 is at the first position, the camming bodies 66 extend through the actuator receiving channels 298 in the pump displacement body 20 and the camming surfaces 70 engage with whichever of the low dosage cam surfaces 318, medium dosage cam surfaces 320, or high dosage cam surfaces 322 are positioned above the actuator receiving channels 298. When the dosage adjustment member 22 is at the low dosage setting, as shown in FIG. 49, the camming surfaces 70 engage with the low dosage cam surfaces 318.

The movement of the actuator 18 from the first position to the second position causes the camming surfaces 70 to move upwardly and rearwardly relative to the housing 12. The engagement of the camming surfaces 70 with the cam surfaces 318 during this movement causes the pump displacement body 20 to slide upwardly along the track members 50. The upwards movement of the pump displacement body 20 moves the piston-forming element 80 along the pump axis 82 inwardly relative to the piston chamber-forming body 78, from an extended position, as shown in FIG. 49, to a retracted position, as shown in FIG. 50.

Upon release of the actuator 18, the pump displacement body 20 slides downwardly along the track members 50 under the biasing force of the springs 188. This downwards movement of the pump displacement body 20 draws the piston-forming element 80 along the pump axis 82 outwardly relative to the piston chamber-forming body 78, from the retracted position to the extended position. The reciprocal movement of the piston-forming element 80 relative to the piston chamber-forming body 78 causes the fluid pump 16 to dispense an allotment of fluid from the dispenser outlet 110.

As in the previous embodiments, the volume of fluid that is dispensed upon activation of the fluid pump 16 depends on the distance that the piston-forming element 80 travels between the extended position and the retracted position. The distance between the extended position and the retracted position, and thus the volume of fluid that is dispensed, can be adjusted by changing the dosage setting of the dosage adjustment member 22.

When the dosage adjustment member 22 is at the low dosage setting, as shown in FIG. 49, the low dosage cam surfaces 318 are positioned above the actuator receiving channels 298 and engage with the camming surfaces 70 of the actuator 18. When the actuator 18 is at the first position, as shown in FIG. 49, the camming surfaces 70 engage with the front segments 324 of the low dosage cam surfaces 318, which are positioned downwardly relative to the shaft 146. The downwards position of the front segments 324 of the low dosage cam surfaces 318 positions the piston-forming element 80 at a low dosage extended position.

When the actuator 18 is pivoted from the first position to the second position, the camming surfaces 70 move rearwardly along the low dosage cam surfaces 318 from the front segments 324 along the central segments 326 towards the rear segments 328. As shown in FIG. 50, when the actuator 18 is at the second position the camming surfaces 70 are positioned near the rear of the central segments 326, locating the piston-forming element 80 at a low dosage retracted position. The distance between the low dosage extended position and the low dosage retracted position is the low dosage stroke distance 200.

When the dosage adjustment member 22 is at the low dosage setting and the actuator 18 is pivoted from the first position to the second position, the piston-forming element 80 moves the low dosage stroke distance 200 from the low dosage extended position to the low dosage retracted position, which causes the fluid pump 16 to dispense a relatively small volume of the fluid from the dispenser outlet 110.

To dispense a larger volume of fluid, the dosage adjustment member 22 can be moved to the medium dosage setting by sliding the shaft 146 along the adjustment axis 144 until the medium dosage cam surfaces 320 are positioned above the actuator receiving channels 298.

Figure 51:
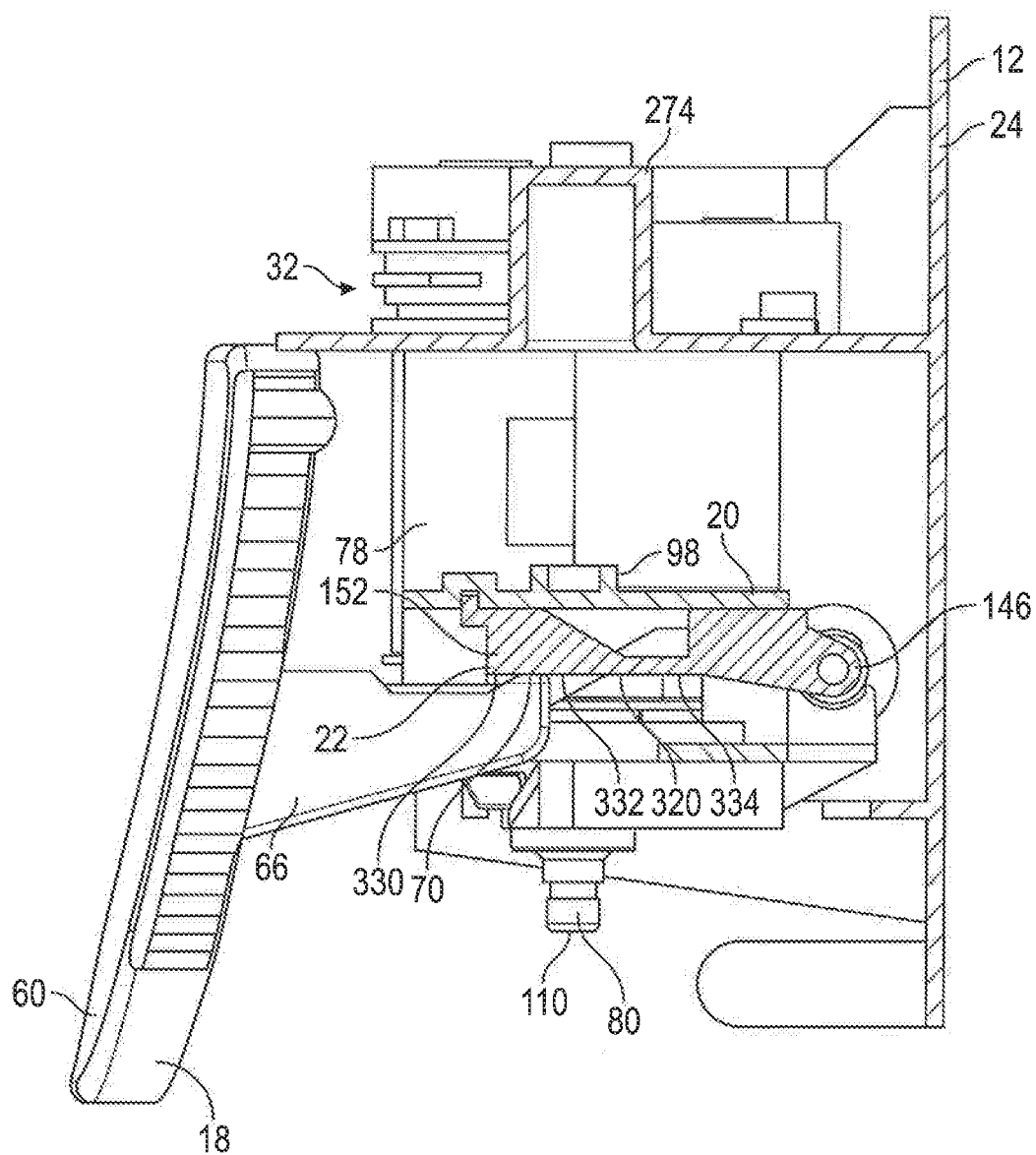
FIG. 51 is a cross-sectional side view of the fluid dispenser of FIG. 49, with the actuator at the first position and the dosage adjustment member at the medium dosage setting.

When the dosage adjustment member 22 is at the medium dosage setting and the actuator 18 is at the first position, as shown in FIG. 51, the camming surfaces 70 engage with the front segments 330 of the medium dosage cam surfaces 320, which are positioned upwardly relative to the front segments 324 of the low dosage cam surfaces 318. The relatively higher position of the front segments 330 of the medium dosage cam surfaces 320 locates the piston-forming element 80 at a medium dosage extended position, as shown in FIG. 51, which is further outwards along the pump axis 82 compared to the low dosage extended position, as shown in FIG. 49.

Figure 52:
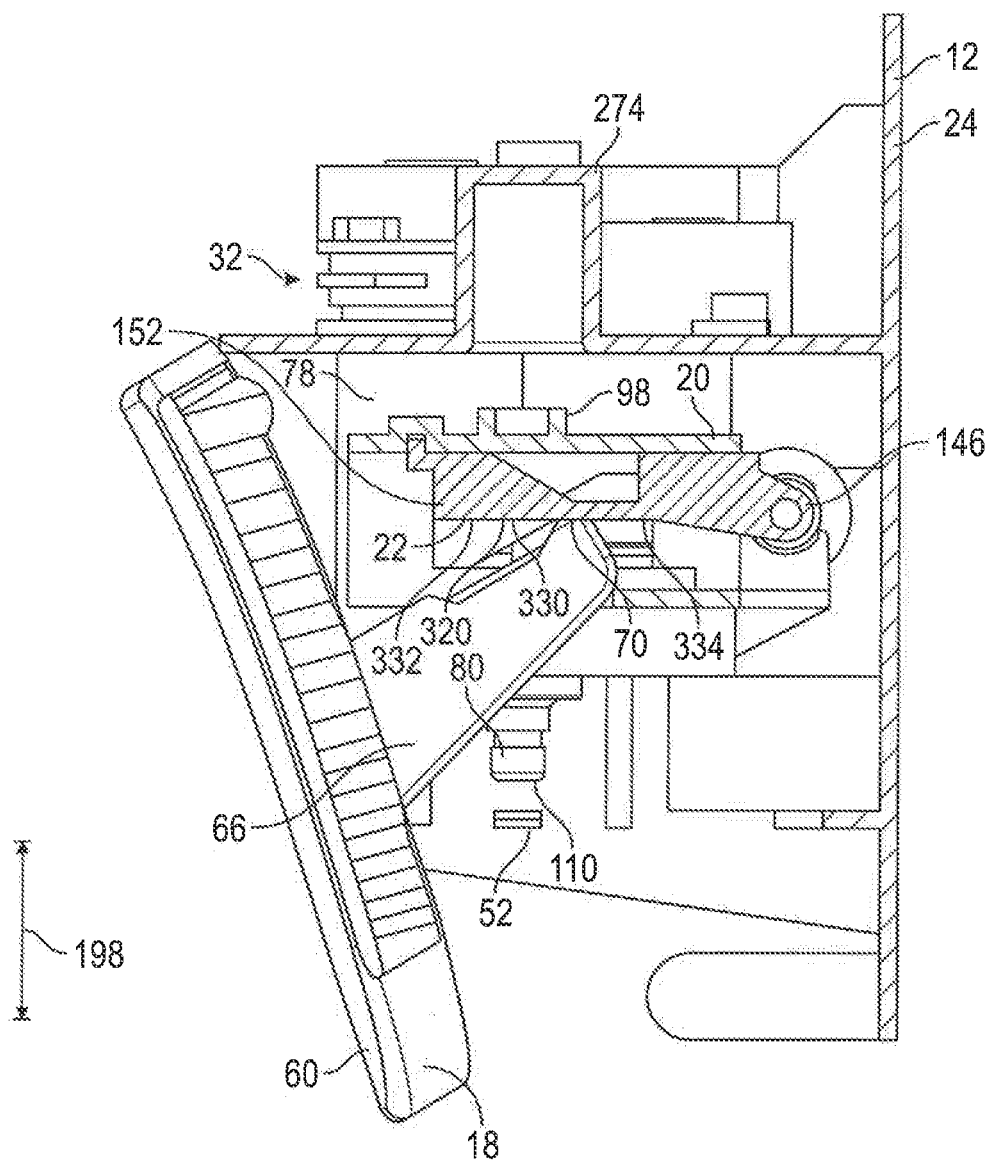
FIG. 52 is a cross-sectional side view of the fluid dispenser of FIG. 49, with the actuator at the second position and the dosage adjustment member at the medium dosage setting.

When the actuator 18 is pivoted from the first position to the second position, the camming surfaces 70 move rearwardly along the medium dosage cam surfaces 320 from the front segments 330 to the rear segments 334. As shown in FIG. 52, when the actuator 18 is at the second position and the camming surfaces 70 are positioned at the rear segments 334 of the medium dosage cam surfaces 320, the piston-forming element 80 is located at a medium dosage retracted position. The distance between the medium dosage extended position and the medium dosage retracted position is the medium dosage stroke distance 198. The medium dosage stroke distance 198 is larger than the low dosage stroke distance 200, and so the fluid pump 16 dispenses a larger volume of the fluid from the dispenser outlet 110 when the dosage adjustment member 22 is at the medium dosage setting compared to the low dosage setting.

To dispense an even larger volume of fluid, the dosage adjustment member 22 can be moved to the high dosage setting by sliding the shaft 146 further along the adjustment axis 144 until the high dosage cam surfaces 322 are positioned above the actuator receiving channels 298.

Figure 53:
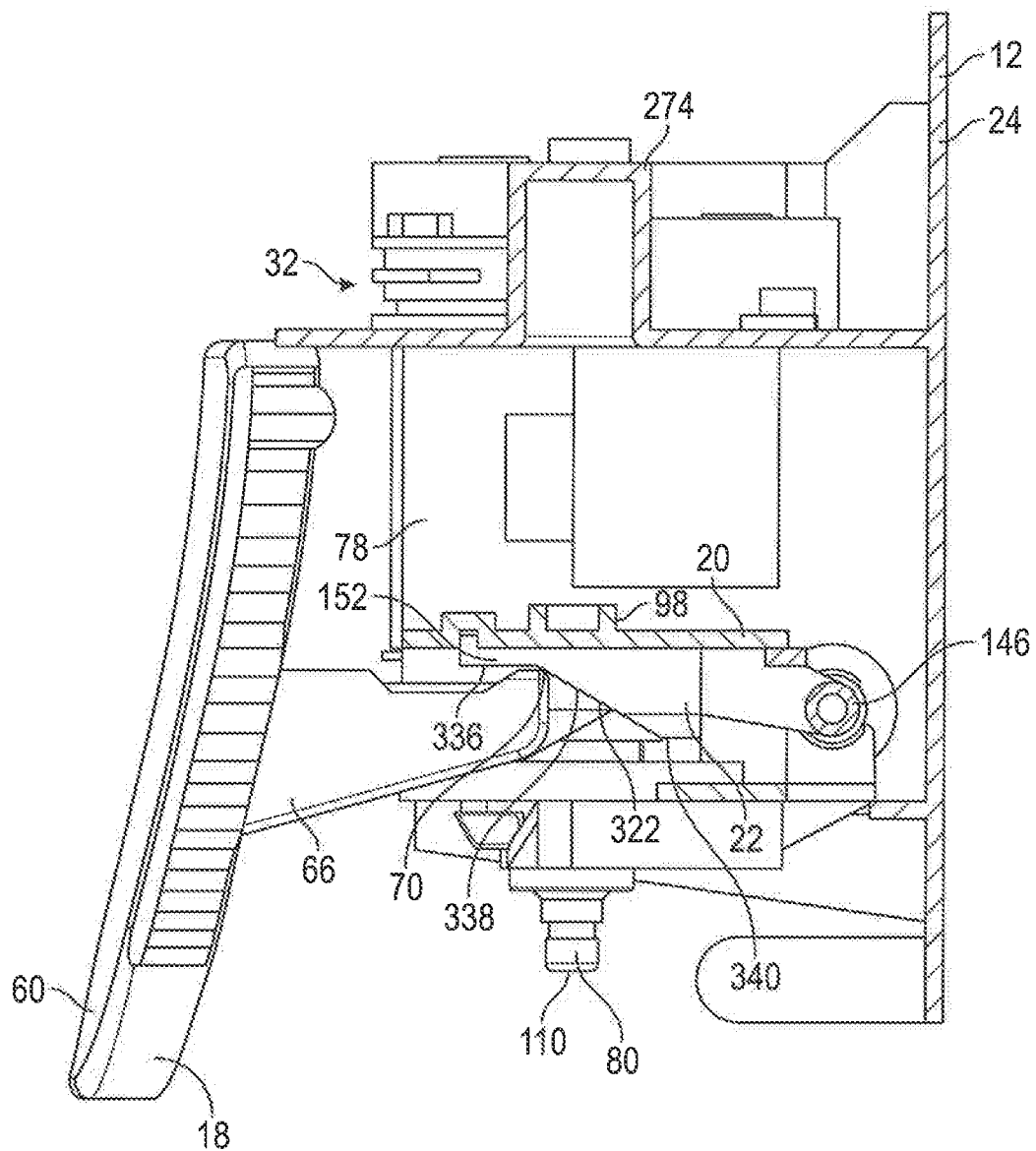
FIG. 53 is a cross-sectional side view of the fluid dispenser of FIG. 49, with the actuator at the first position and the dosage adjustment member at the high dosage setting.

When the dosage adjustment member 22 is at the high dosage setting and the actuator 18 is at the first position, as shown in FIG. 53, the camming surfaces 70 engage with the central segments 338 of the high dosage cam surfaces 322 near the front of the central segments 338, which are positioned upwardly relative to the front segments 330 of the medium dosage cam surfaces 320. The relatively higher position of the front of the central segments 338 of the high dosage cam surfaces 322 locates the piston-forming element 80 at a high dosage extended position, as shown in FIG. 53, which is further outwards along the pump axis 82 compared to the medium dosage extended position, as shown in FIG. 51.

Figure 54:
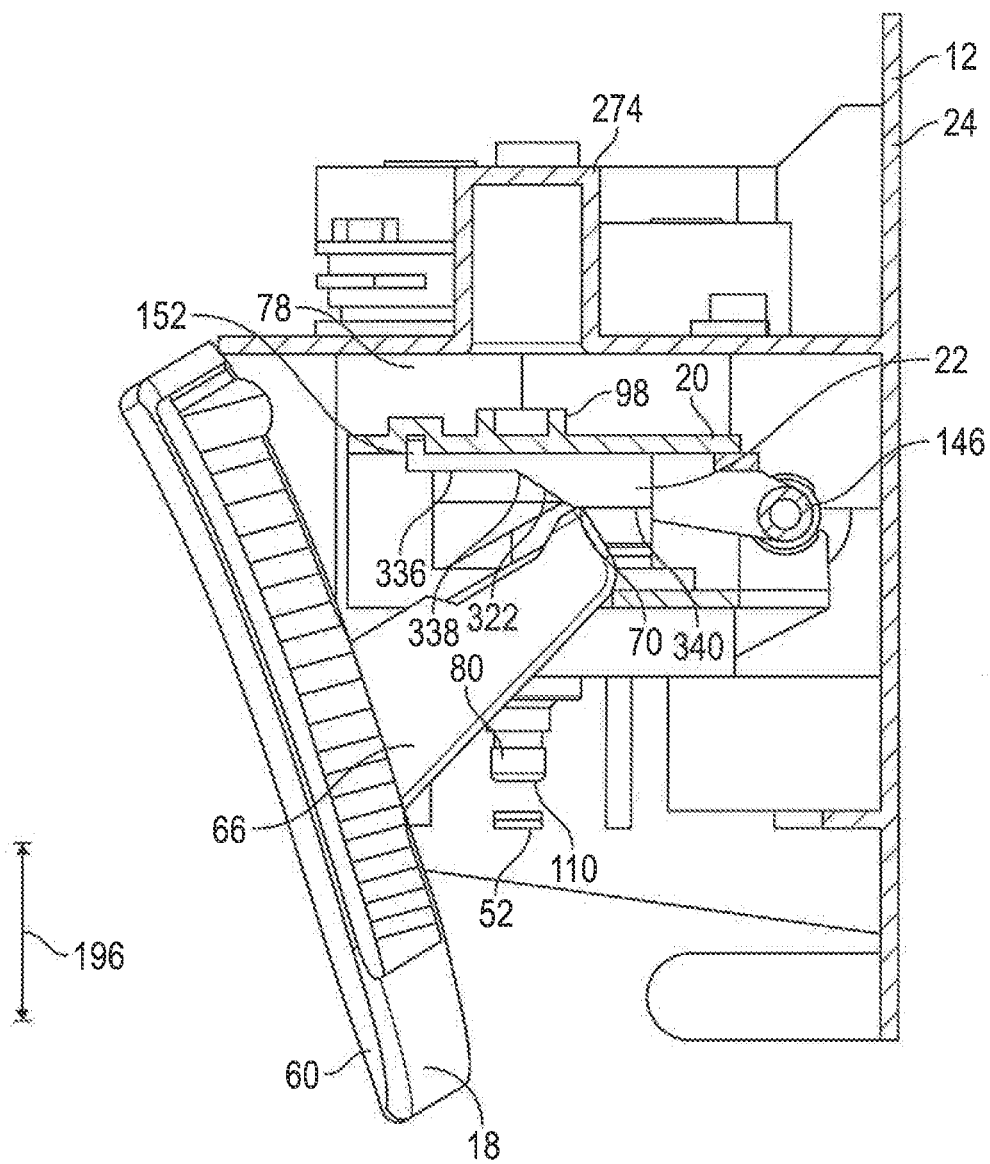
FIG. 54 is a cross-sectional side view of the fluid dispenser of FIG. 49, with the actuator at the second position and the dosage adjustment member at the high dosage setting.

When the actuator 18 is pivoted from the first position to the second position, the camming surfaces 70 move rearwardly along the high dosage cam surfaces 322 towards the rear segments 340. As shown in FIG. 54, when the actuator 18 is at the second position the camming surfaces 70 are positioned at the rear of the central segments 338 of the high dosage cam surfaces 322, locating the piston-forming element 80 at a high dosage retracted position. The distance between the high dosage extended position and the high dosage retracted position is the high dosage stroke distance 196. The high dosage stroke distance 196 is larger than the medium dosage stroke distance 198, and so the fluid pump 16 dispenses a larger volume of the fluid from the dispenser outlet 110 when the dosage adjustment member 22 is at the high dosage setting compared to the medium dosage setting.

The fluid dispenser 10 of FIGS. 37 to 54 thus provides an alternative mechanism allowing for the selection of three different dosage volumes by adjusting the position of the dosage adjustment member 22. Similarly to the embodiment shown in FIGS. 26 to 36, the different inclinations of the central segments 326, 332, 338 of the low dosage cam surfaces 318, the medium dosage cam surfaces 320, and the high dosage cam surfaces 322 cause the low dosage retracted position, as shown in FIG. 50, the medium dosage retracted position, as shown in FIG. 52, and the high dosage retracted position, as shown in FIG. 54, to be closer to each other than the low dosage extended position, as shown in FIG. 49, the medium dosage extended position, as shown in FIG. 51, and the high dosage extended position, as shown in FIG. 53. The piston-forming element 80 thus returns to roughly the same retracted position regardless of which dosage setting is selected. The actuator 18 also pivots the same distance from the first position to the second position regardless of the dosage setting that is selected, and effects movement of the piston-forming element 80 for the entire duration of the movement from the first position to the second position.

It will be understood that, although various features of the invention have been described with respect to one or another of the embodiments of the invention, the various features and embodiments of the invention may be combined or used in conjunction with other features and embodiments of the invention as described and illustrated herein.

The invention is not limited to the specific constructions of the fluid dispenser 10 that have been described and illustrated. Rather, any suitable construction that provides a dosage adjustment mechanism for selecting between a high dosage extended position and a low dosage extended position of the piston-forming element 80 relative to the piston chamber-forming body 78 could be used. The invention is not limited to the particular constructions of the housing 12, the fluid reservoir 14, the fluid pump 16, the actuator 18, the pump displacement body 20, or the dosage adjustment member 22 that have been shown in the preferred embodiments. In some alternative embodiments, a diaphragm-type pump could be used instead of a piston-type pump, for example.

Although the preferred embodiments have been described with reference to a particular upwards and downwards orientation, it is to be appreciated that the invention is not limited to this orientation. Rather, the invention could be adapted for any desired orientation, including, for example, embodiments that draw the fluid upwardly from the fluid reservoir 14.

Although the preferred embodiments that have been described each have two camming surfaces 70 that engage with two cam surfaces 184, the invention could be adapted to include only one camming surface 70 that engages with one cam surface 184. The invention could also be adapted to incorporate more than two camming surfaces 70 that engage with more than two cam surfaces 184.

Although the preferred embodiments have been described as being manually operated, the fluid dispenser 10 could also be electronically operated.

Although the fluid dispenser 10 preferably dispenses hand cleaning fluid, such as hand soap or hand sanitizer, the dispenser 10 could be adapted to dispense other fluids as well, such as condiments, tooth paste, shaving foam, or hand lotion. The term "fluid" as used herein includes any flowable substance, including liquids, foams, emulsions, and dispersions.

The fluid dispenser 10 could be adapted to dispense any desired volume of fluid at each dosage setting, and could have fewer dosage settings or more dosage settings than those shown in the preferred embodiments. For example, when the dosage adjustment member 22 is at the high dosage setting and the actuator 18 is moved from the first position to the second position, the piston-forming element 80 preferably moves between a fully retracted position and a fully extended position that is 19 mm from the fully retracted position, and dispenses 1.5 ml of fluid from the dispenser outlet 110. When the dosage adjustment member 22 is at the medium dosage setting and the actuator 18 is moved from the first position to the second position, the piston-forming element 80 preferably moves between the fully retracted position and a partially extended position that is 13 mm from the fully retracted position, and dispenses 1.0 ml of fluid from the dispenser outlet 110. When the dosage adjustment member 22 is at the low dosage setting and the actuator 18 is moved from the first position to the second position, the piston-forming element 80 preferably moves between the fully retracted position and a partially extended position that is 7 mm from the fully retracted position, and dispenses 0.5 ml of fluid from the dispenser outlet 110. In embodiments in which the actuator 18 moves 19 mm from the first position to the second position, the ratio between the movement of the actuator 18 and the movement of the piston-forming element 80 when at the high dosage setting is about 1:1, when at the medium dosage setting is about 1.5:1, and when at the low dosage setting is about 2.7:1. There is therefore an increasing mechanical advantage as the dosage setting is reduced from high to medium to low. This mechanical advantage would allow the dispenser 10 to be operated with less force when at lower dosage settings.

Although in the preferred embodiments the movement of the actuator 18 from the first position to the second position effects movement of the piston-forming element 80 from the extended position to the retracted position, this is not strictly necessary. For example, in alternative embodiments the movement of the actuator 18 from the first position to the second position could effect movement of the piston-forming element 80 from the retracted position to the extended position. The actuator 18 and/or the pump displacement body 20 and/or the dosage adjustment member 22 could also be adapted so that the piston-forming element 80 is at an intermediate position between the retracted position and the extended position when the actuator 18 is at the first position.

The terms "high dosage", "medium dosage", and "low dosage" as used herein are not limited to any particular range of dosages, but rather refer solely to the relative volumes of fluid that are dispensed at each dosage setting. Any dosage setting that dispenses a greater volume of fluid than another dosage setting may be referred to as a "high dosage setting", and any dosage setting that dispenses a smaller volume of fluid than another dosage setting may be referred to as a "low dosage setting", regardless of whether the absolute volume of fluid that is dispensed might be considered large or small in a given context.

In the preferred embodiments, the rotational position of the first and second cam bodies 152, 154 is selected by moving the cam bodies 152, 154 laterally along the adjustment axis 144 away from the cam receiving walls 92, 94 from the locked position to the unlocked position, and then rotating the cam bodies 152, 154 about the adjustment axis 144. In alternative embodiments, the first and second cam bodies 152, 154 could be locked and unlocked without having to move the cam bodies 152, 154 laterally along the adjustment axis 144. For example, in alternative embodiments one or more threaded fasteners could be used in place of the notches 202 to hold the cam bodies 152, 154 at the selected rotational position. In these embodiments, the cam bodies 152, 154 could be unlocked by loosening the threaded fasteners, thereby allowing the cam bodies 152, 154 to be rotated about the adjustment axis 144 without requiring the cam bodies 152, 154 to be moved laterally along the adjustment axis 144 away from the cam receiving walls 92, 94. Other types of fasteners and locking mechanism could also be used.

Although the cam surfaces 184 are shown in the preferred embodiments as being flat, that is in a single flat plane, this is not necessary. In alternative embodiments, the cam surfaces 184 could be curved or could include any desired combination of flat, curved, and/or inclined sections. For example, an alternative cam surface 184 can have one or more curved sections as seen in side view. The shape of the cam surfaces 184 may be selected to adjust the extended position, the retracted position, and/or the relative speed of the piston-forming element 80 relative to the actuator 18 during activation of the dispenser 10.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

We claim:

1. A fluid dispenser comprising:
a pump mechanism that dispenses a dose of fluid when a movable pump member of the pump mechanism is moved relative to a reciprocal pump member of the pump mechanism along a pump axis between a selected extended position and a retracted position;
a dose adjustment mechanism for selecting the selected extended position from at least a high dose extended position and a low dose extended position; and
an actuator that, when activated, effects movement of the movable pump member between the selected extended position and the retracted position to dispense the dose of fluid;
wherein a volume of the dose of fluid that is dispensed upon activation of the actuator is higher when the high dose extended position is the selected extended position than when the low dose extended position is the selected extended position; and
wherein the movable pump member is axially extended further from the reciprocal pump member when at the high dose extended position than when at the low dose extended position.

2. The fluid dispenser according to claim 1, wherein the actuator comprises a camming surface;
wherein the dose adjustment mechanism comprises a cam body that presents a cam surface for engagement with the camming surface; and
wherein the movable pump member is located at the selected extended position when the camming surface engages with the cam surface at an extended engagement portion of the cam surface.

3. The fluid dispenser according to claim 2, wherein the dose adjustment mechanism further comprises a cam selection mechanism for selecting a position of the extended engagement portion relative to the movable pump member; and
wherein the selected extended position is selected by selecting the position of the extended engagement portion relative to the movable pump member.

4. The fluid dispenser according to claim 3, wherein the movable pump member is located at the retracted position when the camming surface engages with the cam surface at a retracted engagement portion of the cam surface;
wherein the cam body is mechanically connected to the movable pump member for moving the movable pump member relative to the reciprocal pump member along the pump axis;
wherein, upon activation of the actuator, the camming surface moves across the cam surface between the extended engagement portion and the retracted engagement portion;

wherein the movement of the camming surface across the cam surface moves the cam body axially relative to the reciprocal pump member; and wherein the axial movement of the cam body moves the movable pump member along the pump axis between the selected extended position and the retracted position.

5. The fluid dispenser according to claim 4, wherein the movable pump member is axially extended from the reciprocal pump member when at the selected extended position, and axially retracted from the reciprocal pump member when at the retracted position;

wherein the cam selection mechanism selects the position of the extended engagement portion of the cam surface relative to the movable pump member at least from a low dose extended engagement position and a high dose extended engagement position; and wherein the movable pump member is axially extended further from the reciprocal pump member when the camming surface is engaged with the cam surface at the high dose extended engagement position than when the camming surface is engaged with the cam surface at the low dose extended engagement position.

6. The fluid dispenser according to claim 5, wherein the retracted engagement portion of the cam surface remains at substantially the same position relative to the movable pump member regardless of whether the high dose extended position is the selected extended position or the low dose extended position is the selected extended position;

wherein movement of the actuator between a first position and a second position effects movement of the movable pump member between the selected extended position and the retracted position to dispense the dose of fluid;

wherein the camming surface engages with the extended engagement portion of the cam surface when the actuator is at the first position; and wherein the camming surface engages with the retracted engagement portion of the cam surface when the actuator is at the second position.

7. The fluid dispenser according to claim 6, wherein the camming surface moves axially towards the reciprocal pump member and across the cam surface from the extended engagement portion to the retracted engagement portion when the actuator moves from the first position to the second position; and wherein the axial movement of the camming surface towards the reciprocal pump member and across the cam surface from the extended engagement portion to the retracted engagement portion moves the movable pump member from the selected extended position to the retracted position.

8. The fluid dispenser according to claim 7, wherein the cam selection mechanism selects the position of the extended engagement portion relative to the movable pump member by rotating the cam body about an adjustment axis;

wherein the rotation of the cam body about the adjustment axis moves the extended engagement portion towards or away from the movable pump member;

wherein the dose adjustment mechanism further comprises a cam locking mechanism;

wherein the cam selection mechanism is movable between a locked position and an unlocked position, and is biased towards the locked position;

wherein, when in the locked position, the cam body engages with the cam locking mechanism to hold the cam surface at a selected rotational position relative to the adjustment axis;

wherein the cam selection mechanism is movable from the locked position to the unlocked position by moving the cam body away from and out of engagement with the cam locking mechanism;

wherein the selected rotational position of the cam surface is selected by rotating the cam selection mechanism while in the unlocked position, to thereby rotate the cam body to the selected rotational position, and then moving the cam body back into engagement with the cam locking mechanism;

wherein the cam body has a locking end that is spaced from the adjustment axis; and wherein the cam locking mechanism comprises an arcuate cam locking surface that has a set of notches that are sized to receive the locking end of the cam body.

9. The fluid dispenser according to claim 7, wherein the cam selection mechanism selects the cam surface that is presented for engagement with the camming surface from at least a high dose cam surface of the cam body and a low dose cam surface of the cam body;

wherein the extended engagement portion of the cam surface that is presented for engagement with the camming surface is selected from at least a high dose extended engagement portion of the high dose cam surface and a low dosage extended engagement portion of the low dose cam surface;

wherein the position of the high dose extended engagement portion of the high dose cam surface relative to the movable pump member differs from the position of the low dose extended engagement portion of the low dose cam surface relative to the movable pump member; and wherein the cam selection mechanism selects the cam surface that is presented for engagement with the camming surface by sliding the cam body relative to the camming surface to align the high dose cam surface, the low dose cam surface, or an additional cam surface of the cam body with the camming surface.

10. The fluid dispenser according to claim 5, wherein movement of the actuator between a first position and a second position effects movement of the movable pump member between the selected extended position and the retracted position to dispense the dose of fluid;

wherein a movement distance of the actuator between the first position and the second position is the same regardless of whether the high dose extended position is the selected extended position or the low dose extended position is the selected extended position;

wherein the dose adjustment mechanism selects the selected extended position without reducing the movement distance of the actuator between the first position and the second position, regardless of whether the high dose extended position is selected or the low dose extended position is selected;

wherein the dose adjustment mechanism provides a continuous mechanical linkage between the actuator and the movable pump member regardless of whether the high dose extended position is the selected extended position or the low dose extended position is the selected extended position;

wherein the dose adjustment mechanism selects the selected extended position without introducing a loose segment of movement of the actuator between the first position and the second position, regardless of whether the high dose extended position is selected or the low dose extended position is selected;

wherein a mechanical advantage of the mechanical linkage is increased when the low dose extended position is the selected extended position;

wherein the retracted position of the movable pump member remains substantially unchanged regardless of whether the high dose extended position is the selected extended position or the low dose extended position is the selected extended position; and wherein the fluid is a hand cleaning fluid.

11. The fluid dispenser according to claim 10, further comprising a biasing mechanism that biases the movable pump member towards the selected extended position;

wherein, when the movable pump member is at the selected extended position, the biasing mechanism provides a biasing force that is the same regardless of whether the high dose extended position is the selected extended position or the low dose extended position is the selected extended position; and wherein the biasing mechanism comprises a spring that engages with the actuator.

12. The fluid dispenser according to claim 10, further comprising a biasing mechanism that biases the movable pump member towards the selected extended position;

wherein, when the movable pump member is at the selected extended position, the biasing mechanism provides a biasing force that is the same regardless of whether the high dose extended position is the selected extended position or the low dose extended position is the selected extended position;

wherein the biasing mechanism comprises a spring that engages with a spring receiving portion of the dose adjustment mechanism; and wherein the spring receiving portion of the dose adjustment mechanism remains at substantially the same position relative to the actuator when the movable pump member is at the selected extended position, regardless of whether the high dose extended position is the selected extended position or the low dose extended position is the selected extended position.

13. The fluid dispenser according to claim 4, wherein the cam selection mechanism selects the position of the extended engagement portion relative to the movable pump member by rotating the cam body about an adjustment axis;

wherein the rotation of the cam body about the adjustment axis moves the extended engagement portion towards or away from the movable pump member;

wherein the dose adjustment mechanism further comprises a cam locking mechanism;

wherein the cam selection mechanism is movable between a locked position and an unlocked position, and is biased towards the locked position;

wherein, when in the locked position, the cam body engages with the cam locking mechanism to hold the cam surface at a selected rotational position relative to the adjustment axis;

wherein the cam selection mechanism is movable from the locked position to the unlocked position by moving the cam body away from and out of engagement with the cam locking mechanism;

wherein the selected rotational position of the cam surface is selected by rotating the cam selection mechanism while in the unlocked position, to thereby rotate the cam body to the selected rotational position, and then moving the cam body back into engagement with the cam locking mechanism;

wherein the cam body has a locking end that is spaced from the adjustment axis; and wherein the cam locking mechanism comprises an arcuate cam locking surface that has a set of notches that are sized to receive the locking end of the cam body.

14. The fluid dispenser according to claim 13, wherein the adjustment axis is closer to the retracted engagement portion of the cam surface than the extended engagement portion of the cam surface;

wherein the retracted engagement portion is moved a smaller distance towards or away from the movable pump member when the cam body is rotated about the adjustment axis compared to the movement of the extended engagement portion;

wherein the dose adjustment mechanism further comprises a pump engagement member that engages with the movable pump member and locates the movable pump member relative to the reciprocal pump member; and wherein the cam selection mechanism selects the position of the extended engagement portion relative to the movable pump member by moving the pump engagement member relative to the extended engagement portion of the cam surface.

15. The fluid dispenser according to claim 13, wherein the dose adjustment mechanism further comprises a pump engagement member that engages with the movable pump member and locates the movable pump member relative to the reciprocal pump member;

wherein the cam body is connected to the pump engagement member so that the rotation of the cam body about the adjustment axis moves the pump engagement member along the pump axis relative to the extended engagement portion of the cam surface;

wherein the cam body is connected to the pump engagement member at a connection portion of the cam body;

wherein the adjustment axis is closer to the extended engagement portion of the cam surface than the connection portion of the cam body;

wherein the connection portion of the cam body is closer to the retracted engagement portion of the cam surface than the extended engagement portion of the cam surface; and wherein the retracted engagement portion is moved a smaller distance towards or away from the movable pump member when the cam body is rotated about the adjustment axis compared to the movement of the extended engagement portion.

16. The fluid dispenser according to claim 3, wherein the cam selection mechanism selects the cam surface that is presented for engagement with the camming surface from at least a high dose cam surface of the cam body and a low dose cam surface of the cam body;

wherein the extended engagement portion of the cam surface that is presented for engagement with the camming surface is selected from at least a high dose extended engagement portion of the high dose cam surface and a low dosage extended engagement portion of the low dose cam surface;

wherein the position of the high dose extended engagement portion of the high dose cam surface relative to the movable pump member differs from the position of the low dose extended engagement portion of the low dose cam surface relative to the movable pump member; and wherein the cam selection mechanism selects the cam surface that is presented for engagement with the camming surface by sliding the cam body relative to the camming surface to align the high dose cam surface, the low dose cam surface, or an additional cam surface of the cam body with the camming surface.

17. The fluid dispenser according to claim 1, wherein movement of the actuator between a first position and a second position effects movement of the movable pump member between the selected extended position and the retracted position to dispense the dose of fluid;
 wherein a movement distance of the actuator between the first position and the second position is the same regardless of whether the high dose extended position is the selected extended position or the low dose extended position is the selected extended position;
 wherein the dose adjustment mechanism selects the selected extended position without reducing the movement distance of the actuator between the first position and the second position, regardless of whether the high dose extended position is selected or the low dose extended position is selected;
 wherein the dose adjustment mechanism provides a continuous mechanical linkage between the actuator and the movable pump member regardless of whether the high dose extended position is the selected extended position or the low dose extended position is the selected extended position;
 wherein the dose adjustment mechanism selects the selected extended position without introducing a loose segment of movement of the actuator between the first position and the second position, regardless of whether the high dose extended position is selected or the low dose extended position is selected; and
 wherein a mechanical advantage of the mechanical linkage is increased when the low dose extended position is the selected extended position.

18. The fluid dispenser according to claim 1, further comprising a biasing mechanism that biases the movable pump member towards the selected extended position;
 wherein, when the movable pump member is at the selected extended position, the biasing mechanism provides a biasing force that is the same regardless of whether the high dose extended position is the selected extended position or the low dose extended position is the selected extended position; and
 wherein the biasing mechanism comprises a spring that engages with the actuator.

19. The fluid dispenser according to claim 1, further comprising a biasing mechanism that biases the movable pump member towards the selected extended position;
 wherein, when the movable pump member is at the selected extended position, the biasing mechanism provides a biasing force that is the same regardless of whether the high dose extended position is the selected extended position or the low dose extended position is the selected extended position;
 wherein the biasing mechanism comprises a spring that engages with a spring receiving portion of the dose adjustment mechanism; and
 wherein the spring receiving portion of the dose adjustment mechanism remains at substantially the same position relative to the actuator when the movable pump member is at the selected extended position, regardless of whether the high dose extended position is the selected extended position or the low dose extended position is the selected extended position.

20. The fluid dispenser according to claim 1, wherein the retracted position of the movable pump member remains substantially unchanged regardless of whether the high dose extended position is the selected extended position or the low dose extended position is the selected extended position; and
 wherein the fluid is a hand cleaning fluid.

* * * * *